US012407473B2

(12) United States Patent
Jung et al.

(10) Patent No.: US 12,407,473 B2
(45) Date of Patent: Sep. 2, 2025

(54) METHOD AND APPARATUS FOR TRANSMITTING AND RECEIVING MULTIPLE DATA IN WIRELESS COOPERATIVE COMMUNICATION SYSTEM

(71) Applicant: Samsung Electronics Co., Ltd., Gyeonggi-do (KR)

(72) Inventors: Euichang Jung, Gyeonggi-do (KR); Hoondong Noh, Gyeonggi-do (KR); Jinhyun Park, Gyeonggi-do (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 370 days.

(21) Appl. No.: 17/765,252

(22) PCT Filed: Oct. 19, 2020

(86) PCT No.: PCT/KR2020/014272
§ 371 (c)(1),
(2) Date: Mar. 30, 2022

(87) PCT Pub. No.: WO2021/075939
PCT Pub. Date: Apr. 22, 2021

(65) Prior Publication Data
US 2022/0360408 A1  Nov. 10, 2022

(30) Foreign Application Priority Data
Oct. 17, 2019  (KR) .................. 10-2019-0129464

(51) Int. Cl.
*H04L 5/00* (2006.01)
*H04W 72/1273* (2023.01)
*H04W 72/23* (2023.01)

(52) U.S. Cl.
CPC ....... *H04L 5/0053* (2013.01); *H04W 72/1273* (2013.01); *H04W 72/23* (2023.01)

(58) Field of Classification Search
None
See application file for complete search history.

(56) References Cited

U.S. PATENT DOCUMENTS

| 11,265,044 B2 | 3/2022 | Jung et al. | |
|---|---|---|---|
| 2020/0267629 A1* | 8/2020 | Van Der Velde | H04W 48/12 |

(Continued)

FOREIGN PATENT DOCUMENTS

| EP | 3 454 477 | 3/2019 |
|---|---|---|
| KR | 10-2021-0023632 | 3/2021 |
| WO | WO 2019/099659 | 5/2019 |

OTHER PUBLICATIONS

NTT Docomo et al. "Enhancements on multi-TRP/panel transmission", Oct. 14, 2019, 3GPP Draft, R1-191184, pp. 1-6.*

(Continued)

*Primary Examiner* — Adnan Baig
(74) *Attorney, Agent, or Firm* — The Farrell Law Firm, P.C.

(57) ABSTRACT

The disclosure relates to a communication technique for combining, with IoT technology, a 5th generation (5G) or pre-5G communication system to support a higher data transfer rate than a 4th generation (4G) communication system such as Long Term Evolution (LTE), and a system thereof. The disclosure can be applied to intelligent services (for example, smart homes, smart buildings, smart cities, smart cars or connected cars, healthcare, digital education, retail businesses, security and safety related services, etc.) on the basis of 5G communication technology and IoT-related technology. According to various embodiments of the present invention, a method and apparatus for transmitting and receiving multiple data in a wireless cooperative communication system may be provided. In addition, a method for a terminal in the communication system of the present invention is characterized by comprising the steps (Continued)

of: sending UE capability information including beam switching-related information to a base station; receiving configuration information including information related to a control channel from the base station; receiving at least one of first control information or second control information from the base station on the basis of the information related to the control channel; identifying whether a first time offset between a first control channel and a first data channel corresponding to the first control information, and a second time offset between a second control channel and a second data channel corresponding to the second control information are smaller than the beam switching-related information; and receiving data over the first data channel or the second data channel by using default quasi co-located (QCL) information when the first time offset and the second time offset are smaller than the beam switching-related information.

11 Claims, 18 Drawing Sheets

(56) References Cited

U.S. PATENT DOCUMENTS

| | | | |
|---|---|---|---|
| 2021/0092717 A1* | 3/2021 | Takeda | H04W 92/10 |
| 2022/0312466 A1* | 9/2022 | Matsumura | H04L 5/005 |
| 2022/0322410 A1* | 10/2022 | Matsumura | H04W 72/1273 |

OTHER PUBLICATIONS

ZTE, "Considerations on Beam Management for Multi-TRP", R1-1906244, 3GPP TSG RAN WG1 #97, May 13-17, 2019, 7 pages.
European Search Report dated Sep. 14, 2022 issued in counterpart application No. 20876325.0-1206, 10 pages.
PCT/ISA/210 Search Report issued on PCT/KR2020/014272, Jan. 12, 2021 pp. 5.
PCT/ISA/237 Written Opinion issued on PCT/KR2020/014272, Jan. 12, 2021, pp. 4.
NTT Docomo Ltd., 3GPP TSG RAN WG1 #98bis R1-1911184 Chongqing, China, Oct. 4, 2019, Enhancements on multi-TRP/panel transmission, pp. 34.
Intel Corporation, 3GPP TSG-RAN WG4 Meeting #90 R4-1900111, Athens, GR, Feb. 15, 2019, "On TCI State Switch Delay", pp. 7.
Huawei, HiSilicon, 3GPP TSG RAN WG1 Meeting #98bis R1-1910073 Chongqing, China, Oct. 5, 2019, "Enhancements on multi-TRP/panel transmission", pp. 31.
Catt, 3GPP TSG RAN WG1 #98bis R1-1910349, Chongqing, China, Oct. 5, 2019, "Considerations on multi-TRP/panel transmission", pp. 27.
European Communication Report dated Jul. 1, 2024 issued in counterpart application No. 20876325.0-1206, 6 pages.
Korean Office Action dated Mar. 27, 2025 issued in counterpart application No. 10-2019-0129464, 8 pages.

* cited by examiner

FIG. 10A

METHOD AND APPARATUS FOR TRANSMITTING AND RECEIVING MULTIPLE DATA IN WIRELESS COOPERATIVE COMMUNICATION SYSTEM

PRIORITY

This application is a National Phase Entry of PCT International Application No. PCT/KR2020/014272, which was filed on Oct. 19, 2020, and claims priority to Korean Patent Application No. 10-2019-0129464, which was filed on Oct. 17, 2019, the entire content of each of which is incorporated herein by reference.

TECHNICAL FIELD

The disclosure relates to a wireless communication system and relates to a method and apparatus for transmitting and receiving multiple data in a wireless cooperative communication system.

BACKGROUND

In order to satisfy wireless data traffic demands that tend to increase after $4^{th}$ generation (4G) communication system commercialization, efforts to develop an enhanced 5G communication system [or a pre-5G communication system] are being made. For this reason, the 5G communication system [or pre-5G communication system] is called a beyond 4G network communication system or a post LTE system. In order to achieve a high data transfer rate, an implementation of the 5G communication system in a mmWave band (e.g., 60 Giga (70 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system. In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, technologies, such as a sensor network, machine to machine M2M) and machine type communication (MTC), are implemented by schemes, such as beamforming, MINO, and an array antenna, that is, 5G communication technologies. The application of a cloud radio access network (cloud RAN) as the aforementioned big data processing technology may be said to be an example of convergence between the 3eG technology and the IoT technology.

As described above, with the development of the wireless communication system, there is a need for a data transmission and reception scheme for network cooperative communication.

DISCLOSURE OF INVENTION

Technical Problem

Based on the aforementioned discussion, the disclosure provides a method and apparatus for transmitting and receiving one or more data between a transmission node and a terminal in order to perform cooperative communication in a wireless communication system.

Technical objects to be achieved in the disclosure are not limited to the aforementioned technical objects, and other technical objects not described above may be evidently understood by a person having ordinary knowledge in the art to which the disclosure pertains from the following description.

Solution to Problem

According to an embodiment of the disclosure, there is provided a method of a base station and a terminal to determine default QCL in a wireless communication system.

Furthermore, according to an embodiment of the disclosure, there is provided a method of a terminal and a base station to determine default QCL based on a MAC CE in a single/multi-TRP.

A method of a user equipment (UE) in a communication system of the disclosure for solving the aforementioned problem includes transmitting, to a base station, UE capability information including beam switching-related information, receiving, from the base station, configuration information including information related to a control channel, receiving, from the base station, at least one of first control information or second control information based on the information related to the control channel, identifying whether a first time offset between a first control channel and a first data channel corresponding to the first control information and a second time offset between a second control channel and a second data channel corresponding to the second control information are smaller than the beam switching-related information, and receiving data through the first data channel or the second data channel by using default quasi co-located (QCL) information based on the first time offset and the second time offset being smaller than the beam switching-related information.

Furthermore, a method of a base station in a communication system of the disclosure for solving the aforementioned problem includes receiving, from a user equipment (UE), capability information including beam switching-related information, transmitting, to the UE, configuration information including information related to a control channel, transmitting, to the UE, at least one of first control information or second control information based on the information related to the control channel, and transmitting data through a first data channel corresponding to the first control information or a second data channel corresponding to the second control information. Based on a first time offset between a first control channel and the first data channel corresponding to the first control information and a second time offset between a second control channel and the second data channel corresponding to the second control information being smaller than the beam switching-related information, the data is received based on default quasi co-located (QCL) information.

Furthermore, a. UE in a communication system of the disclosure for solving the aforementioned problem includes a transceiver and a controller connected to the transceiver and configured to transmit, to a base station, UE capability information including beam switching-related information, receive, from the base station, configuration information including information related to a control channel, receive, from the base station, at least one of first control information or second control information based on the information related to the control channel, identify whether a first time offset between a first control channel and a first data channel corresponding to the first control information and a second time offset between a second control channel and a second data channel corresponding to the second control information is smaller than the beam switching-related information, and receive data through the first data channel or the second data channel by using default quasi co-located (QCL) information based on the first time offset and the second time offset being smaller than the beam switching-related information.

Furthermore, a base station in a communication system of the disclosure for solving the aforementioned problem includes a transceiver and a controller connected to the transceiver and configured to receive, from a UE, UE capability information including beam switching-related information, transmit, to the UE, configuration information including information related to a control channel, transmit, to the UE, at least one of first control information or second control information based on the information related to the control channel, and transmit data through a first data channel corresponding to the first control information or a second data channel corresponding to the second control information. Based on a first time offset between a first control channel and the first data channel corresponding to the first control information and a second time offset between a second control channel and the second data channel corresponding to the second control information being smaller than the beam switching-related information, the data is received based on default quasi co-located (QCL) information.

Advantageous Effects of Invention

According to an embodiment of the disclosure, there can be provided the method and apparatus for transmitting and receiving one or more data between a transmission node and a terminal in order to perform cooperative communication in a wireless communication system.

Effects which may be obtained in the disclosure are not limited to the aforementioned effects, and other technical effects not described above may be evidently understood by a person having ordinary knowledge in the art to which the disclosure pertains from the following description.

BRIEF DESCRIPTION OF DRAWINGS

FIG. 10A is a diagram illustrating a MAC CE structure for the transmission configuration indication (TCI) state activation of a UE-specific PDCCH according to the disclosure.

MODE FOR THE INVENTION

Figure 1:
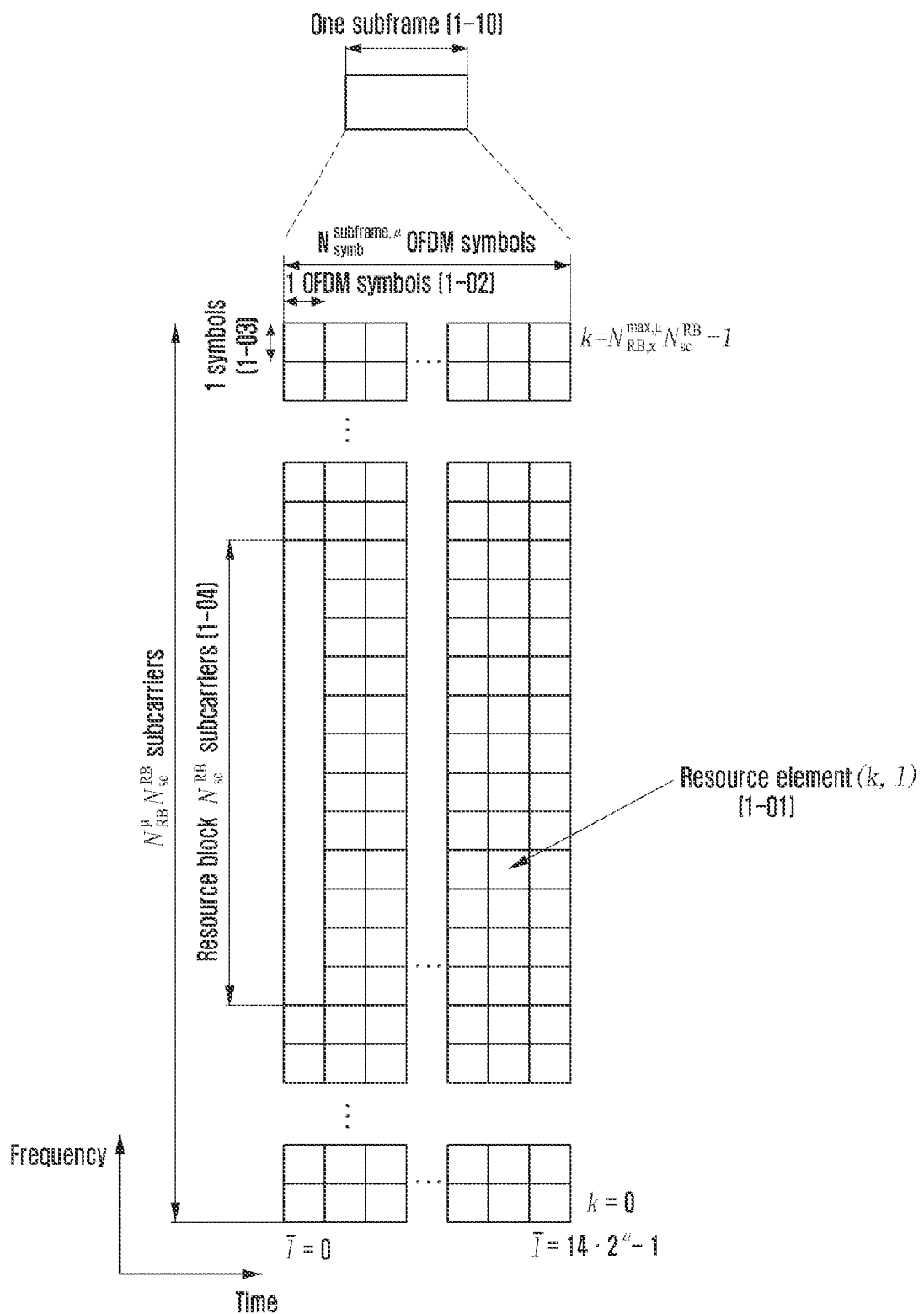
FIG. 1 is a diagram illustrating a time-frequency domain transmission structure of long term evolution (LTE) (or evolved universal terrestrial radio access (E-UTRA)), LTE-Advanced (LTE-A), NR or a wireless communication system similar thereto according to an embodiment of the disclosure.

Hereinafter, embodiments of the disclosure are described in detail with reference to the accompanying drawings.

In describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same components.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable storage medium that can direct a computer or other programmable data processing equipment to implement a function in a particular manner, such that the instructions stored in the a computer-usable or computer-readable memory produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or other programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application specific integrated circuit (ASIC), and the "unit" performs specific tasks. However, the term "~unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card. Furthermore, in an embodiment, "~unit" may include one or more processors.

Hereinafter, an operation principle of the disclosure is described in detail with reference to the accompanying drawings. In the following description of the disclosure, a detailed description of a related known function or configuration will be omitted if it is deemed to make the subject matter of the disclosure unnecessarily vague. Furthermore, terms to be described hereinafter may be defined by taking into consideration functions in the disclosure, and may be different depending on a user, an operator's intention or practice. Accordingly, each term should be defined based on contents over the entire specification. Hereinafter, a base station is the subject of resource assignment to a terminal, and may be at least one of a gNode B (gNB), an eNode B (eNB), a Node B, a base station (BS), a radio access unit, a base station controller, or a node on a network. A terminal may include a user equipment (UE), a mobile station (MS), a terminal, a cellular phone, a smartphone, a computer, or a multimedia system capable of performing a communication function. The disclosure is not limited to the examples. Hereinafter, in the disclosure, a technology for receiving, by a terminal, broadcasting information from a base station in a wireless communication system is described. The disclosure relates to a communication scheme and system for the convergence of a $5^{th}$ generation (5G) communication system for supporting a higher data transfer rate after the $4^{th}$ generation (4G) system and an Internet of things (IoT) technology. The disclosure may be applied to intelligent services (e.g., smart homes, smart buildings, smart cities, smart cars or connected cars, health care, digital education, retailing, security and safety-related services) based on the 5G communication technology and the IoT-related technology.

A term denoting broadcasting information used in the following description, a term denoting control information, a term related to communication coverage, a term (e.g., an event) denoting a state change, terms denoting network entities, terms denoting messages, a term denoting an element of an apparatus, etc., which are used in the following description, have been illustrated for convenience of description. Accordingly, the disclosure is not restricted by terms described later, and another term having an equivalent technical meaning may be used.

Hereinafter, for convenience of description, some of terms and names defined in the $3^{rd}$ generation partnership project long term evolution (3GPP LTE) standard may be used. However, the disclosure is not restricted by the terms and names, and may also be identically applied to systems that follow other standards.

A wireless communication system deviates from the provision of initial voice-based services, and develops into a wideband wireless communication system which provides high-speed and high-quality packet data services like communication standards, for example, high speed packet access (HSPA) of 3GPP, long term evolution (LTE) (or evolved universal terrestrial radio access (E-UTRA)), LTE-Advanced (LTE-A), LTE-Pro, high rate packet data (HRPD) of 3GPP2, ultra mobile broadband (UMB), and 802.16e of IEEE, etc.

As a representative example of a broadband wireless communication system, an LTE system adopts an orthogonal frequency division multiplexing (OFDM) scheme in downlink (DL) and adopts a single carrier frequency division multiple access (SC-FDMA) scheme in uplink (UL). LT means a radio link through which a terminal (a user equipment (UE) or a mobile station (MS)) transmits data or a control signal to a base station (an eNode B, or a base station (BS)). DL means a radio link through which a base station transmits data or a control signal to a terminal. In such a multi-access method, data or control information of users are distinguished from one another by allocating and operating time-frequency resources on which data or control information will be carried and transmitted for each user so that the time-frequency resources are not overlapped, that is, orthogonality is established.

A future communication system after UE, that is, a 5G communication system, needs to support services which satisfy various requirements because various requirements of a user, a service provider, etc. need to be able to be freely incorporated. Services taken into consideration for the 5G communication system include an enhanced mobile broadband (eMBB), massive machine type communication (mMTC), ultra reliability low latency communication (URLLC), etc.

According to some embodiments, the eMBB has an object of providing a higher data transfer rate than the existing data transfer rate supported by LTE, UE-A, or LTE-Pro. For example, in a 5G communication system, the eMBB needs to provide a peak data rate of 20 Gbps in DL and a peak transfer rate of 10 Gbps in UL from one base station viewpoint. Furthermore, the eMBB needs to provide an increased user perceived data rate of a terminal. In order to satisfy such a requirement, a transmission and reception technology including a further enhanced multi-input multi-output (MIMO) transmission technology needs to be improved. Furthermore, a data transfer rate required for the 5G communication system may be satisfied by using a frequency bandwidth wider than a bandwidth of 20 MHz in a frequency band of 3 to 6 GHz or 6 GHz or more instead of the 2 GHz band used by current LTE.

Furthermore, in the 5G communication system, mMTC for supporting an application service, such as the IoT, is taken into consideration. mMTC may require the support of access for many terminals within a cell, improved coverage for a terminal, an increased battery time, a cost reduction of a terminal, etc. in order to efficiently support the IoT. The IoT needs to be able to support many terminals (e.g., 1,000,000 terminals/km$^2$) within a cell because it provides communication functions to several sensors and various devices attached to the terminals. Furthermore, there is a good possibility that a terminal supporting mMTC may be disposed in a shadow area not covered by a cell, such as the underground of a building in view of its service. Accordingly, the terminal may require wider coverage than other services provided by a 5G communication system. A terminal supporting mMTC needs to be composed of a cheap terminal and may require a very long battery life time because it is difficult to frequently change the battery of the terminal.

Finally, URLLC needs to provide remote control for a robot or machinery, industrial automation, an unmanned aerial vehicle, and remote health care as cellular-based wireless communication services used for a specific purpose (mission-critical), and communication providing ultra low latency and ultra reliability as a service used in emergency alert, etc. For example, a service supporting URLLC needs to satisfy air interface latency smaller than 0.5 millisecond and also has a requirement for a packet error rate of $10^{-5}$ or less. Accordingly, for a service supporting URLLC, a 5G system needs to provide a transmit time interval (TTI) smaller than that of another service and also requires a design factor that a wide resource needs to be allocated in a frequency band. However, the aforementioned mMTC, URLLC, and eMBB are merely examples of different service types, and a service type, that is, the subject of application of the disclosure, is not limited to the aforementioned examples.

The aforementioned services taken into consideration in the 5G communication system need to be provided by being combined based on one framework. That is, for efficient resource management and control, it is preferred that the services are integrated, controlled, and transmitted as one system rather than being independently operated.

Furthermore, hereinafter, embodiments of the disclosure are described by taking, an LTE, LTE-A, LTE Pro, or NR system as an example, but an embodiment of the disclosure may also be applied to other communication systems having a similar technical background or channel form. Furthermore, an embodiment of the disclosure may also be applied to another communication system through some modifications within a range not greatly deviating from the scope of the disclosure based on a determination of a person who has skilled technical knowledge.

The disclosure relates to a method and apparatus for repeatedly transmitting data and control signals between multiple transmission nodes and a terminal which perform cooperative communication in order to improve communication reliability.

According to the disclosure, if network cooperative communication is used in a wireless communication system, reliability of data/control signal received by a terminal can be improved.

Hereinafter, a frame structure of a 5G system is more specifically described with reference to the drawings.

FIG. 1 is a diagram illustrating a time-frequency domain transmission structure of LTE, LTE-A, MR or a wireless communication system similar thereto according to an embodiment of the disclosure.

FIG. 1 is a diagram illustrating a basic structure of a time-frequency domain, that is, a wireless resource region in which data or a control channel is transmitted in a 5G system. With reference to FIG. 1, a transverse axis illustrates a time domain, and a longitudinal axis illustrates a frequency domain. In the time and frequency domain, a basic unit of a resource is a resource element (RE) 1-01, and may be defined as one orthogonal frequency division multiplexing (OFDM) symbol 1-02 in the time domain and one subcarrier 1-03 in the frequency axis domain. In the frequency domain, (e.g., 12) contiguous REs may constitute one resource block (RB) 1-04.

Figure 2:
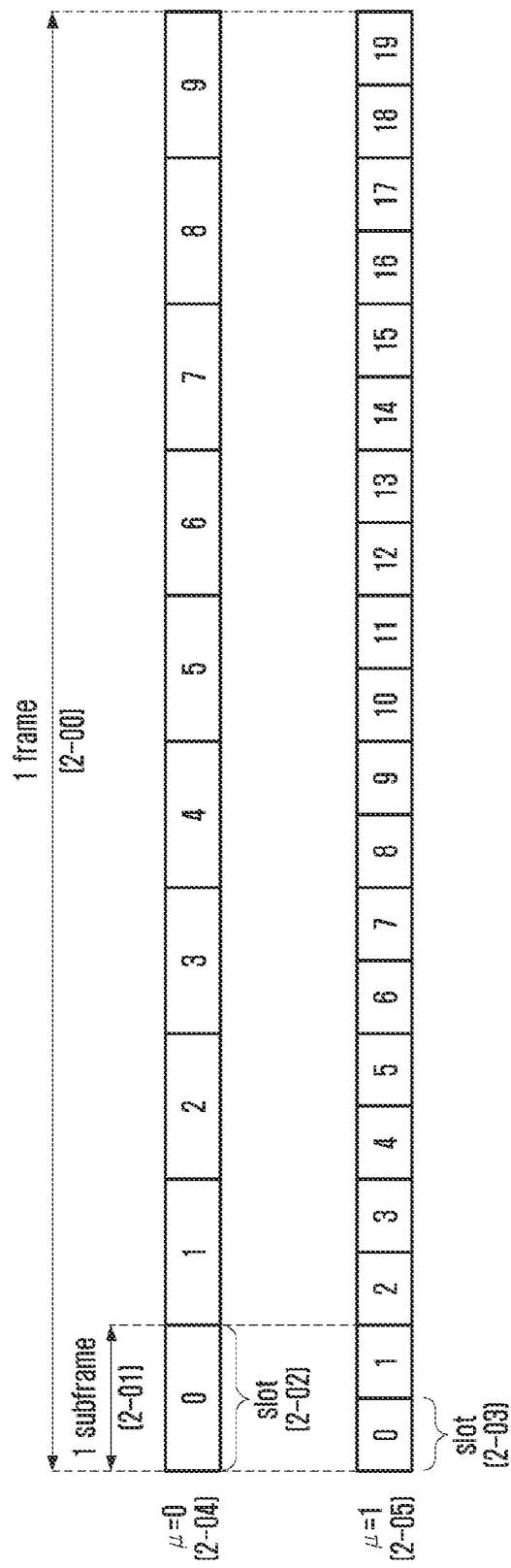
FIG. 2 is a diagram illustrating a frame, subframe, and slot structure: in $5^{th}$ (5G) generation according to an embodiment of the disclosure.

FIG. 2 is a diagram illustrating a frame, subframe, and slot structure in 5G according to an embodiment of the disclosure.

FIG. 2 is a diagram illustrating a slot structure which is taken into consideration in a 5G system. With reference to FIG. 2, FIG. 2 illustrates an example of a structure of a frame 2-00, a subframe 2-01, and a slot 2-02. One frame 2-00 may be defined as 10 ms. One subframe 2-01 may be defined as 1 ms. Accordingly, one frame 2-00 may consist of a total of 10 subframes 2-01. One slot 2-02, 2-03 may be defined as 14 OFDM symbols (i.e., the number of symbols per slot ($N_{symb}^{slot}$)=14). One subframe 2-01 may consist of one or multiple slots 2-02, 2-03. The number of slots 2-02, 2-03 per subframe 2-01 may be different depending on a setting value μ (2-04, 2-05) for a subcarrier spacing. An example of FIG. 2 illustrates a case where a subcarrier spacing setting value is μ=0 (2-04) and a case where a subcarrier spacing setting value is μ=1 (2-05). In the case of μ=0 (2-04), one subframe 2-01 may consist of one slot 2-02, In the case of μ=1 (2-05), one subframe 2-01 may consist of two slots 2-03. That is, the number of slots per subframe ($N_{slot}^{subframe,\mu}$) may be different depending on the setting value μ for a subcarrier spacing. Accordingly, the number of slots per frame ($N_{slot}^{frame, \mu}$) may differ./and/according to the subcarrier spacing configuration μ may be defined as in [Table 1] below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or a serving cell may be composed of a maximum of 250 or more RBs. Accordingly, if a terminal always receives a full serving cell bandwidth as in UE, power consumption of the terminal may be severe. In order to solve such a problem, a base station may support a configuration of one or more bandwidth parts (BWPs) for the terminal so that the terminal can change a reception area within a cell. In NR, a base station may configure an "initial BWP", that is, a bandwidth of a CORESET #0 (or a common search space CSS), for a terminal through a master information block (MIB). Thereafter, the base station may configure a first BWP of the terminal through RRC signaling, and may notify the terminal of at least one piece of BWP configuration information which may be indicated through downlink control information (DCI) in the future. Thereafter, the base station may indicate, for the terminal, which band the terminal should use by announcing a BWP ID through DCI. If the terminal does not receive the DCI in a BWP now allocated to the terminal for a specific time or more, the terminal may return to a "default BWP" and attempt DCI reception.

Figure 3:
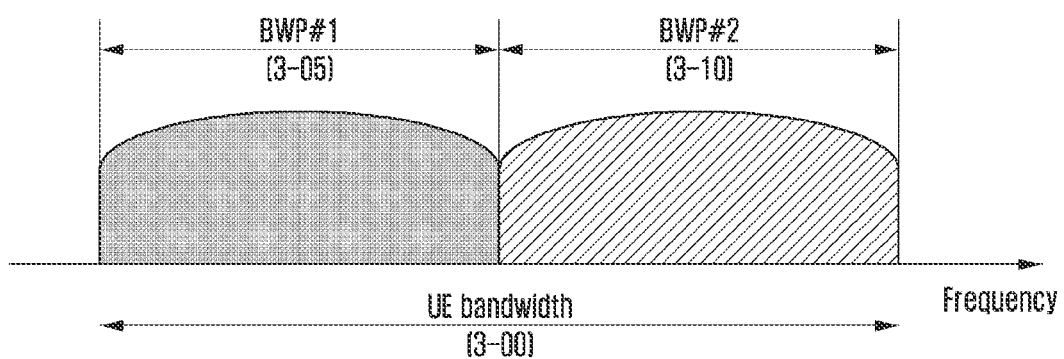
FIG. 3 illustrates an example of a bandwidth part (BWP) constitution in a wireless communication system according to an embodiment of the disclosure.

FIG. 3 illustrates an example of a BWP constitution in a wireless communication system according to an embodiment of the disclosure.

FIG. 3 is a diagram illustrating an example of a configuration for a BWP in a 5G communication system. With reference to FIG. 3, FIG. 3 illustrates an example in which a UE bandwidth 3-00 is configured as two BWPs, that is, a BWP #1 3-05 and a BWP #2 3-10, A base station may configure one or multiple MVPs for a terminal, and may configure pieces of information, such as [Table 2] below, with respect to each of the BWPs.

TABLE 2

| | |
|---|---|
| Configuration information 1 | Bandwidth of BWP (the number of PRBs constituting a BWP) |
| Configuration information 2 | Frequency location of BWP (such information may include a reference point versus an offset value, a center frequency of carrier as a reference point, for example, a synchronization signal, a synchronization signal raster, etc.) |
| Configuration information 3 | Numerology of BWP (e.g., a subcarrier spacing, a cyclic prefix (CP) length, etc.) |
| Others | |

In addition to the configuration information described with reference to [Table 2], various parameters related to a BWP may be configured for a terminal. The pieces of aforementioned information may be delivered from a base station to a terminal through higher layer signaling, for example, RRC signaling. At least one BWP among configured one or multiple MVPs is activated. Whether to activate the configured BWP may be semi-statically delivered from the base station to the terminal through RRC signaling or may be dynamically delivered through a medium access control (MAC) control element (CE) or DCI.

The aforementioned configuration for a BWP supported in a 5G communication system may be used for various purposes.

Example, if a bandwidth supported by a terminal is smaller than a system bandwidth, a bandwidth supported by the terminal may be supported through a configuration for a BWP. For example, in [Table 2], a frequency location of a BWP (configuration information 2) may be configured for a terminal, so that the terminal may transmit and receive data at a specific frequency location within a system bandwidth.

Furthermore, for example, for the purpose of supporting different numerologies, a base station may configure multiple BWPs for a terminal. For example, in order to support both data transmission and reception using a subcarrier spacing of 15 kHz and a subcarrier spacing of 30 kHz for a given terminal, two BWPs may be configured to use the subcarrier spacings of 15 kHz and 30 kHz, respectively. Different BWPs may be subjected to frequency division multiplexing (FDM). If data is to be transmitted and received through a specific subcarrier spacing, a BWP configured as the corresponding subcarrier spacing may be activated.

Furthermore, for example, for the purpose of reducing power consumption of a terminal, a base station may configure, for the terminal, BWPs having bandwidths having different sizes. For example, if a terminal supports a very large bandwidth, for example, a 100 MHz bandwidth and always transmits and receives data through the corresponding bandwidth, very large power consumption may be caused. In particular, in a condition in which traffic is not present, if a terminal performs unnecessary monitoring on a downlink control channel for a large bandwidth of 100 MHz, it is very inefficient from a power consumption viewpoint. Accordingly, for the purpose of reducing power consumption of a terminal, a base station may configure, for a terminal, a BWP having a relatively small bandwidth, for example, a 20 MHz BWP. The terminal may perform a monitoring operation in the 20 MHz BWP in a condition in which traffic is not present, and may transmit and receive data by using the 100 MHz BWP in response to an instruction from the base station when the data occurs.

Figure 4:
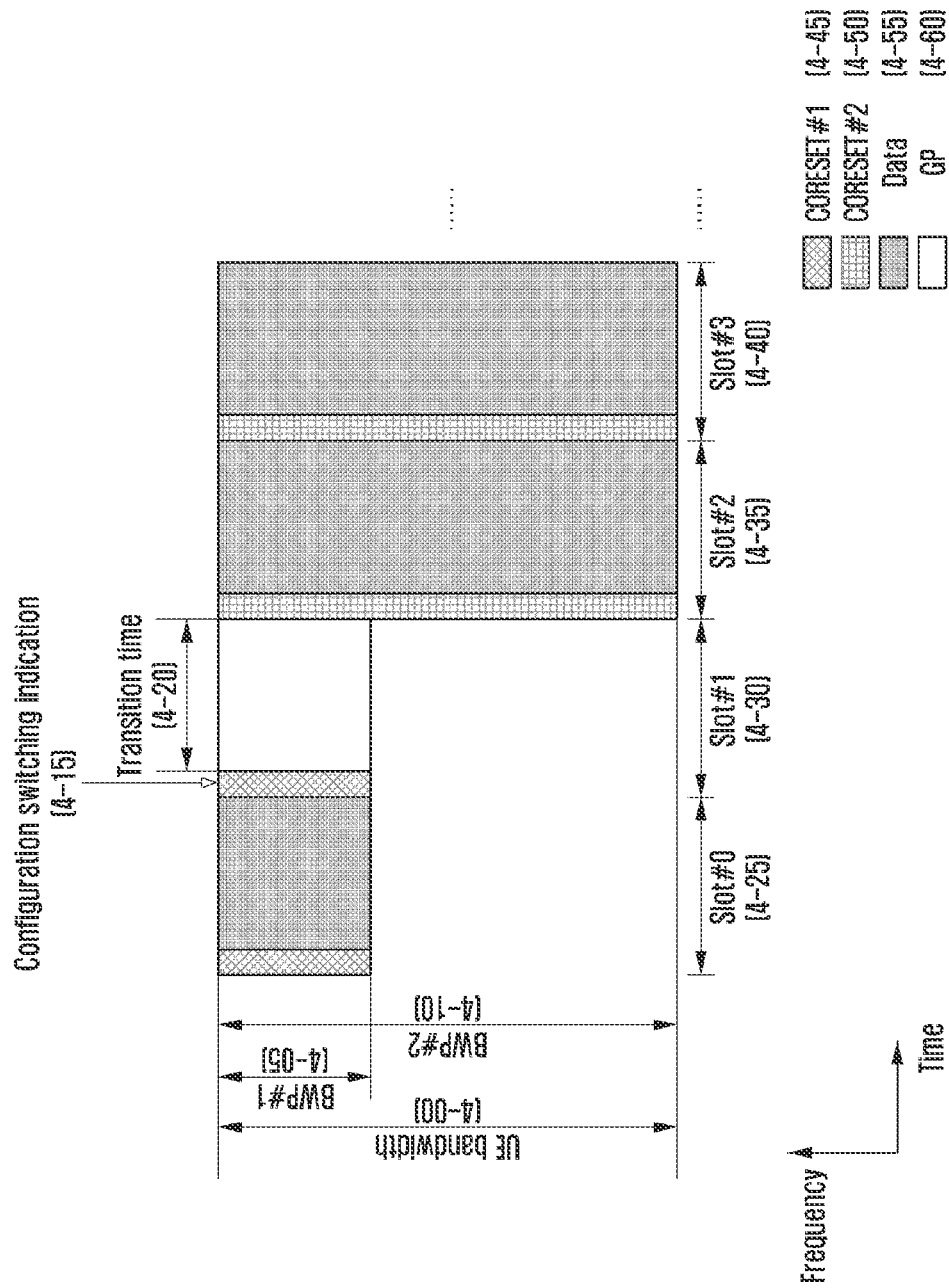
FIG. 4 is a diagram illustrating an example of the indication and change of a BWP in a wireless communication system according to an embodiment of the disclosure.

FIG. 4 is a diagram illustrating an example of the indication and change of a BWP in a wireless communication system according to an embodiment of the disclosure.

FIG. 4 is a diagram illustrating a dynamic configuration change method for a BWP. With reference to FIG. 4, as described with reference to [Table 2], a base station may configure one or multiple BWPs for a terminal, and may notify the terminal of information on a bandwidth of a BWP, a frequency location of the BWP, a numerology of the BWP, etc. as a configuration for each BWP. FIG. 4 illustrates an example in which two BWP, that is, a BWP #1 4-05 and a BWP #2 4-10, are configured within a UE bandwidth 4-00 for a terminal. One or multiple BWPs among the configured bandwidths may be activated. In FIG. 4, an example in which one BWP is activated may be taken into consideration.

In FIG. 4, the BMP #4-02 among the configured BWPs has been activated in a slot #0 4-25, and the terminal may monitor a physical downlink control channel (PDCCH) in a control region #1 4-45 configured in the BWP #1 4-05 and transmit and receive data 4-55 in the BWP #1 4-05. A control region in which the terminal receives the PDCCH may be different depending on which one of the configured BWPs is activated. Accordingly, a bandwidth in which the terminal monitors the PDCCH may be different.

Furthermore, the base station may transmit, to the terminal, indication which changes a configuration for a BWP. In this case, to change the configuration for a BWP may be considered as being identical with an operation of activating a specific BWP (e.g., a change in activation from a BWP A to a BWP B). The base station may transmit, to the terminal, a configuration switching indication in a specific slot. After receiving the configuration switching indication from the base station, the terminal may determine a BWP to be activated by applying a switched configuration according to the configuration switching indication from specific timing, and may perform monitoring on a PDCCH in a control region configured in the activated BWP.

In FIG. 4, the base station may transmit, to the terminal, a configuration switching indication 4-15 that indicates a change in the activated BWP from the existing BWP #1 4-05 to the BWP #2 4-10 in a slot #1 4-30. After receiving the corresponding indication, the terminal may activate a BWP #2 6-10 based on the contents of the indication. In this case, a transition time 4-20 for a change in the BWP may be required. Accordingly, timing at which an activated BWP is changed and applied may be determined. FIG. 4 illustrates a case after the configuration switching indication 4-15 is received, the transition time 4-20 of one slot is consumed. Data transmission and reception may not be performed in the transition time 4-20 (4-60). Accordingly, the BWP #2 4-10 may be activated in a slot #2 4-35, and an operation transmitting and receiving a control channel and data through the corresponding BWP may be performed.

The base station may pre-configure one or multiple BWPs for the terminal through higher layer signaling (e.g., RRC signaling, etc.), and may indicate activation in a way that the configuration switching indication 4-15 is mapped to one of BWP configurations pre-configured by the base station. For example, indication of log$_2$N bits may select and indicate may select and indicate one of N pre-configured BWPs. An example in which configuration information for a BWP is indicated using 2-bit indication is described with reference to [Table 3] below.

TABLE 3

| INDICATION VALUE | BWP CONFIGURATION |
|---|---|
| 00 | Bandwidth configuration A configured through higher layer signaling |
| 01 | Bandwidth configuration B configured through higher layer signaling |
| 10 | Bandwidth configuration C configured through higher layer signaling |
| 11 | Bandwidth configuration D configured through higher layer signaling |

The configuration switching indication 4-15 for a BWP described with reference to FIG. 4 may be delivered from the base station to the terminal in the form of MAC CE signaling or L1 signaling (e.g., common DCI, group-common DCI, UE-specific DCI, etc.). From which timing BWP activation will be applied may be different as follows based on the configuration switching indication 4-15 for a BWP described with reference to FIG. 4. From which timing configuration switching will be applied may follow a pre-defined value (e.g., applied after N (≥1) slots since the configuration switching indication is received) or the base station may configure the timing of the application of the configuration switching for the terminal through higher layer signaling (e.g., RRC signaling) or the timing of the application of the configuration switching may be transmitted by being partially included in the contents of the configuration switching indication 4-15. Alternatively, the timing of the application of the configuration switching may be determined as a combination of the aforementioned methods. After receiving the configuration switching indication 4-15 for BWP, the terminal may apply a switched configuration from the timing obtained through the aforementioned method.

Hereinafter, a downlink control channel in a 5G communication system is more specifically described with reference to the drawings.

Figure 5:
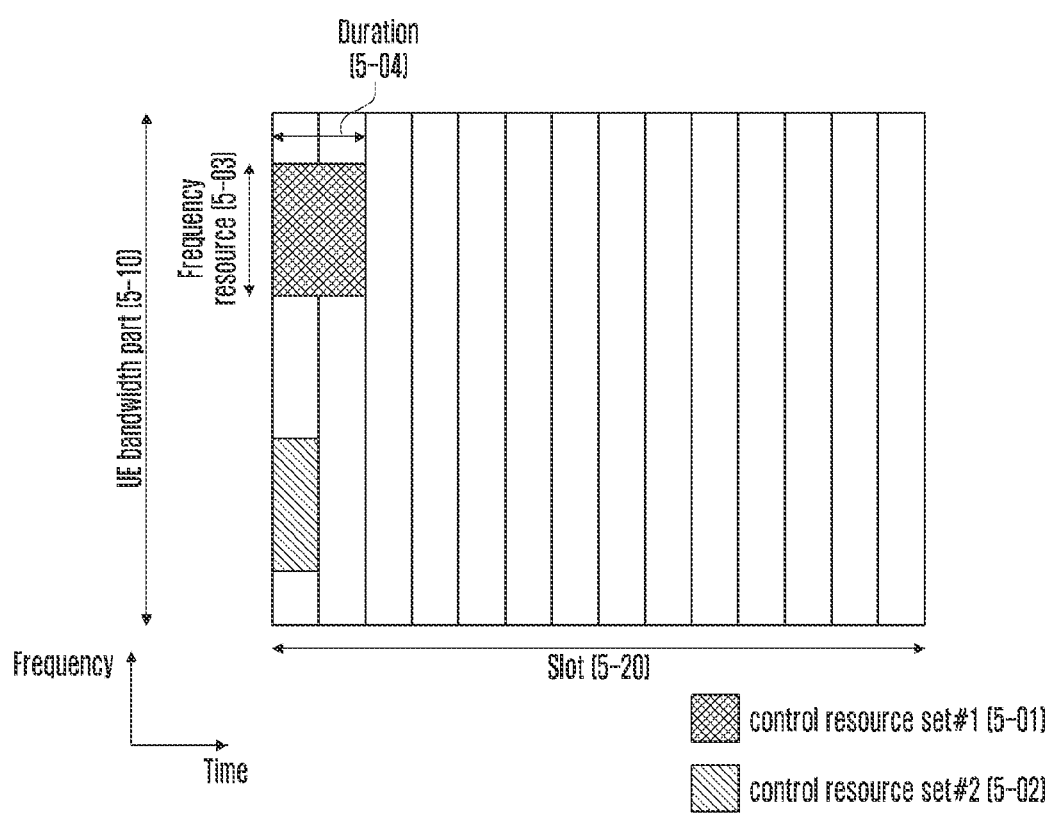
FIG. 5 is a diagram illustrating an example of a configuration of a control region of a downlink control channel in a wireless communication system according to an embodiment of the disclosure.

FIG. 5 is a diagram illustrating an example of a configuration of a control region of a downlink control channel in a wireless communication system according to an embodiment of the disclosure.

FIG. 5 is a diagram illustrating an example of a control region (control resource set, CORESET) in which a downlink control channel is transmitted in a 5G wireless communication system. With reference to FIG. 5, FIG. 5 illustrate an example in which a BWP 5-10 of a terminal is configured in a frequency domain and two control regions (a control region #1 (CORESET #1) 5-01 and a control region #2 (CORESET #2) 5-02) are configured within one slot 5-20 in a time domain. The control regions 5-01 and 5-02 may be configured in a specific frequency resource 5-03 within the entire UE BWP 5-10 in the frequency domain. The control regions 5-01 and 5-02 may be configured as one or multiple OFDM symbols in the time domain, and may be defined as a control region length (control resource set duration 5-04). In the example of FIG. 5, the control region #1 5-01 is configured as control region length having two symbols. The control region #2 5-02 is configured as a control region length having one symbol.

A base station may configure the aforementioned control region in 5G for a terminal through higher layer signaling (e.g., system information, a master information block (MIB), radio resource control (RRC) signaling). To configure the control region for the terminal means that the terminal is provided with information, such as a control region identity, a frequency location of the control region, and a symbol length of the control region. For example, pieces of information in [Table 4] may be included in the information.

TABLE 4

ControlResourceSet :: =                     SEQUENCE{
Corresponds to L1 parameter 'CORESET-ID'
controlResourceSetId                        ControlResourceSetId,
(control region identity)
frequencyDomainResources                    BIT STRING (SIZE
(45)),
(frequency domain resource allocation information)
Duration                                    INTEGER (1..
maxCoReSetDuration),
(time domain resource allocation information)
cce-REG-MappingType                         CHOICE {
(CCE-to-REG mapping method)
interleaved                                 SEQUENCE {
reg-BundleSizes                             ENUMERATED {n2, n3, n6}
(REG bundle size)
precoderGranularity                         ENUMERATED {sameAsREG-buldle,
allContiguous RBs},
interleaverSize                             ENUMERATED {n2, n3, n6}
(interleaver size)
shiftIndex
INTEGER (0..maxNrofPhysicalResourceBlocks-1)
(interleaver shift)
},
nonInterleaved                              NULL
},
tci-StatesPDCCH                             SEQUENCE(SIZE (1..maxNrofTCI-
StatesPDCCH)) OF TCI-StateId                OPTIONAL,
(QCO configuration information)
tci-Present InDCI                           ENUMERATED (enabled)

In [Table 4], the tci-StatesPDCCH (hereinafter named a TCI state) configuration information may include information of one or multiple synchronization signals (SSs)/physical broadcast channel (PBCH) block indices or a channel state information reference signal (CSI-RS) index having a quasi co-located (QCL) relation with a demodulation reference signal (DMRS) transmitted in a corresponding control region.

In a wireless communication system, one or more different antenna ports (or may be substituted with one or more channels, signals and combinations of them, and they are unified and denoted as different antenna ports for convenience sake in a description in the following disclosure) may be associated by the following QCL configuration.

Specifically, the QCL configuration may connect two different antenna ports through a relation between a (QCL) target antenna port and a (QCL) reference antenna port. A terminal may apply (or assume) some of or all statistical characteristics (e.g., large scale parameters of a channel, such as a Doppler shift, Doppler spread, average delay, delay spread, an average gain, and a spatial Rx (or Tx) parameter, to a reception space filter coefficient or transmission space filter coefficient of the terminal) of the channel measured in a reference antenna port upon reception of a target antenna port. The target antenna port means an antenna port that transmits a channel or signal configured by a higher layer configuration including the QCL configuration to an antenna port that transmits a channel or signal to which a TCI state indicative of the QCL configuration is applied. The reference antenna port means an antenna port that transmits a channel or signal specified by a referenceSignal parameter within the QCL configuration.

Specifically, the statistical characteristics of the channel restricted by the QCL configuration (specified by the parameter gel-Type within the QCL configuration) may be classified as follows depending on a QCL type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In this case, the type of QCL type is not limited to the four types, and all possible combinations are not listed in order not to obscure the subject matter of the description.

The QCL-TypeA is a QCL type used when all statistical characteristics measurable in the frequency and time domains are referable because a bandwidth and transmission interval of a target antenna port are sufficient compared to a reference antenna port (i.e., the number of samples and transmission band/time of the target antenna port are greater than the number of samples and transmission band/time of the reference antenna port in both the frequency and time domains).

The QCL-TypeB is QCL type used when a bandwidth of a target antenna port is sufficient in measuring statistical characteristics measurable in the frequency domain, that is, a Doppler shift and Doppler spread.

The QCL-TypeC is a QCL type used when only first-order statistics, that is, a Doppler shift and average delay, are referable because a bandwidth and transmission interval of a target antenna port are insufficient in measuring second-order statistics, that is, Doppler spread and delay spread.

The QCL-TypeD is a QCL type used when space reception filter values used when a reference antenna port is received can be used when a target antenna port is received.

Meanwhile, a base station may configure or indicate a maximum of two QCL configurations in one target antenna port through the following TCI state configuration.

```
QCL-Info :: =  SEQUENCE{
  cell           servCellIndex (a serving cell index in which a QCL reference RS is
transmitted)
  bwp-Id         BWP-Id (a BWP index in which a QCL reference RS is transmitted)
  referenceSignal CHOICE {(an indicator indicating one of a CSI-RS or SS/PBCH block a
a QCL reference RS)
  csi-rs         NZP-CSI-RS-ResourceId,
  ssb            SSB-Index
  },
  Qcl-Type       ENUMERATED (typeA, typeB, typeC, typeD), (QCL type indicator)
}
```

```
TCI-State ::= SEQUENCE {
  tci-StateId    TCI-StatdId, (TCI state indicator)
  qcl-Type1      QCL-Info, (the first QCL configuration for a target antenna port to which
a corresponding TCI state is applied)
  qcl-Type2      QCL-Info, (the second QCL configuration for a target antenna port to
which a corresponding TCI state is applied)
  OPTIONAL,  -- Need R
  ...
}
```

The first QCL configuration among two QCL configurations included in one TCI state configuration may be configured as one of the QCL-TypeA, the QCL-TypeB, and the QCL-TypeC. In this case, a configurable QCL type is specified depending on the type of target antenna port and reference antenna port, and is specifically described below. Furthermore, the second QCL configuration among the two QCL configurations included in the one TCI state configuration may be configured as the QCL-TypeD, and may be omitted according to circumstances. However, this is merely an embodiment of the disclosure, and the first QCL configuration and the second QCL configuration may be configured as at least one of the QCL-type A to the QCL-type D according to circumstances.

Table 4-1 to Table 4-5 below are tables indicating valid TCI state configurations according to target antenna port types.

Table 4-1 illustrates a valid TCI state configuration when the target antenna port is a CSI-RS for tracking (MS), The TRS means an NZP CSI-RS in which a repetition parameter of the CSI-RS is not configured and trs-Info thereof is configured as true. In Table 4-1, a No. 3 configuration may be used for an aperiodic TRS.

TABLE 4-1

Valid TCI state configurations when a target antenna port is a CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 4-2 illustrates valid. TCI state configurations when a target antenna port is a CSI-RS for CSI. The CSI-RS for CSI means an NZP CSI-RS in which a repetition parameter of the CSI-RS is not configured and trs-Info thereof is also not configured as true.

TABLE 4-2

Valid TCI state configurations when a target antenna port is a CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 4-3 illustrates valid TCI state configurations when a target antenna port is a CSI-RS for beam management (having the same meaning as BM, a CSI-RS for L1 RSRP reporting). The CSI-RS for BM means an NZP CSI-RS in which a repetition parameter of the CSI-RS is configured and has an on or off value and trs-Info thereof is not configured as true.

TABLE 4-3

Valid TCI state configurations when a target antenna port is a CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 4-4 illustrates valid TCI state configurations when a target antenna port is a PDCCH DMRS.

TABLE 4-4

Valid TCI state configuration when a target antenna port is a PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 4-5 illustrates valid TCI state configurations when a target antenna port is a PDSCH DMRS.

TABLE 4-5

Valid TCI state configurations when a target antenna port is a PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration methods according to Table 4-1 to 4-5, a target antenna port and a reference antenna port for each step are configured and operated like "SSB"→"TRS"→"CSI-RS for CSI, or CSI-RS for BM, or PDCCH DMRS, or a PDSCH DMRS." Accordingly, a reception operation of a terminal can be helped by associating statistical characteristics measurable from an SSB and a TRS with even antenna ports.

Hereinafter, time and frequency resource allocation methods for data transmission in NR are described.

In NR, the following detailed frequency domain resource allocation (FD-RA) methods may be provided in addition to frequency domain resources candidate allocation through BWP indication.

Figure 6:
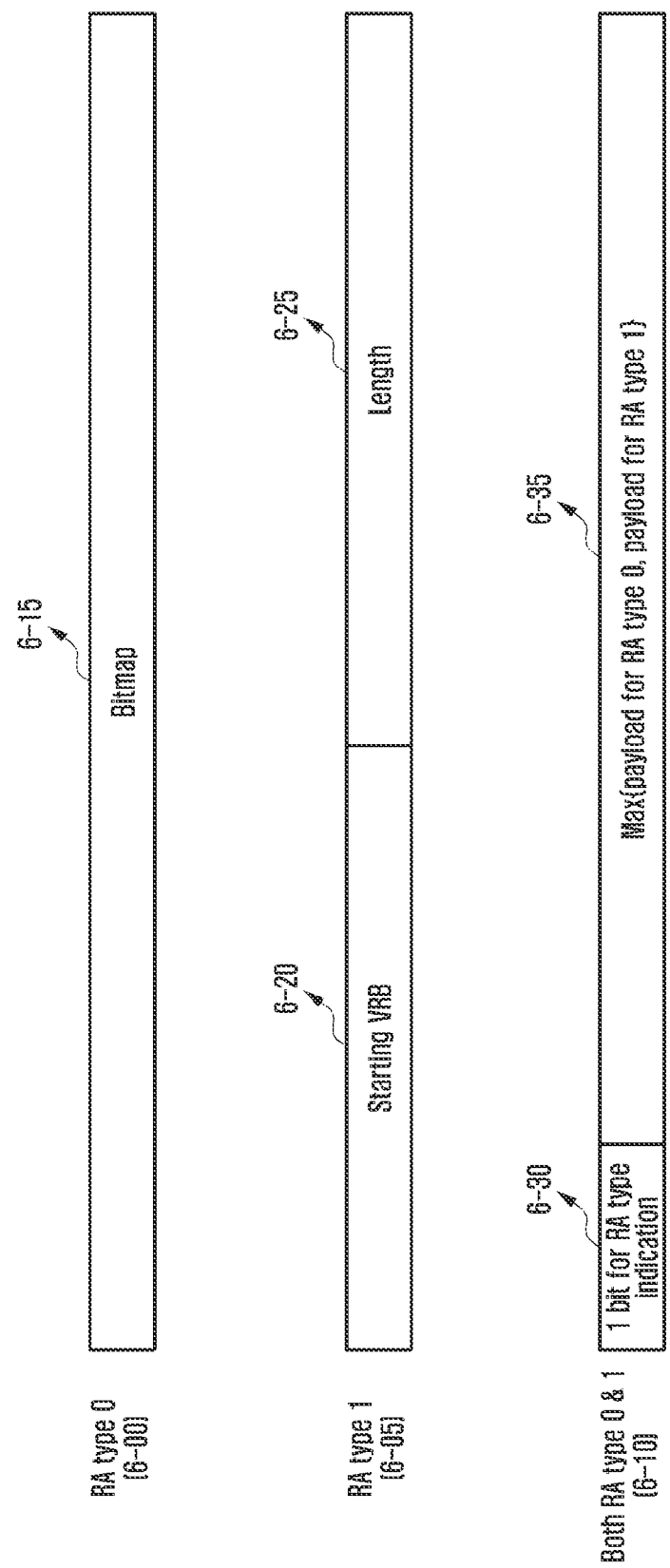
FIG. 6 is a diagram illustrating an example of the allocation of PDSCH frequency domain resources in a wireless communication system according to an embodiment of the disclosure.

FIG. 6 is a diagram illustrating an example of the allocation of PDSCH frequency domain resources in a wireless communication system according to an embodiment of the disclosure.

FIG. 6 is a diagram illustrating three frequency domain resource allocation methods of type 0 6-00, type 1 6-05, and dynamic switch 6-10 which are configurable through higher layer in NR.

With reference to FIG. 6, if a terminal is configured to use only a resource type 0 through higher layer signaling (6-00), some downlink control information (DCI) that allocates a PDSCH to the corresponding terminal has a bitmap composed of NRBG bits. A condition therefor is described again later. In this case, the NRBG means the number of resource block groups (RBGs) determined as in [Table 5] below based on a BWP size allocated by a BWP indicator and a higher layer parameter rbg-Size. Data is transmitted in an RBG indicated as 1 by the bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If a terminal is configured to use only a resource type 1 through higher layer signaling (6-05), some DCI that allocates a PDSCH to the corresponding terminal has frequency domain resource allocation information composed of $\lceil \log_2(N_{RB}^{DL,BWP}(N_{RB}^{DL,BWP}+1)/2) \rceil$ bits. A condition therefor is described again later. Accordingly, a base station may configure a starting VRB 6-20 and the length 6-25 of a frequency domain resource continuously allocated from the staring VRB.

If a terminal is configured to use both the resource type 0 and the resource type 1 through higher layer signaling (6-10), some DCI that allocates a PDSCH to the corresponding terminal has frequency domain resource allocation information composed of bits of a great value 6-35 among the payload 6-15 for configuring the resource type 0 and the payloads 6-20 and 6-25 for configuring the resource type 1. A condition therefor is described again later. In this case, one bit may be added to the foremost part (MSB) of the frequency domain resource allocation information within the DCI. It may be indicated that the resource type 0 is used when a corresponding bit is 0 and the resource type 1 is used when the corresponding bit is 1.

Figure 7:
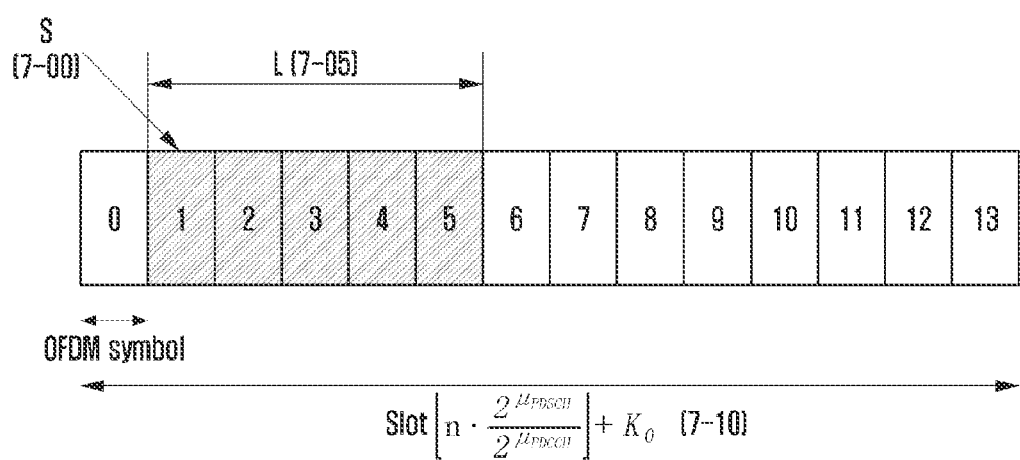
FIG. 7 is a diagram illustrating an example of the allocation of physical downlink shared channel (PDSCH) time domain resources in a wireless communication system according to an embodiment of the disclosure.

FIG. 7 is a diagram illustrating an example of the allocation of physical downlink shared channel (PDSCH) time domain resources in a wireless communication system according to an embodiment of the disclosure.

FIG. 7 is a diagram illustrating an example of time domain resource allocation in NR. With reference to FIG. 7, a base station may indicate time domain locations of PDSCH resources based on a subcarrier spacing (SCS) ($\mu_{PDSCH}, \mu_{PDCCH}$) of a data channel and control channel configured using a higher layer, a scheduling offset ($K_0$) value, and an OFDM symbol start location 7-00 and a length 7-05 within one slot dynamically indicated through DCI.

Figure 8:
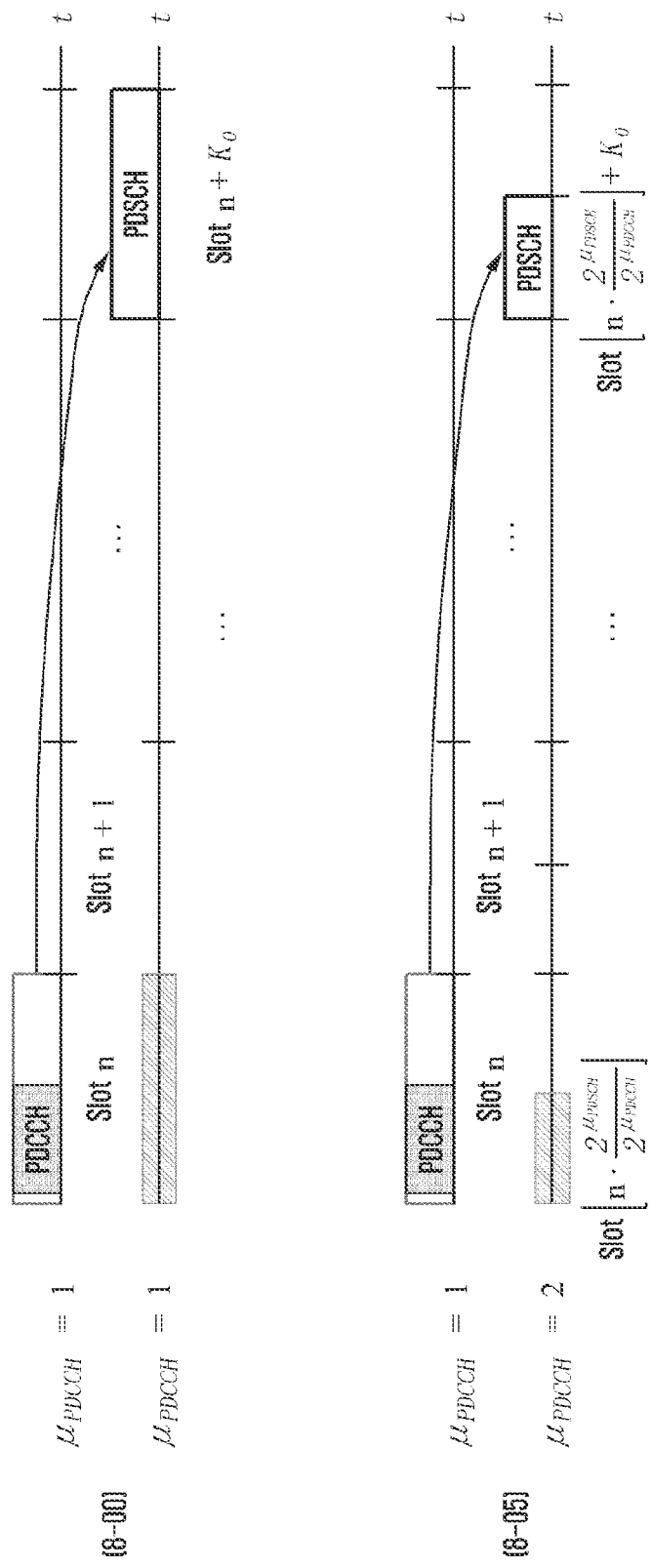
FIG. 8 is a diagram illustrating an example of the allocation of time domain resources according to a subcarrier spacing of a data channel and control channel in a wireless communication system according to an embodiment of the disclosure.

FIG. 8 is a diagram illustrating an example of the allocation of time domain resources according to a subcarrier spacing of a data channel and control channel in a wireless communication system according to an embodiment of the disclosure.

With reference to FIG. 8, it may be seen that if subcarrier spacings of a data channel and a control channel are the same (8-00, $\mu_{PDSCH}=\mu_{PDCCH}$), a base station and a terminal generate scheduling offsets based on a predetermined slot offset $K_0$ because slot numbers for data and control are the same. In contrast, it may be seen that if subcarrier spacings of a data channel and a control channel are different (8-05, $\mu_{PDSCH} \neq \mu_{PDCCH}$), a base station and a terminal generate scheduling offsets based on a predetermined slot offset $K_0$ on the basis of the subcarrier spacing of a PDCCH because slot numbers for data and control are different from each other.

In NR, in order for a terminal to efficiently receive a control channel, DCI formats having various forms are provided as in [Table 6] below depending on purposes.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, a base station may use the DCI format0_0 or the DCI format 0_1 in order to allocate (schedule) a PDSCH to one cell.

The DCI format 0_1 includes at least the following pieces of information if the DCI format 0_1 is transmitted along with CRC scrambled by a cell radio network temporary identifier (C-RNTI) or a configured scheduling RNTI (CS-RNTI) or a new-RNTI:
- Identifier for DCI formats (1 bit): it is a DCI format indicator and is always set as 1
- Frequency domain resource assignment ($N_{RBG}$ bits or $\lceil \log_2(N_{RB}^{DL,BWP}(N_{RB}^{BWP}+1)/2) \rceil$ bits): it indicates frequency domain resource allocation, $N_{RB}^{DL,BWP}$ is the size of an active DL BWP if DCI format 1_0 is monitored in a UE-specific search space, and $N_{RB}^{DL,BWP}$ is the size of an initial DL BWP in other cases. $N_{RBG}$ is the number of resource block groups. For a detailed method, reference is made to the frequency domain resource allocation.
- Time domain resource assignment (0 to 4 bits): indicates time domain resource allocation according to the description.
- VRB-to-PRB mapping (1 bit): indicates non-interleaved when the VRB-to-PRB mapping is 0 and interleaved VRP-to-PRB mapping when the VRB-to-PRB mapping is 1.
- Modulation and coding scheme (5 bits): indicates a modulation order and coding rate used for PDSCH transmission.

New data indicator (1 bit): indicates whether a PDSCH is initial transmission or retransmission depending on whether the new data indicator is toggled.

Redundancy version (2 bits): indicates a redundancy version used for PDSCH transmission.

HARQ process number (4 bits): indicates a HARQ process number used for PDSCH transmission.

Downlink assignment index (2 bits): a DAI indicator

TPC command for scheduled PUCCH (2 bits): a PUCCH power control indicator

PUCCH resource indicator (3 bits): it is as a PUCCH resource indicator and indicates one of eight resources configured through a higher layer.

PDSCH-to-HARQ_feedback timing indicator (3 bits): it is a HARQ feedback timing indicator and indicates one of eight feedback timing offset configured through a higher layer.

The DCI format 1_1 includes at least the following pieces of information if DCI format 1_1 is transmitted along with CRC scrambled by a cell radio network temporary identifier (C-RNTI) or a configured scheduling RNTI (CS-RNTI) or a new-RNTI:

Identifier for DCI formats (1 bit): it is a Del format indicator and is always set as 1

Carrier indicator (0 or 3 bits): indicates a CC (or a cell) in which a PDSCH allocated by corresponding DCI is transmitted.

Bandwidth part indicator (0 or 1 or 2 bits): indicates a BWP in which a PDSCH allocated by corresponding DCI is transmitted.

Frequency domain resource assignment (determine a payload based on frequency domain resource allocation): it indicates frequency domain resource allocation, and $N_{RB}^{DL,BWP}$ is the size of an active DL BWP. For a detailed method, reference is made to the frequency domain resource allocation.

Time domain resource assignment (0 to 4 bits): indicates time domain resource allocation based on the description.

VRB-to-PRB mapping (0 or 1 bit): indicates non-interleaved when the VRB-to-PRB mapping is 0 and interleaved VRP-to-PRB) mapping when the VRB-to-PRB mapping is 1. The VRB-to-PRB mapping is 0 bit if frequency domain resource allocation is configured as a resource type 0.

PRB bundling size indicator (0 or 1 bit): it is 0 bit if a higher layer parameter prb-BundlingType is not configured or configured as "static", and 1 bit if the higher layer parameter prb-BundlingType is configured as "dynamic."

Rate matching indicator (0 or 1 or 2 bits): indicates a rate matching pattern.

ZP CSI-RS trigger (0 or 1 or 2 bits): an indicator that triggers an aperiodic ZP CSI-RS.

For transport block 1:

Modulation and coding scheme (5 bits): indicates a modulation order and coding rate used for PDSCH transmission.

New data indicator (1 bit): indicates whether a PDSCH is initial transmission or retransmission depending on whether the new data indicator is toggled.

Redundancy version (2 bits): indicates a redundancy version used for PDSCH transmission, For transport block 2:

Modulation and coding scheme (5 bits): indicates a modulation order and coding rate used for PDSCH transmission, New data indicator (1 bit): indicates whether a PDSCH is initial transmission or retransmission depending on whether the new data indicator is toggled.

Redundancy version (2 bits): indicates a redundancy version used for PDSCH transmission.

HARQ process number (4 bits): indicates a HARQ process number used for PDSCH transmission, Downlink assignment index (0 or 2 or 4 bits): a DAI indicator TPC command for scheduled PUCCH (2 bits): a PUCCH power control indicator PUCCH resource indicator (3 bits): it is a PUCCH resource indicator and indicates one of eight resources configured through a higher layer.

PDSCH-to-HARQ_feedback timing indicator (3 bits): it is a HARQ feedback timing indicator and indicates one of eight feedback timing offsets configured through a higher layer.

Antenna port (4 or 5 or 6 bits): indicates a DMRS port and a CDM group without data, Transmission configuration indication (0 or 3 bits): a TCI indicator.

SRS request (2 or 3 bits): an SRS transmission request the indicator

CBG transmission information (0) or 2 or 4 or 6 or 8 bits): an indicator that provides notification of the transmission of code block groups within an allocated. PDSCH. 0 means that a corresponding CBG is not transmitted, and 1 means that that the corresponding CBG is transmitted.

CBG flushing out information (0 or 1 bit): an indicator that provides notification of whether previous CBGs are contaminated. The CBG flushing out information means that previous CBGs might have been contaminated when the CBG flushing out information is 0, and may be used (combinable) upon retransmission reception when the CBG flushing out information is 1.

DMRS sequence initialization (0 or 1 bit): a DMRS scrambling ID selection indicator The number of pieces of DCI having different sizes which may be received per slot in a corresponding cell by a terminal is a maximum of 4. The number of pieces of DCI having different sizes, which are scrambled by a C-RNTI and may be received per slot in a corresponding cell by a terminal, is a maximum of 3.

In this case, antenna port indication may be indicated through [Table 7] to [Table 10] below.

TABLE 7

An antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 to 15 | Reserved | Reserved |

TABLE 8

An antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 9

An antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |

TABLE 9-continued

| | An antenna port(s) (1000 + DMRS port), dmrs-Type = 2, maxLength = 1 | | | | |
|---|---|---|---|---|---|
| | One codeword: Codeword 0 enabled, Codeword 1 disabled | | Two codewords: Codeword 0 enabled, Codeword 1 enabled | | |
| Value | Number of DMRS CDM group(s) without data | DMRS port(s) | Value | Number of DMRS CDM group(s) without data | DMRS port(s) |
| 21 | 3 | 3-5 | | | |
| 22 | 3 | 0-3 | | | |
| 23 | 2 | 0, 2 | | | |
| 24-31 | Reserved | Reserved | | | |

TABLE 10

| | Antenna port(s) (1000 + DMRS port), dmrs-Type = 2, maxLength = 2 | | | | | | |
|---|---|---|---|---|---|---|---|
| | One codeword: Codeword 0 enabled, Codeword 1 disabled | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |

TABLE 10-continued

Antenna port(s) (1000 + DMRS port), dmrs-Type = 2, maxLength = 2

| | One codeword:<br>Codeword 0 enabled,<br>Codeword 1 disabled | | | | Two Codewords:<br>Codeword 0 enabled,<br>Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

[Table 7] is a table used when dmrs-type is indicated as 1 and maxLength is indicated as 1.

[Table 8] is a table used when dmrs-Type=1 and maxLength=2 are indicated. A port of a DMRS is indicated using [Table 9] in the case of dmrs-type=2 and maxLength=1 and [Table 10] if drms-type is 2 and maxLength is 2. In [Table 7] to [Table 10], numbers 1, 2, and 3 mean respective CDMR groups {0}, {0, 1}, and {0, 1, 2} indicated by "number of DMRS CDM group(s) without data." A DMRS port(s) is one(s) in which the indices of ports used are sequentially placed. An antenna port is indicated as a DMRS port+1000. A CDM group of a DMRS is connected to a method of generating a DMRS sequence and an antenna port as in [Table 11] and [Table 12]. [Table 11] illustrates parameters if dmrs-type=1 is used, and [Table 12] illustrates parameters if dmrs-type=2 is commonly used.

TABLE 11

Parameters for a PDSCH DMRS dmrs-type = 1.

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

Parameters for a PDSCH DMRS dmrs-type = 2.

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |

TABLE 12-continued

Parameters for a PDSCH DMRS dmrs-type = 2.

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The sequence of a DMRS according to each parameter is determined by [Equation 1] below.

$$a_{k,l}^{(p,\mu)} = \beta_{PDSCH}^{DMRS} w_f(k') w_t(l') r(2n + k') \quad \text{[Equation 1]}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

In [Table 7] and [Table 8], if only one codeword is enabled, Nos. 2, 9, 10, 11, and 30 rows are used for only single user MIMO. That is, in this case, a terminal may not perform a multi-user MIMO reception operation, such as cancelling, nulling or whitening multi-user interference, without assuming that another terminal has been co-scheduled.

In [Table 9] and [Table 10], if only one codeword is enabled, Nos. 2, 10, and 23 rows are used for only single user MIMO. That is, in this case, a terminal may not perform a multi-user MIMO reception operation, such as cancelling, nulling or whitening multi-user interference, without assuming that another terminal has been co-scheduled.

Figure 9:
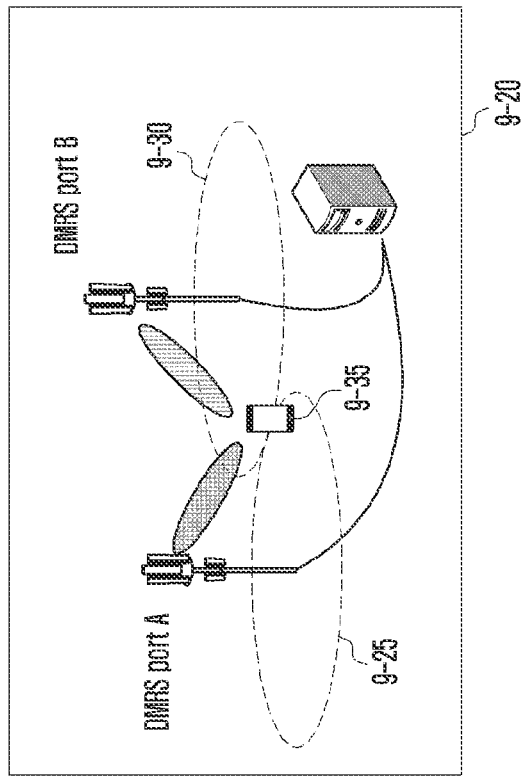
FIG. 9 is a diagram illustrating an example of a constitution of cooperative communication antenna ports according to an embodiment of the disclosure.
Figure 9:
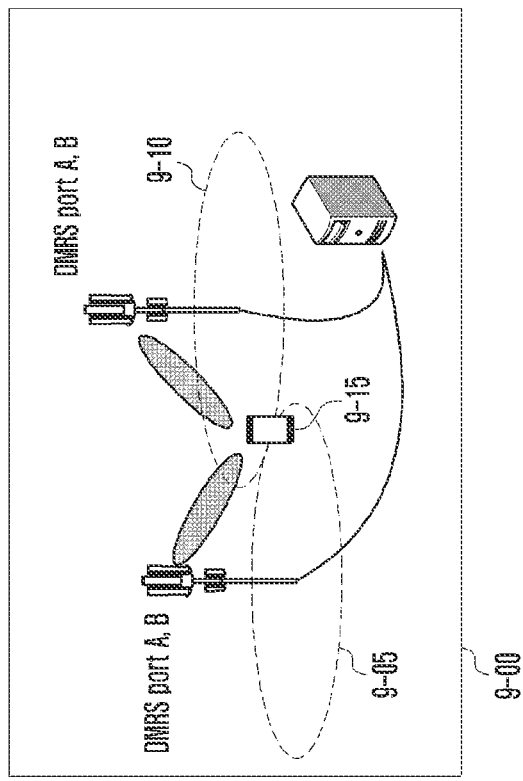

FIG. 9 is a diagram illustrating an example of a constitution of cooperative communication antenna ports according to an embodiment of the disclosure.

With reference to FIG. 9, an example of a joint transmission (JT) scheme and wireless resource allocation for each TRP according to a condition is illustrated.

In FIG. 9, 9-00 is a diagram illustrating coherent joint transmission (C-JT) supporting coherent precoding between cells, TRPs and/or beams.

In C-JT, a transmission reception point (TRP) A 9-05 and a TRP B 9-10 transmit the same data (PDSCH), and multiple TRPs perform joint precoding. This may mean that the TRP A 9-05 and the TRP B 9-10 transmit the same DMRS ports (e.g., the MFRS ports A and B in both the two TRPs) for transmitting the same PDSCH. In this case, a terminal may receive one piece of DCI information for receiving one PDSCH demodulated based on a DMRS transmitted through the DMRS ports A and B.

In FIG. 9, 9-20 is a diagram illustrating non-coherent JT (NC-JT) supporting non-coherent precoding between cells, TRPs and/or beams. In the case of NC-JT, the cells, the TRPS and/or the beams may transmit different PDSCHs, and individual precoding may be applied to each PDSCH. This may mean that a TRP A 9-25 and a TRP B 9-30 transmit different DMRS ports (e.g., the TRP A transmits a DMRS port A, and the TRP B transmits a DMRS port B) for transmitting different PDSCHs. In this case, a terminal may receive two types of DCI information for receiving a PDSCH A demodulated based on a MARS transmitted through the DMRS port A and a PDSCH B demodulated based on a DMRS transmitted through another DMRS port B.

In order to support NC-JT in which two or more transmission points simultaneously provides data to a terminal, it is necessary to allocate PDSCHs transmitted by two (or more) different transmission points through a single PDCCH or to allocate PDSCHs transmitted by two or more different transmission points through multiple PDCCHs. A terminal may obtain a quasi co-location (QCL) connection relation between reference signals or channels based on L1/L2/L3 signaling and may efficiently estimate large scale parameters of the reference signals or channels based on the QCL connection relation. If transmission points of reference signals or channels are different from each other, it is difficult for large scale parameters to be shared. Accordingly, when performing cooperative transmission a base station may need to simultaneously notify a terminal of quasi co-location information for two or more transmission points through two or more TCI states. If non-coherent cooperative transmission is supported through multiple PDCCHs, that is, if two or more PDSCHs are allocated to the same serving cell and the same BWP at the same timing through two or more PDCCHs, two or more TCI states may be allocated to PDSCH to DMRS ports through PDCCHs, respectively. In contrast, if non-coherent cooperative transmission is supported through a single PDCCH, that is, if two or more PDSCHs are allocated to the same serving cell and the same BWP at the same timing through one PDCCH, two or more TCI states may be allocated to PDSCHs to DMRS ports, respectively, through one PDCCH.

If it is assumed that DMRS ports allocated to a terminal at specific timing are divided into a DMRS port group A transmitted by transmission points A and a DMRS port group B transmitted by transmission points B, two or more TCI states may be associated with the DMRS port groups, so that a channel may be estimated based on a different QCL assumption for each group. Meanwhile, different DMRS ports may be subjected to code division multiplexing (CDM) or frequency division multiplexing (FDM) or time domain multiplexing (TDM) in order to increase channel measurement accuracy and also reduce a transmission burden. If the CDM-ed DMRS ports are collectively called a CDM group, code-based multiplexing well operates in the DMRS ports within the CDM group if channel characteristics for each port are similar (i.e., the DMRS ports are well distinguished from one another by an orthogonal cover code (OCC) if channel characteristics for each port are similar). It may be important that DMRS ports present in the same CDM group do not have different TCI states. The disclosure provides a method of indicating, for a terminal, a DMRS port and a CDM group without data for satisfying the characteristic.

Meanwhile, in the disclosure, for convenience of description, a process of transmitting control information through a PDCCH may be represented as transmitting a PDCCH. It may be represented that a process of transmitting data through a PDSCH is to transmit a PDSCH.

Hereinafter, for convenience of description, [Table 7] to [Table 12] are referred to "first antenna port indication (or conventional antenna port indication)", and a table in which some or all of the code points in [Table 7] to [Table 12] are modified is referred to as "second antenna port indication (new antenna port indication)." Furthermore, a DMRS port and a CDM group without data allocation is named DMRS allocation.

A terminal may identify the number of antenna ports used upon PDSCH transmission through a table indicating a DMRS port. In the case of DCI format 1_1, a rel-15-based antenna port indication method may be based on an index having a 4 to 6-bit length, which is indicated in an antenna port field within DCI. Accordingly, an antenna port may be determined. The terminal may identify information on the number of DMRS ports for a PDSCH and indices thereof, the number of front-load symbols, the number of CDM groups based on an indicator (index) transmitted by a base station. Furthermore, the terminal may identify a change in a dynamic beamforming direction based on information of a transmission configuration indication (TCI) field within DCI 1_1. If tci-PresentDCI is configured as "enabled" through a higher layer, the terminal may identify TCI states activated in a DL BMP or a scheduled component carrier and the direction of a beam associated with a DL-RS by identifying a TCI field of 3-bit information. On the contrary, if tci-PresentDCI has been disabled, it may be taken into consideration that there is no change in the direction of a beam of beamforming.

In various embodiments of the disclosure, a scenario in which PDSCHs transmitted by two (or more) different transmission points are allocated through a single PDCCH is taken into consideration. A rel-15 terminal receives a PDSCH stream including a single or a plurality of layers QCLed based on TCI information and antenna port information within a single PDCCH. In contrast, an rel-16 terminal may receive data transmitted by a multi-TRP or a plurality of base stations in a C-JT/NC-JT form. In order to support the C-JT/NC-JT, the rel-16 terminal requires a basic higher layer configuration. Specifically, for the higher layer configuration, the terminal requires a process of receiving a C-JT/NC-JT-related parameter or a setting value, etc. and setting the C-JT/NC-JT-related parameter or the setting value, etc.

Embodiment 1

The disclosure proposes a separate DMRS port table having an object of transmitting and receiving C-JT/NC-JT transmission signaling with respect to a base station and terminal supporting C-JT/NC-JT. The proposed DMRS port table may be classified as a table separated from a DMRS port table indicated in an antenna port field indicated based on DCI format 1_1. As a method for distinguishing between the proposed DMRS port table and the DMRS port table proposed in the rel-15, a base station and a terminal may previously configure information whether NC-JT transmission is supported in an RRC configuration, That is, a field, such as C-JT/NC-JT transmission=enabled/disabled, may be configured through an RRC configuration. Whether C-JT/ NC-JT is supported may be identified based on the field.

If "C-JT/NC-JT transmission=enabled" is configured through a higher layer, a field required to be used by a terminal may be indicated using the existing antenna port field within DCI format 1_1. Alternatively, information of at least one of a detailed DMRS port number in NC-JT transmission, the number of DMRS CDM group(s) other than data, a (maximum) number of front-loaded symbols, and a DMRS-type may be indicated using a separate field other than a separate antenna port field within DCI format 1_1.

[Table 12-1] to [Table 12-4] propose DMRS ports so that DMRS ports transmitted by the same TRP are transmitted in the same CDM group on the basis of a CDM group described with reference to [Table 11], [Table 12-1] to [Table 12-4] are indicated as a meaning in which the left and the right are classified as different TRP transmission and different CDM group mapping on the basis of a semicolon (;), but may be omitted according to embodiments. Furthermore, the order of values included in the table may be changed on the basis of the semicolon (;). Furthermore, DMRS ports described in the table illustrate a case where each of a first TRP and a second TRP supports a maximum of two DMRS ports. Furthermore, concepts, such as a basic DMRS port, a type, the number of front-loaded symbols, etc. described with reference to [Table 7] to [Table 10] may be identically applied.

As in [Table 12-1], a DMRS port table having a C-JT/ NC-JT purpose may support different types of ports separately from ports not supported in rel-15.

For example, when a base station indicates an entry (or may also be represented as a value) 0 for a terminal, the terminal may identify that a first TRP and a second TRP transmit DMRSs through a DMRS port 0 and a DMRS port 2. Furthermore, the terminal that has identified that the number of ports is 1 may identify that single layer transmission is performed by the first TRP and the second TRP.

When a base station indicates an entry 1 for a terminal, the terminal may identify that a first TRP and a second TRP transmit DMRSs through a DMRS port 1 and a DMRS port 3, Furthermore, the terminal that has identified that the number of ports is 1 may identify that single layer transmission is performed by the first TRP and the second TRP, The entry 1 has a port number different from that of the entry 0, but is functionally similar thereto and may be omitted from the table because it is considered as being redundant with the entry 0.

When a base station indicates an entry 2 for a terminal, the terminal may identify that a first TRP transmits a DMRS through DMRS ports 0 and 1 and a second TRP transmits a DMRS through a DMRS port 2. Furthermore, the terminal that has identified that the number of ports is 2 and 1 may identify that two-layer transmission is performed in the first IRP and single layer transmission is performed in the second TRP.

When a base station indicates an entry 3 for a terminal, the terminal may identify that in the base station, a first TRP transmits a DMRS through a DMRS port 0 and the remaining one second. TRP transmits a DMRS through DMRS ports 2 and 3. Furthermore, the terminal that has identified that the number of ports is 1 and 2 may identify that single layer transmission is performed in the first TRP and two-layer transmission is performed in the remaining second TRP.

An operation of a base station and a terminal for entries 4 and 5 may be easily understood from the entries 2 and 3. The entry 4 and entry 5 have port numbers different from those of the entry 2 and the entry 3, but are functionally similar thereto and may be omitted from the table.

When a base station indicates an entry 6 for a terminal, the terminal may identify that a first TRP transmits a DMRS through DMRS ports 0 and 1 and the remaining second TRP transmits a DMRS through DMRS ports 2 and 3. Furthermore, the terminal that identified that the number of ports of each of the first and second TRPs is 2 may identify that two-layer transmission is performed in the first TRP and two-layer transmission is performed in the remaining second TRP.

[Table 12-1] lists, in an entry form, embodiments among various cases where a base station and a terminal communicate with each other. Some or all of the seven entries may be applied to an actual system. Furthermore, another table composed of at least one of the entries included in [Table 12-1] may be used. Furthermore, in [Table 12-1], a case where a base station transmits one codeword to a terminal has been described. [Table 12-1] may also be similarly applied to a case where a base station transmits two or more codewords.

[Table 12-2] describes a case where maxLength=2 different in the same DMRS type 1 described in [Table 12-1]. With reference to [Table 7] to [Table 8], a DMRS port configuration for C-JT/NC-JT may be mapped in the same form as maxLength=1 up to DMRS ports 0 to 3.

[Table 12-3] is a DMRS port table for transmitting C-JT/ NC-JT having a DMRS type 2 different from the DMRS type 1 described with reference to [Table 12-1]. [Table 12-3] supports a maximum of 12 DMRS ports, and is a structure suitable for a MU-MIMO form.

For example, when a base station indicates an entry 1 for a terminal, the terminal may identify that a first TRP and a second TRP transmit DMRSs through a DMRS port 0 and a DMRS port 2, respectively. Furthermore, the terminal that has identified that the number of ports is 1 may identify that single layer transmission is performed by each of the first TRP and the second TRP.

The entries in [Table 12-3] illustrate a case where the number of DMRS CDM groups is 2 and 3 at once. [Table 12-3] does not exclude that the case where the number of DMRS CDM groups is 2 and 3 is indicated in divided entries. The embodiments are listed in an entry form, and some or all of the 14 entries may be applied to an actual system. For example, a table may be determined by only some of the entries, that is, the entries 0, 2, 3, 6, 7, 9, 10, and 13. Furthermore, in the embodiment, the order of the entries is merely an embodiment and does not limit the disclosure. Furthermore, the table describes a case where a base station transmits one codeword to a terminal, and may be similarly applied to a case where a base station transmits two or more codewords to a terminal.

[Table 12-4] describes a case where maxLength=2 different in the same DMRS type 2 described with reference to [Table 12-3]. With reference to [Table 7] to [Table 8], in a DMRS port configuration for C-JT/NC-JT, a total of 2 to 4 DMRS ports are allocated, and minimum one DMRS port is allocated to each CDM group. If the number of front-loaded symbols is one, DMRS ports 0 to 3 are allocated depending on the number of front-loaded symbols (omitted because this is the same as [Table 12-3]). If the number of front-loaded symbols is two. DMRS ports 0 to 7 may be allocated. If a total of two DMRS ports are used, a frequency domain orthogonal cover code (OCC) of each CDM group needs to be the same.

Meanwhile, time domain OCCs of respective CDM groups may be identical with or different from each other. For example, DMRS ports 0 and 2 using the same time domain OCC in each of CDM groups {0,1,} may also be simultaneously used. DMRS ports 0 and 6 using different time domain OCCs may also be simultaneously used. If a total of three or more DMRS ports are used, in this case, time domain OCCs applied to respective CDM groups {0,1} may be identical with or different from each other. The embodiments are listed in an entry form, and some or all of the 28 entries may be applied to an actual system.

For example, a table may be determined by only some of the entries, that is, the entries 0, 2, 3, 6, 7, 9, 10, 13 or 0, 2, 3, 6, 7, 9, 10, 13, 14, 16, 17, 20, 23, 24, 27. Furthermore, in the embodiment, the order of the entries is merely an embodiment and does not limit the disclosure. Furthermore, the table describes a case where a base station transmits one codeword to a terminal, and may also be similarly applied to a case where a base station transmits two or more codewords.

TABLE 12-1

A DMRS indication table for an antenna port(s)
(1000 + DMRS port), dmrs-Type = 1, maxLength = 1
One Codeword (dmrs-Type = 1, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |

TABLE 12-2

A DMRS indication table for an antenna port(s)
(1000 + DMRS port), dmrs-Type = 1, maxLength = 2
One Codeword (dmrs-Type = 1, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |

TABLE 12-3

A DMRS indication table for an antenna port(s)
(1000 + DMRS port), dmrs-Type = 2, maxLength = 1
One Codeword (dmrs-Type = 2, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |

TABLE 12-3-continued

A DMRS indication table for an antenna port(s)
(1000 + DMRS port), dmrs-Type = 2, maxLength = 1
One Codeword (dmrs-Type = 2, maxLength = 1)

| Entries | Number of DMRS CDM group(s) without data | DMRS port(s) | Number of front-load symbols |
|---|---|---|---|
| 5 | 2 | 0, 1; 3 | 1 |
| 6 | 2 | 0, 1; 2, 3 | 1 |
| 7 | 3 | 0; 2 | 1 |
| 8 | 3 | 1; 3 | 1 |
| 9 | 3 | 0, 1; 2 | 1 |
| 10 | 3 | 0; 2, 3 | 1 |
| 11 | 3 | 1; 2, 3 | 1 |
| 12 | 3 | 0, 1; 3 | 1 |
| 13 | 3 | 0, 1; 2, 3 | 1 |

TABLE 12-4

A DMRS indication table for an antenna port(s)
(1000 + DMRS port), dmrs-Type = 2, maxLength = 2
One Codeword (dmrs-Type = 2, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |
| 7 | 3 | 0; 2 | 2 |
| 8 | 3 | 1; 3 | 2 |
| 9 | 3 | 0, 1; 2 | 2 |
| 10 | 3 | 0; 2, 3 | 2 |
| 11 | 3 | 1; 2, 3 | 2 |
| 12 | 3 | 0, 1; 3 | 2 |
| 13 | 3 | 0, 1; 2, 3 | 2 |
| 14 | 2 | 6; 8 | 2 |
| 15 | 2 | 7; 9 | 2 |
| 16 | 2 | 6, 7; 8 | 2 |
| 17 | 2 | 6, 8; 9 | 2 |
| 18 | 2 | 7; 8, 9 | 2 |
| 19 | 2 | 6; 7, 9 | 2 |
| 20 | 2 | 6, 7; 8, 9 | 2 |
| 21 | 3 | 6; 8 | 2 |
| 22 | 3 | 7; 9 | 2 |
| 23 | 3 | 6, 7; 8 | 2 |
| 24 | 3 | 6, 8; 9 | 2 |
| 25 | 3 | 7; 8, 9 | 2 |
| 26 | 3 | 6; 7, 9 | 2 |
| 27 | 3 | 6, 7; 8, 9 | 2 |

Embodiment 2

[Table 13-1] proposes a method using a codepoint having a reserved bit on the existing rel-15 as a method of indicating, by a base station, a DMRS port, for a terminal for the C-JT/NC-JT transmission. As in [Table 7], a rel-15 DMRS port table uses the fields 0 to 11 and the fields 12 to 15 are not used as reserved bits. In an embodiment of the disclosure, as in [Table 13-1], DMRS ports for cooperative transmission transmitted by two TRPs may be indicated using four codepoints 12 to 15 in a DMRS port table. If the same reserved bits are used as described above, DCI resources can be more efficiently used because a base station and a terminal do not need to allocate a separate field.

For example, when a base station indicates an entry 12 for a terminal, the terminal may identify that a first TRP and a second TRP transmit DMRSs through a MARS port 0 and a DMRS port 2. Furthermore, the terminal that has identified that the number of ports is 1 may identify that single layer transmission is performed by the first TRP and the second TRP.

Furthermore, for example, when a base station indicates an entry 13 for a terminal, the terminal may identify that a first TRP transmits a DMRS through DMRS ports 0 and 1 and a second TRP transmits a DMRS through a DMRS port 2. Furthermore, the terminal that has identified that the numbers of ports are 2 and 1 may identify that two-layer transmission is performed by the first TRP and single layer transmission is performed by the second TRP.

Furthermore, for example, when a base station indicates an entry 14 for a terminal, the terminal may identify that a first TRP transmits a DMRS through a DMRS port 0 and the remaining one second TRP transmits a DMRS through DMRS ports 2 and 3. Furthermore, the terminal that has identified that the numbers of ports are 1 and 2 may identify that single layer transmission is performed by the first TRP and two-layer transmission is performed by the remaining second TRP.

Furthermore, for example, when a base station indicates an entry 15 for a terminal, the terminal may identify that a first TRP transmits a DMRS through DMRS ports 0 and 1 and the remaining second TRP transmits a DMRS through DMRS ports 2 and 3. Furthermore, the terminal that has identified the number of ports of each of the first and second TRPs is two may identify that two-layer transmission is performed in the first TRP and two-layer transmission is performed in the remaining second TRP.

In this case, a terminal in which C-JT/NC-JT transmission=enabled is configured through a higher layer may identify the remaining codepoint of the existing antenna port field within DCI format 1_1, and may identify whether to perform C-JT/NC-JT transmission by using a dynamic method. That is, if an antenna port, field within DCI format 1_1_1 is 12 to 15, the terminal may identify the number of TRPs used for the transmission of a PDSCH scheduled in DCI, the number of transmission layers, the number of DMRS DCM groups without data, the number of front-loaded symbols, etc. The embodiments are listed in an entry form, and some or all of the four entries may be applied to an actual system. In the embodiment, the order of the entries is merely an embodiment and does not limit the disclosure.

For example, [Table 13-2] to [Table 13-4] are embodiments in which some of DMRS ports separately generated in [Table 12-2] to [Table 12-4] are added to [Table 8] to [Table 10] defined in the rel-15 standard. A redundant DMRS port is omitted from [Table 13-2] to [Table 13-4] in order to reduce a bit size, if possible. The omission is merely an embodiment. A table may be completed by additionally using some or all of the DMRS ports indicated in [Table 12-1] to [Table 12-4]. Furthermore, a base station may perform a downlink MU-MIMO operation by scheduling JT for a rel-16 NC-JT terminal and simultaneously scheduling single port transmission in the same DMRS port for a rel-15 terminal as in [Table 12-1] to [Table 13-4].

Furthermore, for example DMRS port indices are the same in some of the entries in [Table 13-1] to [Table 13-4], a redundant index may be omitted. That is, in [Table 13-1], the entries 12, 13, and 15 for NC-JT transmission have the same port indices as the entries 11, 9, and 10 and thus may be omitted. Furthermore, in [Table 13-2], entries 31, 32, and 34 have the same port indices as entries 11, 9, and 10 for NC-JT transmission and thus may be omitted. Furthermore, in [Table 13-3], entries 24, 25, 27, 29, and 31 for NC-JT transmission have the same port indices as entries 23, 9, 10, 29, and 22 and thus may be omitted. Furthermore, in [Table 13-3], entries 24, 25, 27, 29, and 31 for NC-JT transmission have the same port indices as entries 23, 9, 10, 29, and 22 and thus may be omitted. Furthermore, in [Table 13-4], entries 58, 59, 61, 63, and 65 for NC-JT transmission have the same port indices as entries 23, 9, 10, 20, and 22 and thus may be omitted. If an index is omitted, a redundant entry may be omitted based on one of an assumption that at least different CDM group is not transmitted within the same port for NC-JT, an assumption that a terminal can identify a DMRS port for NC-JT because whether to perform NC-JT is indicated in a TCI field, and an assumption that DMRS ports may be distinguished from each other based on the reception of a MAC CE message and the reception of DCI.

TABLE 13-1

A DMRS indication table for an antenna port(s)
(1000 + DMRS port), dmrs-Type = 1, maxLength = 1
One Codeword:
Codeword 0 enabled,
Codeword 1 disabled

| Entry | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0; 2 |
| 13 | 2 | 0, 1; 2 |
| 14 | 2 | 0; 2, 3 |
| 15 | 2 | 0, 1; 2, 3 |

TABLE 13-2

A DMRS indication table for an antenna port(s)
(1000 + DMRS port), dmrs-Type = 1, maxLength = 2
One Codeword:
Codeword 0 enabled,
Codeword 1 disabled

| Entry | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |

TABLE 13-2-continued

A DMRS indication table for an antenna port(s)
(1000 + DMRS port), dmrs-Type = 1, maxLength = 2
One Codeword:
Codeword 0 enabled,
Codeword 1 disabled

| Entry | Number of DMRS CDM group(s) without data | DMRS port(s) | Number of front-load symbols |
|---|---|---|---|
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | 2 | 0; 2 | 1 |
| 32 | 2 | 0, 1; 2 | 1 |
| 33 | 2 | 0; 2, 3 | 1 |
| 34 | 2 | 0, 1; 2, 3 | 1 |
| 35 | 2 | 0; 2 | 2 |
| 36 | 2 | 0, 1; 2 | 2 |
| 37 | 2 | 0; 2, 3 | 2 |
| 38 | 2 | 0, 1; 2, 3 | 2 |
| 39 | Reserved | Reserved | Reserved |

TABLE 13-3

A DMRS indication table for an antenna port(s)
(1000 + DMRS port), dmrs-Type = 2, maxLength = 1
One codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24 | 2 | 0; 2 |
| 25 | 2 | 0, 1; 2 |
| 26 | 2 | 0; 2, 3 |
| 27 | 2 | 0, 1; 2, 3 |
| 28 | 3 | 0; 2 |
| 29 | 3 | 0, 1; 2 |
| 30 | 3 | 0; 2, 3 |
| 31 | 3 | 0, 1; 2, 3 |

TABLE 13-4

A DMRS indication table for an antenna port(s)
(1000 + DMRS port), dmrs-Type = 2, maxLength = 2
One codeword:
Codeword 0 enabled,
Codeword 1 disabled

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 3 | 0 | 1 |
| 12 | 3 | 1 | 1 |
| 13 | 3 | 2 | 1 |
| 14 | 3 | 3 | 1 |
| 15 | 3 | 4 | 1 |
| 16 | 3 | 5 | 1 |
| 17 | 3 | 0, 1 | 1 |
| 18 | 3 | 2, 3 | 1 |
| 19 | 3 | 4, 5 | 1 |
| 20 | 3 | 0-2 | 1 |
| 21 | 3 | 3-5 | 1 |
| 22 | 3 | 0-3 | 1 |
| 23 | 2 | 0, 2 | 1 |
| 24 | 3 | 0 | 2 |
| 25 | 3 | 1 | 2 |
| 26 | 3 | 2 | 2 |
| 27 | 3 | 3 | 2 |
| 28 | 3 | 4 | 2 |
| 29 | 3 | 5 | 2 |
| 30 | 3 | 6 | 2 |
| 31 | 3 | 7 | 2 |
| 32 | 3 | 8 | 2 |
| 33 | 3 | 9 | 2 |
| 34 | 3 | 10 | 2 |
| 35 | 3 | 11 | 2 |
| 36 | 3 | 0, 1 | 2 |
| 37 | 3 | 2, 3 | 2 |
| 38 | 3 | 4, 5 | 2 |
| 39 | 3 | 6, 7 | 2 |
| 40 | 3 | 8, 9 | 2 |
| 41 | 3 | 10, 11 | 2 |
| 42 | 3 | 0, 1, 6 | 2 |
| 43 | 3 | 2, 3, 8 | 2 |
| 44 | 3 | 4, 5, 10 | 2 |
| 45 | 3 | 0, 1, 6, 7 | 2 |
| 46 | 3 | 2, 3, 8, 9 | 2 |
| 47 | 3 | 4, 5, 10, 11 | 2 |
| 48 | 1 | 0 | 2 |
| 49 | 1 | 1 | 2 |
| 50 | 1 | 6 | 2 |
| 51 | 1 | 7 | 2 |
| 52 | 1 | 0, 1 | 2 |
| 53 | 1 | 6, 7 | 2 |
| 54 | 2 | 0, 1 | 2 |
| 55 | 2 | 2, 3 | 2 |
| 56 | 2 | 6, 7 | 2 |
| 57 | 2 | 8, 9 | 2 |
| 58 | 2 | 0; 2 | 1 |
| 59 | 2 | 0, 1; 2 | 1 |
| 60 | 2 | 0; 2, 3 | 1 |
| 61 | 2 | 0, 1; 2, 3 | 1 |
| 62 | 3 | 0; 2 | 1 |
| 63 | 3 | 0, 1; 2 | 1 |
| 64 | 3 | 0; 2, 3 | 1 |
| 65 | 3 | 0, 1; 2, 3 | 1 |
| 66 | 2 | 0; 2 | 2 |
| 67 | 2 | 0, 1; 2 | 2 |
| 68 | 2 | 0; 2, 3 | 2 |
| 69 | 2 | 0, 1; 2, 3 | 2 |

TABLE 13-4-continued

A DMRS indication table for an antenna port(s)
(1000 + DMRS port), dmrs-Type = 2, maxLength = 2
One codeword:
Codeword 0 enabled,
Codeword 1 disabled

| Value | Number of DMRS CDM group(s) without data | DMRS port(s) | Number of front-load symbols |
|---|---|---|---|
| 70 | 3 | 0; 2 | 2 |
| 71 | 3 | 0, 1; 2 | 2 |
| 72 | 3 | 0; 2, 3 | 2 |
| 73 | 3 | 0, 1; 2, 3 | 2 |
| 74-127 | reserved | reserved | reserved |

A terminal may support, in a C-JT/NC-JT form, data transmitted by a multi-TRP or a plurality of base stations. A terminal supporting C-JT/NC-JT may receive a C-JT/NC-JT-related parameter or a setting value, etc. in a higher layer configuration, and may set an RRC parameter of the terminal based on the C-JT/NC-JT-related parameter or the setting value, etc. For the higher layer configuration, the terminal may use a UE capability parameter tci-StatePDSCH. In this case, the UE capability parameter tci-StatePDSCH defines TCI states for the purpose of PDSCH transmission. The number of TCI states may be set to 4, 8, 16, 32, 64, or 128 in an FR1 and may be set to 64 or 128 in an FR2. A maximum of eight states among the set number which may be indicated as 3 bits of a TCI field of DCI may be set through a MAC CE message. The maximum value 128 means a value indicative of maxNumberConfiguredTCIstatesPerCC within the parameter tci-StatePDSCH included in capability signaling of a terminal. As described above, a series of configuration processes from a higher layer configuration to a MAC CE configuration may be applied to beamforming indication or a beamforming change command for at least one PDSCH in one TRP.

Various embodiments of the disclosure describe how a base station or a terminal activates/deactivates a TCI state through different MAC CE signaling as in rel-15 and rel-16. In particular, as in DCI format 1_1, upon allocation of a PDSCH for a specific terminal, direction indication of beamforming or a direction change command of beamforming, may be dynamically supported by using a TCI field.

The direction indication of beamforming or the direction change command of beamforming means an operation applied when a terminal that has identified TCI states field information within DCI format 1_1 receives a PDSCH in downlink after a given time. The direction means a corresponding beamforming configuration direction in association with a QCLed DL RS of a base station/TRP.

First, a base station or a terminal may determine a rel-15 MAC CE for a rel-15 DCI format and a rel-16 MAC CE for a rel-16 DCI format to be used. As described above, different solutions are proposed depending on a MAC CE structure of rel-15 and a MAC CE-different method of rel-16.

Figure 10A:
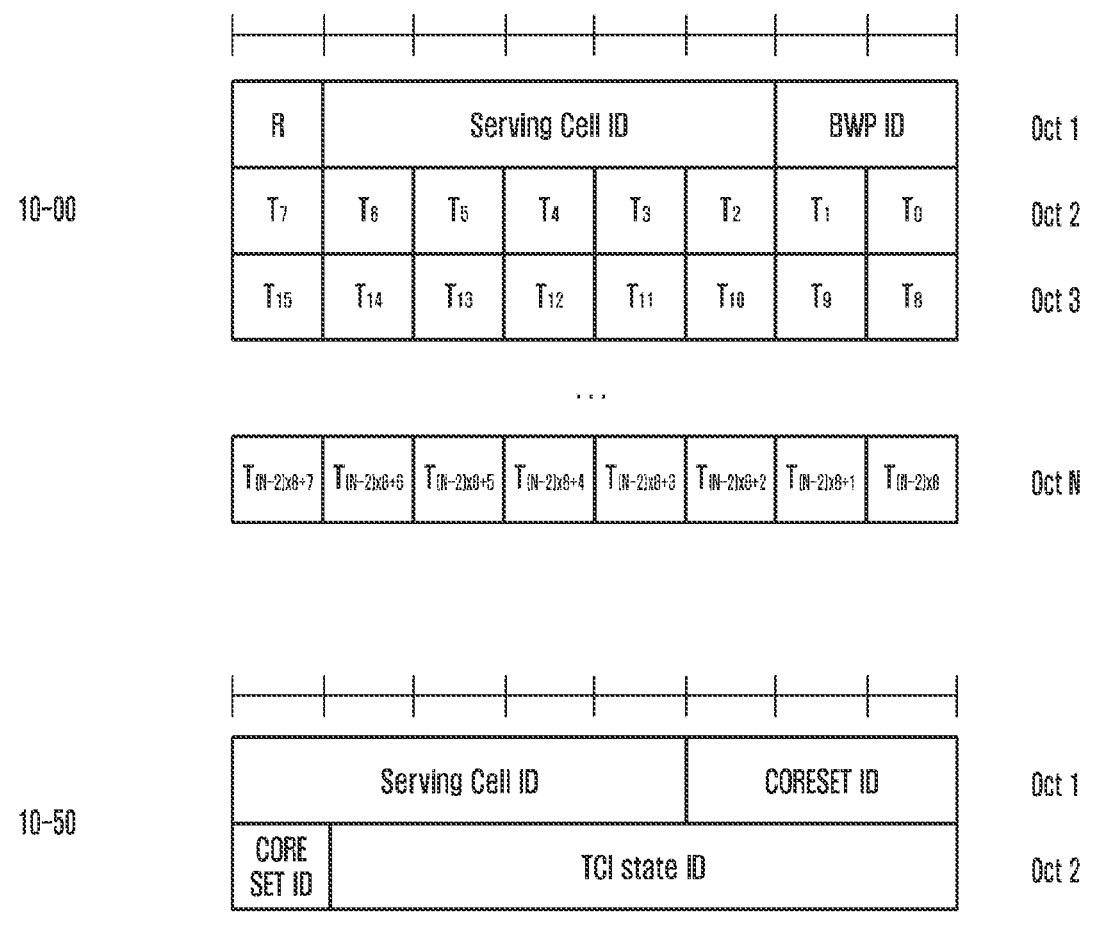

FIG. 10A is a diagram illustrating a. MAC CE structure for the TCI state activation of a UE-specific PDCCH according to the disclosure.

In FIG. 10A, 10-50 illustrates a MAC CE structure for the TCI state activation of a UE-specific PDCCH based on rel-15.

The meaning of each field within the MAC CE and a value which may be set in each field are as follows.

- Serving Cell ID (serving cell identity): This field indicates the identity of the Serving Cell for which the MAC CE applied. The length of the field is 5 bits.
- CORESET ID (CORESET identity): This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits.
- TCI State ID (Transmission configuration indication identity): This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

Furthermore, in FIG. 10A, 10-00 illustrates a MAC-CE structure for the TCI state activation/deactivation of a TIE-specific PDSCH based on rel-15.

The meaning of each field within the MAC CE and a value which may be set in each field are as follows.

- Serving Cell ID (serving cell identity): This field indicates the identity of the Serving Cell for which the MAC CE applied. The length of the field is 5 bits.
- BWP ID (Bandwidth Part Identity): This field indicates a DL BWP for which the MAC CE applies as codepoint of the DCI bandwidth part indicator field as specified in TS 38.212 [9], The length of the BWP ID field is 2 bits.
- TI (TCI state identity): If there is a TCI state with TCI-StateId as specified in TS 38.331 [5], this field indicates the activation/deactivation status of the TCI state with TCI-StateId. Otherwise MAC entity shall ignore the Ti field. The Ti field is set to 1 to indicate that the TCI state with TCI-StateId i shall be activated and mapped to the codepoint of the DCI Transmission Configuration indication field, as specified in TS 38.214 [7]. The Ti field is set to 0 to indicate that the TCI state with TCI-StateId i shall be deactivated and is not mapped to the codepoint of the DCI Transmission Configuration indication field. The codepoint to which the TCI -continued State is mapped is determined by its ordinal position among all the TCI States with Ti field set to 1, i.e., the first TCI States with Ti field set to 1 shall be mapped to the codepoint value 0, second TCI State with Ti field set to 1 shall be mapped to the codepoint value 1 and so on. The maximum number of activated TCI state is 8;
- R (redundant bit): Reserved bit, se to 0.

In rel-16, the MAC CE may be constituted in a form in which some of the MAC GE message in rel-15 is extended. The present embodiment may be proposed so that all TCI states activated by a rel-15 MAC CE are included in TCI states activated by a rel-16 MAC CE.

Figure 10B:
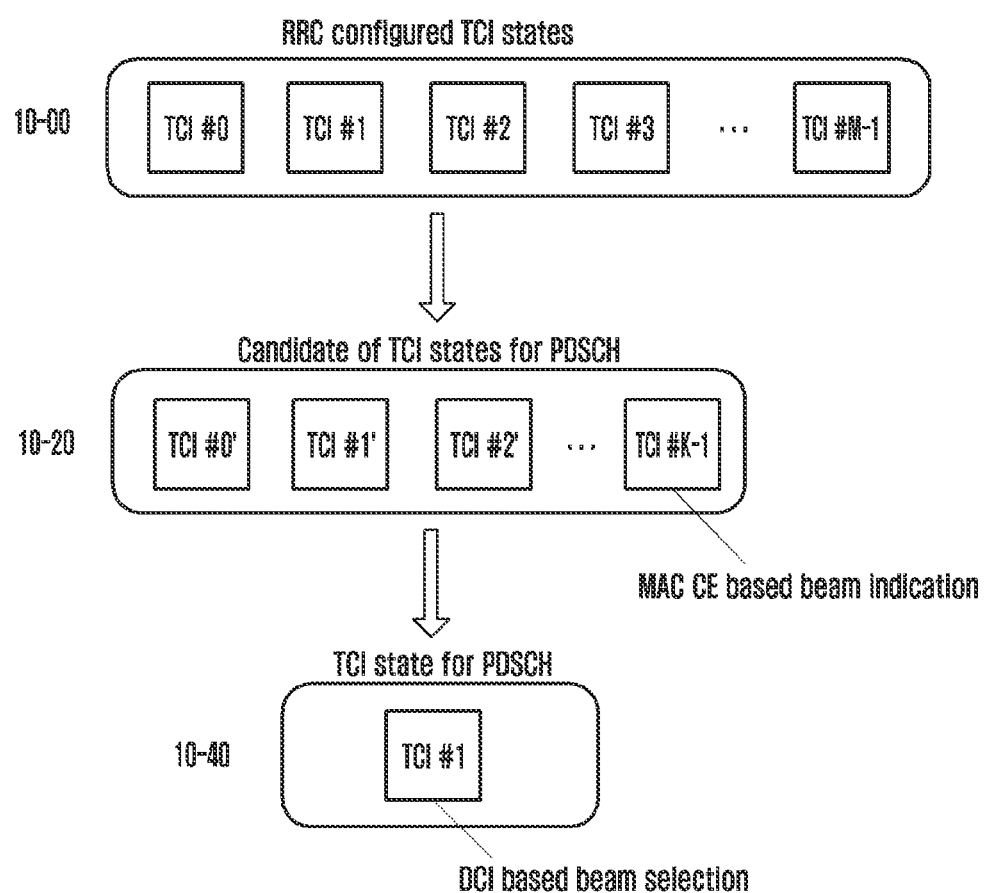
FIG. 10B is a diagram illustrating an example related to a configuration of TCI states and beamforming indication according to an embodiment of the disclosure.

For example, as in FIG. 10B, a base station may determine all the TCI states of RRC configured TCI states 10-01 of rel-15 as M like a TCI #0, a TCI #1, a TCI #2, ..., a TCI #M−1, and may select a TCI #0', a TCI #1', a TCI #2', ..., a TCI #K−1 as a subset of the TCI states 10-21 selected by the rel-15 MAC CE among them. In contrast, a base station and a terminal supporting rel-16 may separately configure RRC configured TCI states supporting rel-16 or may use RRC configured TCI states configured in rel-15 without any change. In this case, the RRC configured TCI states supporting rel-16 may include some or all of the RRC configured TCI states configured in rel-15. If M=128, the TCI states of rel-16 may be equal to or greater than 128. If a base station or a terminal expands the number of TCI states supported in rel-15 in proportion to the number of base stations/TRPs operating as C-JT/NC-JT in rel-16, if the base station and the terminal operate as two TRPs, a maximum of 256 TCI states may be configured. In this case, a rel-16 MAC CE may include some or all of TCI states supported in a rel-15 MAC CE in RRC configured TCI states having a rel-16 usage. Specifically, if the rel-16 MAC CE includes all the TCI states supported in the rel-15 MAC CE and is expanded in proportion to the number of base stations/TRPs operating as C-JT/NC-JT in rel-16, if the base station and the terminal operate as two TRPs, a maximum of 2K TCI states may be configured.

Table 14 is detailed contents of the parameter tci-StatePDSCH described in the above embodiment. Specifically, an FR2 mandatory value of a parameter maxNumberConfiguredTCIstatesPerCC may be modified from 64 to 128 or 256 or may be separately added as 64, 128 or 256 for a C-JT/NC-JT purpose.

For example, a base station or a terminal supporting rel-15 and rel-16 may set a maximum value for each of rel-15 and rel-16 for TCI states configuration through a MAC CE, and may set the number of TCI states as a value equal to or smaller than a set maximum value. Various embodiments below may be proposed as a method of setting the number of TCI states as a value equal to or smaller than a maximum value.

The number of TCI states activated by the MAC CE message of rel-15 and rel-16 may be set by a UE capability value reported by a terminal. According to another example, the number of TCI states activated by the MAC CE message of rel-15 and rel-16 may be determined as a value preset by a base station. Furthermore, according to another example, the number of TCI states activated by the MAC CE message of rel-15 and rel-16 may be determined as a value previously agreed between a base station and a terminal.

For example, as in FIG. 10B, a base station and a terminal may determine all the TCI states 10-01 of the RRC configured TCI states of rel-15 as M like the TCI #0, the TCI #1, the TCI #2, ..., the TCI #M−1, may select the subset of XI states 10-21 selected by the rel-15 MAC CE among all the TCI states, and may arrange the TCI #0', the TCI #1', the TCI #2' ..., the TCI #K−1. If the TCI #0 is selected among the M TCI states, the TCI #0 may be arranged in the TCI #0'. In this case, for example, a maximum value of a K value for a base station and a terminal supporting rel-15 may be set or determined as 8 or a maximum value of K for a base station and a terminal supporting rel-16 may also be set to 8. If the maximum value is set to 8, the base station may indicate the selection of a beam for a PDSCH for the terminal through a DCI based beam selection operation within one CORESET. The selection of the beam may be determined by identifying TCI field information 10-41 within DCI among the maximum of 8. The TCI field #1 indicated in FIG. 10B may be selected as a value of 0 to 7. For example, if a TCI field within DCI is indicated as 000, the terminal may identify that the TCI #0' (TCI #1=TCI #0') among the TCI #0', the TCI #1', the TCI #2', the TCI #3', the TCI #4', the TCI #5', the TCI #6', and the TCI #7' has been indicated. In the

TABLE 14

| Definitions for parameters | Per | M | FDD-TDD DIFF | FR1-FR2 DIFF |
|---|---|---|---|---|
| tci-StatePDSCH<br>Defines support of TCI-States for PDSCH. The capability signalling comprises the following parameters:<br>- maxNumberConfiguredTCIstatesPerCC indicates the maximum number of configured TCI-states per CC for PDSCH. For FR2, the UE is mandated to set the value to 64 128 For FR1, the UE is mandated to set these values to the maximum number of allowed SSBs in the supported band;<br>- maxNumberActiveTCI-PerBWP indicates the maximum number of activated TCI-states per BWP per CC, including control and data. If a UE reports X active TCI state(s), it is not expected that more than X active QCL type D assumption(s) for any PDSCH and any CORESETs for a given BWP of a serving cell become active for the UE.<br>Note the UE is required to track only the active TCI states | Band | Yes | No | No | embodiment, a case where the maximum value has been set to 8 (K=8) has been described, but the maximum value may be set a value smaller than 8. In the embodiment, a case where the maximum value K of the MAC GE for rel-15 and the maximum value K of the MAC CE for rel-16 are the same has been described, but the maximum values may be set as different values.

Furthermore, for example, if the maximum number of TCI states is expanded in proportion to the number of base stations/TRPs operating as C-JT/NC-JT, when the base station or the terminal operate as two TRPs, a maximum value of K for a base station and a terminal supporting rel-16 may be set to 16. If the maximum value of K is set to 16, the base station may indicate the selection of one or two or more beams for a PDSCH for the terminal through a DCI based beam selection operation within one CORESET. #1 selected and indicated by the base station may be selected as a value of 0 to 15 when K is 16. In the embodiment, a case where a maximum value is set to 16 (K=16) has been described, but the maximum value may be set as a value smaller than 16.

Table 15 is a table indicating characteristics of UE capability report parameters "PDSCH beam switching (or timeDurationForQCL, UE capa, 2-2)" for QCL-TypeD and "Max number of downlink RS resources used for QCL type-D in the active TCI states and active spatial relation info (or UE capa, 2-62)." With reference to Table 15, a terminal may report, to a base station, time duration necessary for reception beam switching from a minimum of 7 symbols to a maximum of 28 symbols on the basis of a 60 kHz subcarrier spacing (SCS) through timeDurationForQCL or time duration necessary for reception beam switching from a minimum of 14 symbols to a maximum of 28 symbols on the basis of a 120 kHz subcarrier spacing (SCS). It may be seen that the 60 kHz and 120 kHz SCSs are configurable values only in FR2 and are available only in timeDurationForQCL or FR2 according to Table 15. Furthermore, the terminal may notify the base station of a maximum of how many downlink reference signals may be used as a reference RS for QCL type-D of an activated TCI state through "UE capa (2-62)." For example, when a value of the "UE capa (2-62)" is 1, this means that the reference RS of QCL type-D within the activated TCI state is one, and it may be interpreted that QCL-type D, that is, a dynamic switch for a reception beam, cannot be performed. In contrast when a value of "UE capa (2-62)" is two or more, this means that the reference RS of QCL type-D within the activated TCI state is two or more, and it may be interpreted that QCL-type D, that is, a dynamic switch for a reception beam, can be performed.

A rel-15-based base station may allocate data by taking into consideration a scheduling time offset (t_so) from timing at which the reception of a PDCCH within a CORESET is completed to timing at which a PDSCH scheduled by the PDCCH is transmitted. The scheduling time offset (t_so) means duration from the last symbol (or a next symbol thereof) of the PDCCH that allocates the PDSCH to a previous symbol in which the PDSCH on which the data is transmitted in a corresponding slot indicated by k0 described with reference to FIG. 8 is started. A terminal may identify the start symbol of the PDSCH based on the scheduling time offset (t_so) and a start and length indicator (SLAV) index configured in startSymbolAndLength (0 to 127) of PDSCH-TimeDomainResourceAllocation configured in a higher layer. The application of beamforming may be different for each terminal depending on the UE capability. The capability is delivered to a base station as a timeDurationForQCL value in an RRC configuration process with the base station. In the disclosure, the timeDurationForQCL may be referred to as time duration or QCL application time duration for which a terminal applies QCL.

Basically, a terminal may perform an operation as follows based on the scheduling time offset (t_so) and a value of timeDurationForQCL based on the UE capability to be configured in a higher layer.

If tci-PresentinDCI is not configured as "enabled" in a higher layer configuration, a terminal may identify whether a scheduling offset/scheduling timing offset between a PDCCH and a PDSCH is greater than or equal to imeDurationForQCL reported as a ITE capability report regardless of a DCI format.

If tci-PresentinDCI is configured as "enabled" in a higher layer configuration and a terminal receives DCI format 1_1 from a base station, the terminal may assume that a TCI field is present in corresponding DCI, and may identify whether a scheduling time offset between a PDCCH and a PDSCH is greater than or equal to timeDurationForQCL reported as a UE capability report.

When the scheduling offset/scheduling timing offset between the PDCCH and the PDSCH is smaller than timeDurationForQCL, the terminal may determine a DMRS port of the received PDSCH based on a QCL parameter used in a CORESET associated with a monitored search space having the lowest CORESET ID in the most recent slot.

Furthermore, for example, when the scheduling offset/scheduling timing offset between the PDCCH and the PDSCH is greater than or equal to timeDurationForQCL, the

TABLE 15

| 2-2 | PDSCH beam switching | 1) Time duration (definition follows clause 5.1.5 in TS 38.214), Xi, to determine and apply spatial QCL information for corresponding PDSCH reception. Time duration is defined counting from end of last symbol of PDCCH to beginning of the first symbol of PDSCH. Xi is the number of OFDM symbols, i is the index of SCS, 1 = 1, 2, corresponding to 60, 120 kHz SCS. | Applicable only to FR2 | Mandatory with capability signaling for FR2 Candidate value set for X1 is {7, 14, 28}, Candidate value set for X2, {14, 28} |
|---|---|---|---|---|
| 2-62 | Max number of downlink RS resources used for QCL type-D in the active TCI states and active spatial relation info | Max number of downlink RS resources in the active TCI states and active spatial relation info per CC | FR1/FR2 | Optional with capability signaling Candidate value set: {1, 2, 4, 8, 14} | terminal applies a WI, assumption, such as a CORESET used to transmit the PDCCH, to a corresponding PDSCH DMRS port.

Furthermore, for example, when the scheduling offset/scheduling timing offset between the PDCCH and the PDSCH is greater than or equal to timeDurationForQCL, the terminal applies, to a corresponding PDSCH DMRS port, a QCL assumption indicated by a TCI field within the corresponding PDCCH (DCI). Meanwhile, if a terminal does not include QCL-TypeD in any of configured TCI states with respect to "all BWPs", the terminal may obtain a QCL assumption based on a TCI state always indicated regardless of an interval between DCI and a PDSCH allocated by the DCI.

FIGS. 11, 12, 13A, and 13B are diagrams illustrating structures of PDCCHs transmitted based on at least one CORESET and search space configured by a base station.

As in FIG. 8, FIGS. 11, 12, 13A, and 13B describe embodiments in which a base station transmits a first PDCCH within one CORESET (e.g., a first CORESET or PDCCH #1). Specifically, the first PDCCH transmitted by a TRP-A may schedule one or more PDCCH resources and a plurality of at least two PDSCHs. DMRS ports of different CDM groups may be applied to respective PDSCHs transmitted by the base station. DMRS transmission symbols transmitted along with the respective PDSCHs may be disposed in the same symbol.

The same beam direction may be applied to a PDCCH beam direction (TCI-states) within a specific CORESET transmitted by a base station for a specific terminal unless separately updated by a MAC CE. In FIGS. 11, 12, 13A, and 13B, an N-th PDCCH (PDCCH #N) transmitted by a base station/TRP A illustrates a PDCCH within a CORESET associated with a monitored search space having the lowest CORESET ID in the most recent slot. That is, when not receiving a PDCCH beam switching update message, the terminal also identically applies, to the reception of the first PDCCH, a QCL parameter used to receive the Nth PDCCH within the CORESET associated with the monitored search space having the lowest CORESET ID in the most recent slot. The Nth PDCCH has been described as being transmitted in a previous slot of the first PDCCH as an embodiment in which the N-th PDCCH is transmitted in a different search space in the same CORESET, but is transmitted in another search space of the same slot without restriction.

In FIGS. 11, 12, 13A, and 13B, the first PDCCH or a second PDCCH may indicate the allocation of a first PDSCH or a second PDSCH for NC-JT transmission. In this case, a beamforming direction for transmitting the PDSCHs may be changed based on beamforming information configured in a higher layer and TCI information of DCI within the first PDCCH or the second PDCCH, antenna port information or RNTI information, etc. A terminal may identify a beamforming direction changed by a base station based on received beamforming information and DCI information.

Figure 11:
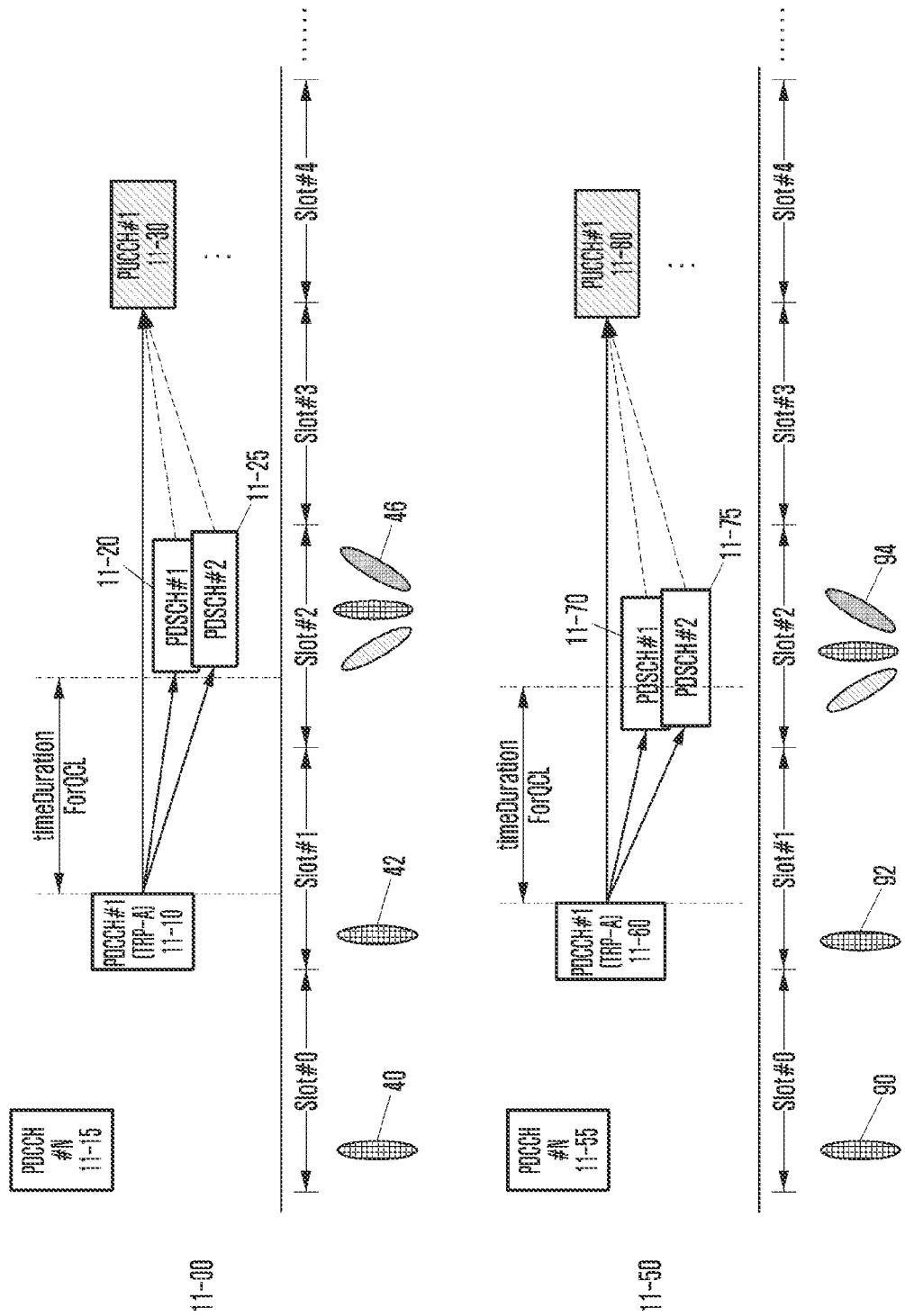
FIG. 11 is a diagram illustrating an example of single PDCCH-based cooperative communication according to an embodiment of the disclosure.

For example, in FIG. 11, a beamforming direction of the first PDCCH may be different from beamforming directions of the first PDSCH and the second PDSCH for NC-JT transmission. Furthermore, for example, the beamforming direction of the first PDCCH may be identical with the beamforming direction of the first PDSCH or the second PDSCH for NC-JT transmission. Furthermore, for example, a base station may configure beamforming directions of the first PDSCH and the second PDSCH to be different from each other by taking into consideration a spatial beamforming gain.

FIG. 11 proposes an operation of a base station and a terminal based on a relation between a scheduling offset (scheduling timing offset), including duration between the last symbol of the first PDCCH received by the terminal and the start symbol of PDSCHs or the number of symbols, and timeDurationForQCL.

In the disclosure, the scheduling timing offset is defined as the number of symbols between the last symbol of a PDDCH and the start symbol of a PDSCH corresponding to the PDCCH, but an embodiment of the disclosure is not limited thereto. The scheduling timing offset may be variously defined as a predetermined number of symbol units or slot units, etc.

Embodiment 3

For example, a base station may not support transmission based on NC-JT in which a single PDCCH is scheduled for a terminal for which tci-PresentinDCI is not configured as "enabled." That is, the base station may allocate only one PDSCH in one PDCCH for a terminal for which tci-PresentinDCI is not configured "enabled." As a result, when allocating a plurality of two or more PDSCHs for a specific terminal by scheduling a single PDCCH, the base station may perform transmission based on NC-JT only in the case of a terminal for which tci-PresentinDCI is configured as "enabled." However, transmission based on NC-JT may be performed through the scheduling of a multi-PDCCH, and a description related thereto is additionally described in Embodiment 7-1.

Furthermore, for example, a base station may indicate, for a terminal for which tci-PresentinDCI is not configured as "enabled", transmission based on NC-JT in which a single PDCCH is scheduled by using antenna port information within a single PDCCH. Specifically, the base station may notify the terminal of a plurality of pieces of PDSCH-related information to be transmitted by the base station by indicating DMRS-related information mapped as different CDM groups in the antenna port information.

Embodiment 3-2

A base station may support transmission based on NC-JT by scheduling a terminal for which tci-PresentinDCI is configured as "enabled" with DCI format 1_1 in a single PDCCH. Furthermore, the base station may perform data transmission to the terminal by taking into consideration the scheduling time offset (t_so) between the single PDCCH and a plurality of PDSCHs in the transmission based on NC-JT.

In FIG. 11, 11-00 illustrates a case where a value of t_so scheduled by a base station is 14 or more. When the value of t_so is 14 or more, a base station may perform a determination and operation by using at least one of methods proposed below.

For example, a base station may transmit a first PDCCH (DCI format 1_1) to a specific terminal for which tci-PresentinDCI is configured as "enabled" for transmission based on NC-JT, and may transmit a first PDSCH 11-20 and a second PDSCH 11-25 allocated by the first PDCCH 11-10. In this case, the base station may transmit both the first PDSCH 11-20 and the second PDSCH 11-25 based on a scheduling algorithm of the base station without taking into consideration timeDurationForQCL of the terminal. For example, the base station may indicate a beamforming direction in which the PDSCHs are transmitted by using TCI information and antenna port information within DCI of the first PDCCH 11-10. In this case, the capability of the UE is not taken into consideration upon scheduling.

Furthermore, for example, if a base station identifies that the terminal can receive at least one PDSCH based on timeDurationForQCL information of the terminal and TCI state-related information of the first PDSCH and the second PDSCH that are indicated, the base station may transmit the first PDCCH to the terminal for the transmission based on NC-JT of a specific terminal, and may transmit the first PDSCH and the second PDSCH allocated by the first PDCCH.

Furthermore, for example, if a base station identifies that a specific terminal can receive two PDSCHs based on timeDurationForQCL information of the terminal and TCI state-related information of the first PDSCH and the second PDSCH that are indicated, the base station may transmit the first PDCCH to the terminal for the transmission of the terminal based on NC-JT, and may transmit, the first PDSCH and the second PDSCH allocated by the first PDCCH.

Embodiment 4-1

For example, when tci-PresentinDCI is not configured as "enabled", a terminal may not expect transmission based on NC-JT. That is, when tci-PresentinDCI is not configured as "enabled" or when the terminal receives DCI format 1_0, the terminal may take into consideration that only one PDSCH corresponding to one PDCCH is transmitted. For example, a terminal may identify that a beamforming direction of a first PDCCH and a beamforming direction of a PDSCH indicated by the first PDCCH are the same.

Furthermore, for example, when tci-PresentinDCI is not configured as "enabled", a terminal may identify whether to perform NC-JT transmission based on antenna port information included in DCI. That is, the antenna port information may include information on which a base station transmits a single PDSCH or a plurality of PDSCHs. For example, a terminal may identify that a beamforming direction of the first PDCCH, and at least one of directions of a first PDSCH and second PDSCH indicated by the first PDCCH are the same. Alternatively, the terminal may identify that a beamforming direction of the first PDCCH and directions of the first PDSCH and the second PDSCH indicated by the first PDCCH are TCI states configured by default.

Embodiment 4-2

When receiving, from a base station, a message for which tci-PresentinDCI is configured as "enable" and receiving DCI format 1_1 of a first PDCCH, a terminal may calculate the scheduling time offset (t_so) and compare the scheduling time offset with a UE capability parameter timeDurationForQCL (e.g., S14) reported to a base station.

In FIG. 11, 11-00 illustrates a case where a value of t_so calculated by a terminal is 14 or more. When the value of t_so is 14 or more, the terminal may perform identification and an operation by using at least one of methods proposed below.

For example, the terminal may assume that a TCI field is present in corresponding DCA, and may apply each of QCL parameters (sets) of TCI states indicative of a beamforming direction for at least one PDSCH indicated by the codepoint of TCI.

Furthermore, for example, if information indicated by the codepoint of TCI includes one TCI state, a terminal may assume that TCI states for one of two PDSCHs are the same as that of the TCI of a PDCCH. The terminal may receive data by applying a QCL parameter for a first PDSCH and a second PDSCH based on information of the configured TCI field.

In FIG. 11, 11-50 illustrates a case where a value of t_so between a PDCCH and PDSCHs transmitted by a base station is less than 14. When the value of t_so is less than 14, a base station may perform identification and an operation by using at least one of methods proposed below.

Embodiment 5-1

In the present embodiment, if a base station does not configure tci-PresentinDCI as "enable", the base station may operate using a method such as that in Embodiment 1-1.

Embodiment 5-2

In the present embodiment, an operation when a base station configures tci-PresentinDCI as "enable" and transmits DCI format 1_1 of a first PDCCH is described.

For example, a base station may transmit a first PDCCH based on a scheduling algorithm of the base station without taking into consideration timeDurationForQCL of a specific terminal for the transmission of the terminal based on NC-JT, and may transmit both a first PDSCH and a second PDSCH allocated by the first PDCCH. For example, a base station may indicate a beamforming direction in which PDSCHs are transmitted by using TCI information and antenna port information within DCI transmitted through a first PDCCH. In this case, the capability of the UE is not taken into consideration upon scheduling. Furthermore, for example, when identifying that a specific terminal cannot receive at least one PDSCH based on timeDurationForQCL information of the terminal and TCI state-related information of a first and a second PDSCH with respect to a first PDCCH and the first PDSCH and second PDSCH allocated by the first PDCCH for the transmission of the terminal based on NC-JT, a base station may transmit, to the terminal, only a PDSCH (e.g., a PDSCH #1) receivable by the terminal.

Furthermore, for example, when identifying that a specific terminal cannot receive at least one PDSCH with respect to a first PDCCH and a first PDSCH and second PDSCH allocated by the first PDCCH for the transmission of the terminal based on NC-JT based on timeDurationForQCL information of the terminal and TCI state-related information of the first PDSCH and the second PDSCH, a base station may transmit at least one of the first PDSCH and the second PDSCH based on a TCI state (e.g., a TCI state used to receive a PDCCH #1 or a PDCCH #N) receivable by the terminal by taking into consideration timeDurationForQCL of the terminal.

Furthermore, for example, when identifying that a specific terminal cannot receive at least one PDSCH by taking into consideration only timeDurationForQCL information of the terminal with respect to a first PDCCH and a first PDSCH and second PDSCH allocated by the first PDCCH for the transmission of the terminal based on NC-JT, a base station may not perform the transmission of all PDSCHs (e.g., a PDSCH #1 and a PDSCH #2) allocated by the PDCCHs.

When receiving, from a base station, a message for which tci-PresentinDCI is configured as "enable" and DCI format 1_1 of a first PDCCH, a terminal may calculate the scheduling time offset (t_so), and may compare the scheduling time offset with the UE capability parameter timeDurationForQCL (e.g., S14) reported to the base station.

In FIG. 11, 11-50 illustrates a case where a value of t_so calculated by a terminal is less than 14. When the value of t_so is less than 14, the terminal may perform identification and an operation by using at least one of methods proposed below.

Embodiment 6-1

When a value of the scheduling time offset (t_so) calculated by a terminal is smaller than the UE capability parameter timeDurationForQCL (e.g., S14) reported to a base station, the terminal may not expect the transmission of the base station based on NC-JT.

For example, when timeDurationForQCL necessary to apply a TCI state-related QCL parameter indicative of a beamforming direction fora PDSCH is not satisfied, a terminal may skip all PDSCH reception operations indicated in the PDCCH.

Furthermore, for example, when timeDurationForQCL necessary for a terminal to apply a TCI state-related QCL parameter indicative of a beamforming direction for a PDSCH is not satisfied, the terminal may identically apply a QCL parameter used to receive an N-th PDCCH within a CORESET associated with a monitored search space having the lowest CORESET ID in the most recent slot for the reception of a first PDSCH or a second PDSCH. Specifically, the terminal may perform decoding by applying the QCL parameter to both the first PDSCH and the second. PDSCH. As a result, if a base station has performed NC-JT transmission to which different beamforming directions have been applied, the terminal may expect that the reception of only one PDSCH among the two PDSCHs is selectively successful.

Embodiment 6-2

When a value of the scheduling time offset (t_so) calculated by a terminal is smaller than the UE capability parameter timeDurationForQCL (e.g., S14) reported to a base station, the terminal may expect the single transmission-based transmission of the base station.

For example, when timeDurationForQCL necessary to apply the TCI state-related QCL parameter indicative of a beamforming direction for a PDSCH is not satisfied, a terminal may use a QCL parameter used to receive an N-th PDCCH within a CORESET associated with a monitored search space having the lowest CORESET ID in the most recent slot. Accordingly, the terminal may receive data from a PDSCH (e.g., a first PDSCH/second PDSCH) allocated to the lowest/highest resource RB among the first PDSCH and the second PDSCH. In this case, the terminal may use the QCL parameter.

Furthermore, for example, when timeDurationForQCL necessary to apply the TCI state-related QCL parameter indicative of a beamforming direction for a PDSCH is not satisfied, a terminal may apply, to both a first PDSCH and a second PDSCH, a QCL parameter used to receive an N-th PDCCH within a CORESET associated with a monitored search space having the lowest CORESET ID in the most recent slot. Furthermore, the terminal may receive a DMRS port configuration for the reception of the first PDSCH and the second PDSCH based on antenna port information within DCI.

In the above embodiments, the terminal may expect that one default QCL, is configured in single PDCCH-based NC-JT transmission within one CORESET.

In addition, the terminal may expect that two or more default QCLs are configured in the single PDCCH-based. NC-JT within one CORESET. To configure the two or more default QCLs means that the terminal may apply a QCL parameter to two PDSCHs (e.g., a first PDSCH and a second PDSCH) based on information pre-configured by a base station. The QCL parameter to be applied may be intrinsically or extrinsically configured by DCI information (e.g., antenna port information and TCI information), a MAC CE or RRC information indicated for the terminal.

For example, when configuring at least two default QCLs every CORESET or one PDCCH-config, a base station may configure a beamforming direction of each of TRPs based on at least two default QCLs to be the same beamforming direction on the terminal side that performs a reception operation. Alternatively, the plurality of TRPs may configure their TCI states assuming that the same beamforming is performed on the terminal side. In this case, the terminal may identify that the TCI states are the same based on a MAC CE or RRC information intrinsically or extrinsically configured by the base station, and may perform a reception operation based on the identification. The TCI states may be the same or different from each other by taking into consideration locations and channels of the TRPs. That is, the terminal may perform reception beamforming in the same direction by applying a QCL parameter to two PDSCHs (e.g., a first PDSCH and a second PDSCH).

Furthermore, for example, when configuring at least two default QCLs every one CORESET or one PDCCH-config, a base station may configure two or more default QCLs in a way to be identical with each other on the base station. That is, two default QCLs are explicitly configured, but may be configured to indicate the same beamforming direction. In this case, a terminal may perform the same beamforming by identifying the same TCI states configuration configured by the base station. Alternatively, the terminal may perform a reception operation based on one TCI state, assuming that a plurality of TCI states for a default QCL, configured in the base station is the same. That is, the terminal may perform reception beamforming in the same direction by applying an identically configured QCL parameter to two PDSCH (e.g., a first PDSCH and a second PDSCH).

Meanwhile, a base station may sequentially configure at least two default QCLs every one CORESET or one PDCCH-config. Alternatively, in some cases, a state in which two or more default QCLs are not fully configured and only one default QCL is configured may be present.

For example, a base station may configure a default QCL for a first PDSCH and may then configure a default QCL for a second PDSCH or may not configure the default QCL for the second PDSCH. If the default QCL for the second PDSCH is not configured, when only the default QCL for the first PDSCH configured in one ServingCell, PDCCH-config or CORESET (group) is configured for each TRP, a terminal may identify that the default QCL, for the second PDSCH is the same as that for the first PDSCH. Alternatively, the terminal may identify that scheduling is not performed within a scheduling time offset by identifying that the default QCL for the second PDSCH is unnecessary. Alternatively, the terminal may identify that the transmission of the second PDSCH will not be performed. In other words, if the base station does not configure at least two default QCLs, the terminal may assume that a plurality of at least two PDSCHs will not be transmitted within one slot in a single-DCI-based multi-TRP, and may identify that the plurality of at least two PDSCHs will be transmitted within one slot in the plurality of TRPs after the at least two default QCLs are configured.

Figure 12:
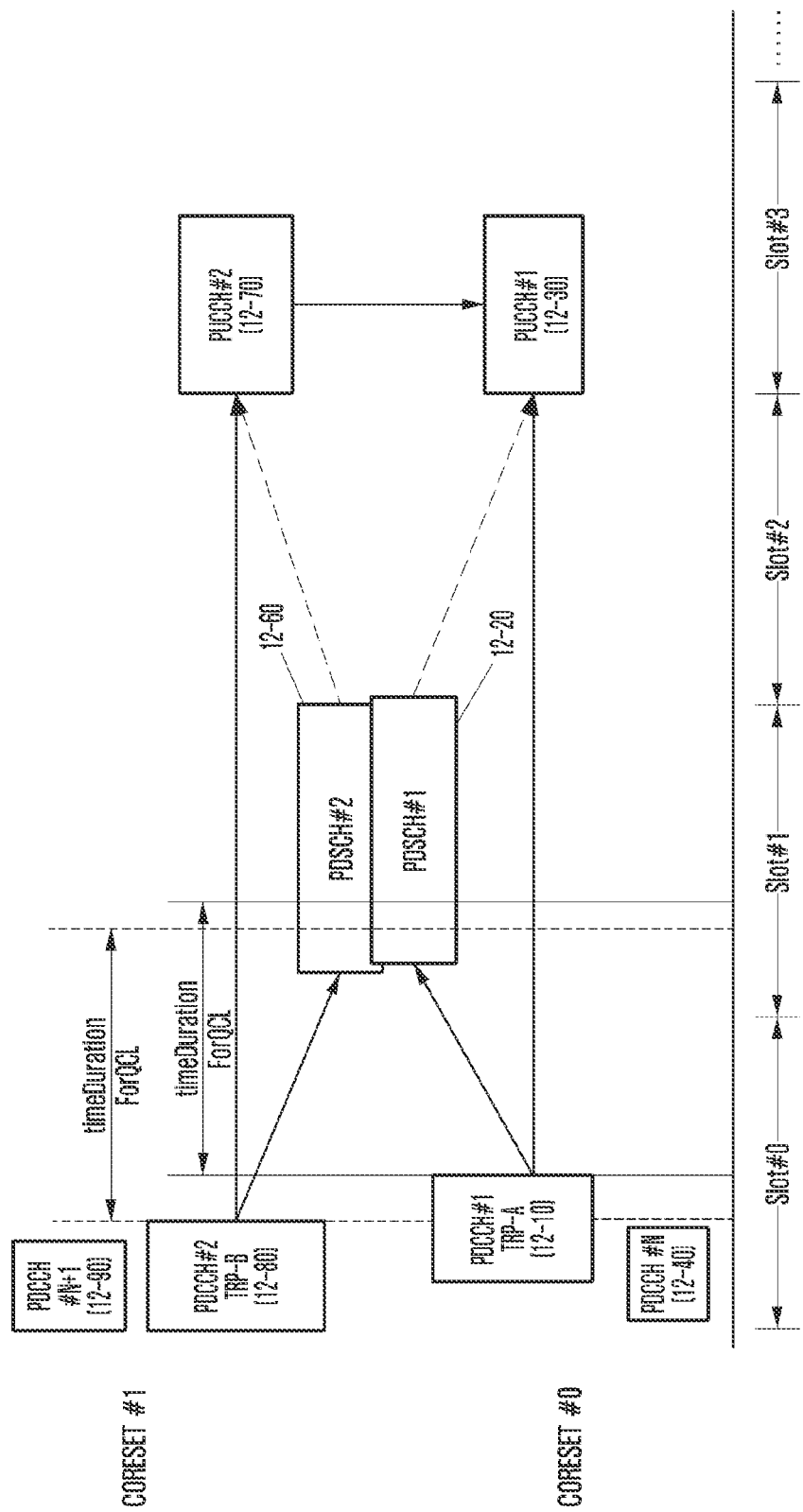
FIG. 12 is a diagram illustrating an example of multi-PDCCH-based cooperative communication according to an embodiment of the disclosure.

In FIG. 12, an embodiment in which a base station transmits a first. PDCCH within one CORESET (e.g., a CORESET #0 or a PDCCH #1) and additionally transmits a second PDCCH within another CORESET (e.g., a CORESET #1 or a PDCCH #2) is described.

Specifically, the first PDCCH transmitted by a TRP-A may schedule one or more PUCCH resources (first PUCCH) and one or a plurality of one or more of PDSCHs (first PDSCH). The second PDCCH transmitted by a TRP-B may schedule one or more PUCCH resources (second PUCCH) and one or a plurality of one or more PDSCHs (second PDSCH). DMRS ports of different CDM groups may be applied to the PDSCHs transmitted by the base station, respectively. The number of transmission symbols of DMRSs transmitted along with each of the PDSCHs and symbol locations of the transmission symbols may be the same between the first PDSCH and the second PDSCH. In the present embodiment, the PDSCHs are assumed to be transmitted in the same symbol, but the disclosure is not essentially limited to the transmission of PDSCHs in the same symbol.

Furthermore, the plurality of CORESETs may be divided and configured for the multi-DCI-based NC-JT transmission of a base station. Alternatively, the plurality of CORESETs may be configured in a set form, such as a CORESET group, and may be indicated based on higher layer or L1/L2 signaling for a terminal supporting NC-JT.

For example, a base station may configure, for a specific terminal, one CORESET group including at least one CORESET(s) for transmission based on NC-JT based on multi-DCI Specifically, the base station may configure 4 CORESETs within one CORESET group for the specific terminal. The terminal may receive two PDCCHs by monitoring the configured CORESETs, and may receive PDSCHs allocated by the received PDCCH. As in FIG. 12, a specific terminal may be configured with one CORESET group (e.g., a CORESET group #0) from a base station. The terminal may monitor a CORESET #0 and a CORESET #1 for an NC-JT purpose among a maximum of 5 CORESETs (e.g., a CORESET #0 to a CORESET #4) included in the CORESET group. In this case, the CORESET to be monitored by the terminal within the CORESET group may be configured by the base station or may be determined based on a configuration of the terminal or randomly. This may also be applied to another embodiment of the disclosure.

Furthermore, for example, a base station may configure, for a specific terminal, at least two CORESET groups including at least one CORESET(s) for transmission based on NC-JT based on multi-DCI. For example, a base station may configure two CORESET groups for a specific terminal, and may configure or indicate a CORESET(s) within one of the configured CORESET groups or each of the configured CORESET groups. Accordingly, the terminal may receive two PDCCHs by monitoring the configured CORESET(s), and may receive PDSCHs allocated by the received PDCCHs. As in FIG. 12, a specific terminal may be configured with two CORESET group (e.g., a CORESET group #0 or a CORESET group #1) from a base station. A terminal may monitor a CORESET #0 within the CORESET group #0 and a CORESET #1 within the CORESET group #1 among CORESETs within the CORESET groups for an NC-JT purpose. In this case, the CORESETs to be monitored by the terminal within the CORESET groups may be configured by the base station or may be determined based on a configuration of the terminal or randomly.

The CORESET #0 may include a first PDCCH and an N-th PDCCH. The CORESET #1 may include a second PDCCH and an (N+1)-th PDCCH. CORESETs configured for each CORESET group may be different from each other (e.g., a CORESET group #0 includes CORESETs #0 and #2, and a CORESET group #1 includes CORESETs #1, #3, and #5). A total number of CORESETs configured in all CORESET groups may be within a maximum number of CORESETs configurable for a terminal, that is, reported as a UE capability. In the above embodiment, the maximum number of CORESETs may be within 5, for example.

The same beam direction may be applied to PDCCH beam directions (TCI-states) within a specific CORESET transmitted by a base station for a specific terminal unless separately updated by a MAC CE.

FIG. 12 illustrates that an N-th PDCCH (PDCCH #N)/(N+1)-th PDCCH (PDCCH #N+1) transmitted by a TRP-A/TRP-B are PDCCHs within a CORESET associated with a monitored search space having the lowest CORESET ID in the most recent slot of each CORESET. That is, when not receiving a PDCCH beam switching update message, a terminal may also identically apply, to the reception of a first PDCCH/second PDCCH, a QCL, parameter used to receive an N-th PDCCH/(N+1)-th PDCCH within a CORESET associated with a monitored search space having the lowest CORESET ID in the most recent slot.

An example in which the Nth PDCCH (PDCCH #N)/(N+1)-th PDCCH (PDCCH #N+1) are transmitted in different search spaces of the same CORESET as that of the first PDCCH/second PDCCH and transmitted in the same slot of the first PDCCH/second PDCCH has been described. However, the disclosure does not restrict a case where an N-th PDCCH (PDCCH #N)/(N+1)-th PDCCH (PDCCH #N+1) are transmitted in another search space of a slot prior to a slot in which the first PDCCH/second PDCCH are transmitted.

The first PDCCH and the second PDCCH may indicate the allocation of the first PDSCH and the second PDSCH for NC-JT transmission, respectively. In this case, a beamforming direction of the PDSCHs may be changed based on beamforming information configured in a higher layer and TCI information of DCI within the first PDCCH and the second PDCCH, antenna port information, RNTI information, etc. A terminal may identify a beamforming direction changed by a base station based on the received beamforming information and DCI information.

For example, a beamforming direction of the first PDCCH may be different from a beamforming direction of the first PDSCH for NC-JT transmission. A beamforming direction of the second PDCCH may be different from a beamforming direction of the second PDSCH for NC-JT transmission.

Furthermore, for example, a beamforming direction of the first PDCCH may be identical with a beamforming direction of the first PDSCH for NC-JT transmission or a beamforming direction of the second PDCCH may be identical with a beamforming, direction of the second PDSCH for NC-JT transmission.

Furthermore, for example, a base station may configure beamforming directions of the first PDSCH and the second. PDSCH in a way to be different from each other by taking into consideration a spatial beamforming gain.

Figure 13A:
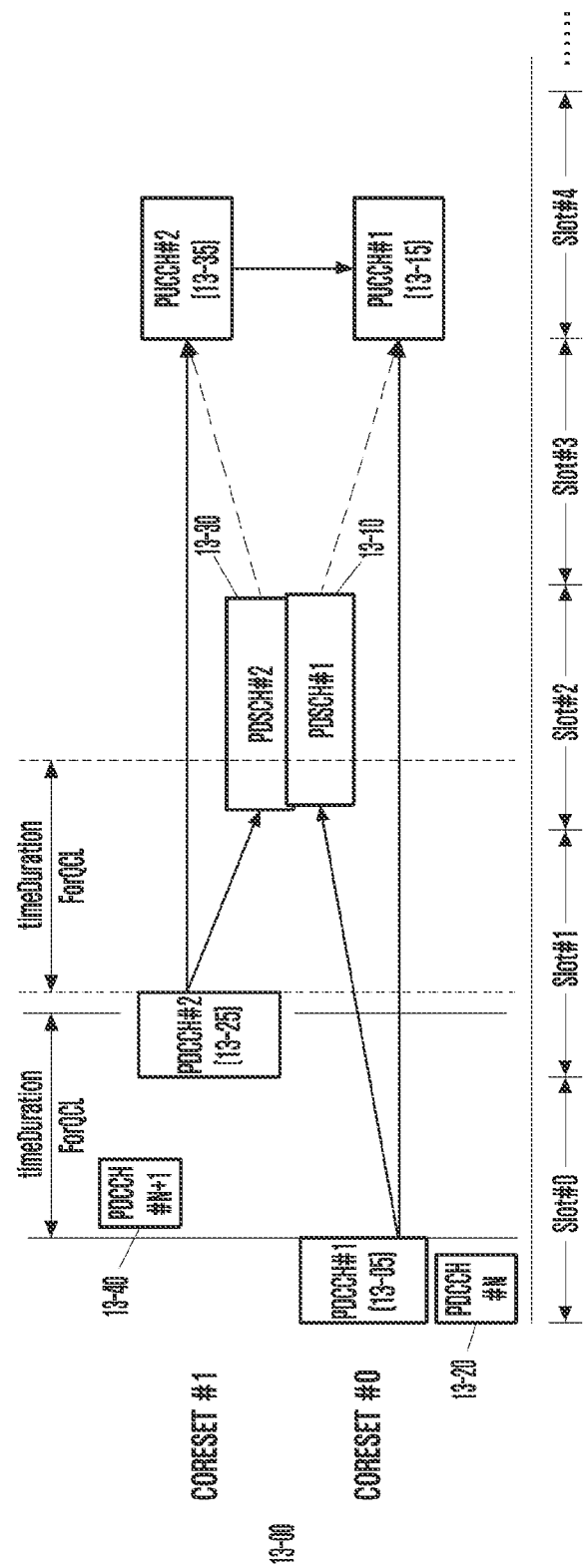
FIGS. 13A and 13B are diagrams illustrating an example of multi-PDCCH-based cooperative communication according to another embodiment of the disclosure.
Figure 13B:
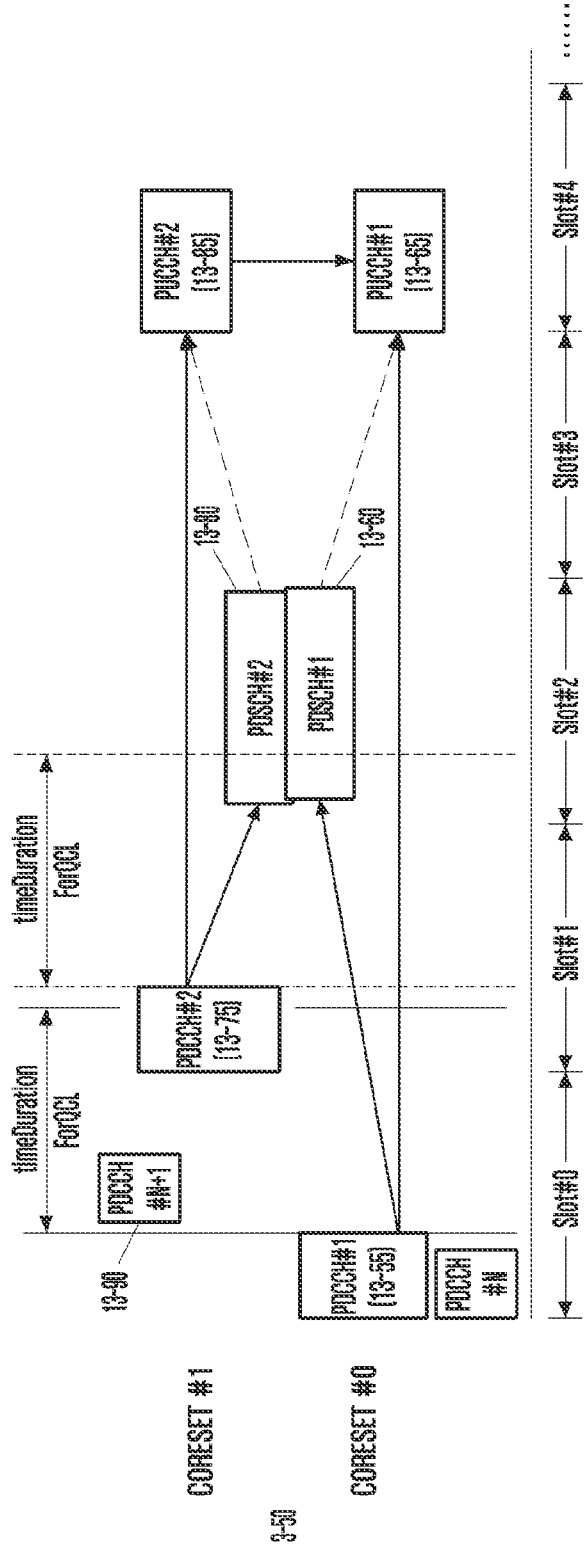

FIGS. 12, 13A, and 13B propose operations of a base station and a terminal according to a relation between a scheduling timing offset, that is, duration between the last symbol of a first PDCCH and the start symbol of a first PDSCH received by the terminal, and timeDurationForQCL, and a relation between a scheduling time offset, that is, duration between the last symbol of a second PDCCH and the start symbol of a second PDSCH, and timeDurationForQCL.

Embodiment 7-1

When tci-PresentinDCI is not configured as "enabled" for a specific terminal, a base station may perform scheduling without taking into consideration the scheduling time offset (t_so) and timeDurationForQCL reported through a UE capability report for transmission based on NC-JT.

Embodiment 7-2

For example, when tci-PresentinDCI is configured as "enabled" for a specific terminal, a base station may perform scheduling without taking into consideration the scheduling time offset (t_so) and timeDurationForQCL reported through a UE capability report for transmission based on NC-JT. The base station may determine whether transmission beams of a first PDSCH and second PDSCH based on NC-JT have been changed without taking into consideration the capability of the UE. Accordingly, the base station may transmit the PDSCHs based on TCI field information of a PDCCH that allocates the first PDSCH and the second PDSCH. Furthermore, for example, when tci-PresentinDCI is configured as "enabled" for a specific terminal, a base station may perform scheduling by taking into consideration the scheduling time offset (t_so) and timeDurationForQCL reported through a UE capability report for transmission based on NC-JT. The base station may determine beam directions of the first PDSCH and the second PDSCH based on whether transmission beams of the PDSCHs based on NC-JT have been changed.

For example, as in FIG. 12, a case where a base station configures, for a terminal, a CORESET #0 within a CORESET group #0 and a CORESET #1 within a CORESET group #1 for an NC-JT purpose among the two CORESET group #0 and CORESET group #1 (e.g., a CORESET group #0 includes CORESETs #0 and #2 and the CORESET group #1 includes CORESETs #1, #3, and #5) and switching in the beams of a first PDSCH and second PDSCH among PDSCHs to be transmitted in association with a PDCCH within the CORESETs occurs is described. In this case, the base station may perform at least one of operations of comparing a first scheduling time offset, that is, duration between the first PDCCH and the first PDSCH during which switching in the beams of the PDSCHs occurs in a specific terminal, and timeDurationForQCL or comparing a second scheduling time offset, that is, duration between a second PDCCH and the second PDSCH, and timeDurationForQCL. Accordingly, when the first scheduling time offset or the second scheduling time offset in which beam switching occurs is smaller than timeDurationForQCL, the base station may operate as follows.

As an embodiment, the base station may apply, to the transmission of the first PDSCH, a QCL parameter used to transmit an Nth PDCCH within a CORESET associated with a monitored search space having the lowest CORESET ID (e.g., a CORESET #0 and a CORESET #1) in the most recent slot within each CORESET group (e.g., a CORESET group #0 or a CORESET group #1), and may identically apply, to the transmission of the second PDSCH, a QCL parameter used to transmit an (N+1)-th PDCCH.

Specifically, in FIG. 12, when a PDSCH #1 is scheduled from the CORESET group #0, a QCL parameter used in a PDCCH #N corresponding to a monitored search space for the lowest CORESET ID in the most recent slot within the corresponding CORESET group may be used for the transmission of the PDSCH #1. Meanwhile, when a PDSCH #2 is scheduled from the CORESET group #1, similar to the above description, a QCL parameter used in a PDCCH #N+1 may be used for the transmission of the PDSCH #2. That is, a base station may configure two CORESET groups for NC-JT, and may make the two CORESET groups correspond to TRPS, respectively. A QCL assumption for each PDSCH may be referred from the corresponding lowest CORESET-ID within the CORESET group.

As another embodiment, a QCL parameter used to transmit an Nth PDCCH within a CORESET associated with a monitored search space having the lowest CORESET ID (e.g., a CORESET #0) in the most recent slot within the lowest CORESET group (e.g., a CORESET group #0) may be identically applied to the transmission of each of a first PDSCH and a second PDSCH.

As another embodiment, a QCL parameter used to transmit an Nth PDCCH within a CORESET associated with a monitored search space having the lowest CORESET ID (CORESET #0) in the most recent slot within the lowest CORESET group (COREST group #0) may be applied to the transmission of a first PDSCH, and the transmission of a second PDSCH may be dropped or not performed. That is, the transmission of a PDSCH may be prioritized based on the lowest CORESET ID.

Furthermore, for example, a case where a base station may configure a CORESET for an NC-JT purpose within one CORESET group #0 (e.g., a CORESET group #0 includes a CORESET #0 and a CORESET #1) (the CORESET #0 and the CORESET #1 in FIG. 12) and switching in the beams of a first PDSCH and second PDSCH among PDSCHs to be transmitted in association with a PDCCH within the CORESETs occurs is described. In this case, the base station may compare a first scheduling time offset, that is, duration between a first PDCCH and the first PDSCH during which switching in the beam of the PDSCH occurs in a specific terminal, and timeDurationForQCL, and may compare a second scheduling time offset, that is, duration between a second PDCCH and the second PDSCH, and timeDurationForQCL, Accordingly, when the first scheduling time offset or the second scheduling time offset in which switching in the beam of the PDSCH occurs is smaller than timeDurationForQCL, the base station may operate as follows according to various embodiments.

As an embodiment, a base station may apply, to the transmission of a first PDSCH, a QCL parameter used to transmit an N-th PDCCH within a CORESET associated with a monitored search space or identically apply, to the transmission of a second PDSCH, a QCL parameter used to transmit an (N+1)-th PDCCH within the CORESET, based on information on the lowest ID (e.g., a CORESET #0) or a second-smaller ID (e.g., a CORESET #1) in a most recent slot within a CORESET group (e.g., a CORESET group #0) in which beam switching occurs.

As another embodiment, a base station may identically apply, to the transmission of a first or a second PDSCH in which beam switching has occurred, a QCL parameter used to transmit an Nth PDCCH within a CORESET associated with a monitored search space based on information on the lowest ID (e.g., a CORESET #0) in the most recent slot within a CORESET group (e.g., a CORESET group #0) in which beam switching occurs.

As another embodiment, a base station may apply, to the transmission of a first PDSCH, a QCL parameter used to transmit an N-th PDCCH within a CORESET associated with a monitored search space based on information on the lowest ID (e.g., a CORESET #0) in the most recent slot within a CORESET group (e.g., a CORESET group #0) in which beam switching occurs, and may drop or not perform the transmission of the second PDSCH. That is, the transmission of a PDSCH may be prioritized based on the lowest CORESET ID.

Furthermore, in the embodiment, a CORESET group (e.g., a CORESET group #0 includes a CORESET #0 and a CORESET #2) has been described as being present, but only a CORESET may be present without the concept or configuration of a CORESET group according to circumstances. In this case, it may be evident that only a CORESET group is excluded from the above description and corresponding solutions are interpreted as methods using a CORESET ID.

In the plurality of aforementioned embodiments, the methods using the lowest CORESET/CORSET group ID have been described, but the extension of the embodiments to a method using the highest COREST/CORSET group ID, etc. may also be taken into consideration.

Furthermore, for example, when switching in the beam of at least one PDSCH among PDSCHs to be transmitted occurs, a base station may perform at least one of operations of comparing a first scheduling time offset, that is, duration between a first PDCCH and a first PDSCH with respect to a specific terminal, and timeDurationForQCL or comparing a second scheduling time offset, that is, duration between a second PDCCH and a second PDSCH, and timeDurationForQCL. When each of the first or second scheduling time offset is smaller than timeDurationForQCL and the timeDurationForQCL is a specific value (e.g., s7), the base station may select one of QCL parameters used to transmit an N-th PDCCH and an (N+1)-th PDCCH, and may apply beam directions of the first and second PDSCHs in common. Specifically, the selecting method may include a method of selecting the lowest/highest CORESET ID among a plurality of CORESETs, a method of selecting an allocated PDCCH index in the most recent search space, or a method of selecting the longest by taking into consideration a difference between the time taken for a PUCCH to transmit the PDSCH and the time taken for the PUCCH to transmit ACK/NACK of the PDSCH. According to an implementation, the plurality of PDSCHs may be transmitted by a TRP-A or a TRP-B.

When receiving, from a base station, a message for which tci-PresentinDCI has been set as "enable" and receiving DCI format 1_1 of a first PDCCH, a terminal may calculate the scheduling time offset (t_so), and may compare the scheduling time offset (t_so) with the UE capability parameter timeDurationForQCL (e.g., S14) reported to the base station. FIG. 12 illustrates a case where each of values of t_so1 and t_so2 calculated by a terminal is less than 14. When a calculated value of the t_so is less than 14, the terminal may perform identification and an operation by using methods proposed below.

Embodiment 8-11

For example, if tci-PresentinDCI, is configured as "enabled" by a base station and a terminal receives DCI format 1_1 of a first PDCCH or a second PDCCH from the base station, when each of calculated values of scheduling time offsets (t_so) is smaller than the UE capability parameter timeDurationForQCL (e.g., S14) reported to a base station, the terminal may not expect the transmission of the base station based on NC-JT. For example, when timeDurationForQCL necessary to apply a TCI state-related QCL parameter indicative of a beamforming direction for a PDSCH is not satisfied, a terminal may skip all PDSCH reception operations indicated in the PDCCH.

Furthermore, for example, when timeDurationForQCL necessary to apply TCI state-related QCL parameters indicative of beamforming directions for a first PDSCH and a second PDSCH in which beam switching occurs are not satisfied, a terminal may operate as follows in accordance with Embodiment 7-2. The terminal may be configured with a plurality of CORESET groups. In the present embodiment, it is assumed that a first has been allocated in association with a PDCCH within a CORESET within a CORESET group #0 and a second PDSCH has been allocated in association with a PDCCH within a CORESET within a CORESET group #1.

As an embodiment, a terminal may apply, to the reception of a first PDSCH, information related to a first QCL, parameter used to receive an N-th PDCCH within a CORESET associated with a monitored search space having the lowest CORESET ID (e.g., a CORESET #0 or a CORESET #1) in the most recent slot within a CORESET group (e.g., a CORESET group #0 or a CORESET group #1) in which beam switching occurs or may apply, to the reception of a second PDSCH, information related to a second QCL parameter used to receive an (N+1)-th PDCCH within the CORESET. Specifically, the terminal may perform decoding by applying the pieces of information related to the QCL parameters to the first PDSCH and the second PDSCH, respectively.

As another embodiment, a terminal may apply, to both the reception of a first PDSCH and the reception of a second PDSCH, information related to a first QCL parameter used to receive an N-th PDCCH within a CORESET associated with a monitored search space having the lowest CORESET ID (e.g., a CORESET #0) in the most recent slot within the lowest CORESET group among CORESET groups (e.g., a CORESET group #0 and a CORESET group #1) in which beam switching occurs.

As another embodiment, a terminal may apply, to the reception of a first PDSCH, information related to a first QCL parameter used to receive an Nth PDCCH within a CORESET associated with a monitored search space having the lowest CORESET ID (e.g., a CORESET #0) in the most recent slot within the lowest CORESET group among CORESET groups (e.g., a CORESET group #0 and a CORESET group #1) in which beam switching occurs, and may drop or not perform the reception of a second PDSCH. That is, the reception of a PDSCH may be prioritized based on the lowest CORESET ID.

Furthermore, for example, when timeDurationForQCL necessary to apply TCI state-related QCL parameters indicative of beamforming directions for a first PDSCH and a second PDSCH in which beam switching occurs is not satisfied, a terminal may operate as follows in accordance with Embodiment 7-2. The terminal may be configured with a plurality of CORESET groups. In the present embodiment, it is assumed that a first PDSCH and a second PDSCH have been allocated in association with a PDCCH within a CORESET group #0 (e.g., the CORESET group #0 includes a CORESET #0 to a CORESET #4).

As an embodiment, a terminal may apply, to the reception of a first PDSCH, a QCL parameter used to receive an N-th PDCCH within a CORESET associated with a monitored search space and/or may identically apply, to the transmission of a second PDSCH, a QCL parameter used to transmit an (N+1)-th PDCCH within the CORESET, based on information on the lowest CORESET ID (e.g., a CORESET #0) and/or a second-smaller ID (e.g., a CORESET #1) in the most recent slot within a CORESET group (e.g., a CORESET group #0) in which beam switching occurs. Specifically, in FIG. 12, if a PDSCH #1 is scheduled from a CORESEl group #0, a terminal uses, for the reception of the PDSCH #1, a QCL parameter used in an PDCCH #N corresponding to a monitored search space for the lowest CORESET ID in the most recent slot within the corresponding CORESET group. Meanwhile, if a PDSCH #2 is scheduled from a CORESET group #1, similar to the description, a terminal uses, for the reception of the PDSCH #2, a QCL parameter used in a PDCCH #N+1.

As another embodiment, a terminal may identically apply, to the transmission of a first PDSCH and/or a second PDSCH in which beam switching has occurred, a QCL parameter used to transmit an N-th PDCCH within a CORESET associated with a monitored search space, based on information on the lowest H) (e.g., a CORESET #0) in the most recent slot within a CORESET group (e.g., a CORESET group #0) in which beam switching occurs.

As another embodiment, a base station may apply, to the reception of a first PDSCH, a QCL parameter used to transmit an N-th PDCCH within a CORESET associated with a monitored search space based on information on the lowest ID (e.g., a CORESET #0) in the most recent slot within a CORESET group (e.g., a CORESET group #0) in which beam switching occurs, and may drop or not perform the reception of a second PDSCH. That is, the reception of a PDSCH may be prioritized based on the lowest CORESET ID.

In the plurality of aforementioned embodiments, the methods using the lowest CORESET ID have been described, but the extension of the methods to a method using the highest COREST ID, etc. may also be taken into consideration.

Furthermore, in the embodiment, a CORESET group (e.g., a CORESET group #0 includes a CORESET #0 to a CORESET #4) has been described as being present, but only a CORESET may be present without the concept or configuration of a CORESET group according to circumstances. In this case, it may be evident that only a CORESET group is excluded from the above description and corresponding solutions are interpreted as methods using a CORESET ID.

Furthermore, for example, when timeDurationForQCL necessary to apply TCI state-related QCL parameters indicative of beamforming directions for a first PDSCH and a second PDSCH is not satisfied, a terminal may select at least one of information related to a first QCL parameter and information related to a second QCL parameter used to receive an N-th PDCCH within a CORESET associated with a monitored search space having the lowest CORESET ID in the most recent slot in each CORESET, and may perform decoding by applying the selected information to both the first PDSCH and the second PDSCH. Specifically, the selecting method may include a method of selecting the lowest/highest CORESET ID among a plurality of CORESETs, a method of selecting an allocated PDCCH index in the most recent search space, or a method of selecting the longest by taking into consideration a difference between the time taken for a PUCCH to transmit the PDSCH and the time taken for the PUCCH to transmit ACK/NACK of the PDSCH. According to an implementation, the plurality of PDSCHs may be transmitted by a TRP-A or a TRP-B.

Embodiment 8-2

For example, if tci-PresentinDCI is not configured as "enabled" by a base station and a terminal receives DCI format 1_0 from the base station, the terminal may receive a plurality of PDSCHs based on NC-JT transmission without taking into consideration the scheduling time offset (t_so) and timeDurationForQCL reported through a UE capability report. That is, when tci-PresentinDCI is not configured as "enabled" by the base station or the terminal receives DCI format 1_0 from the base station, the terminal may take into consideration that only one PDSCH is allocated and transmitted in one PDCCH. For example, a terminal may identify that a beamforming direction of a first PDCCH and a beamforming direction of a first PDSCH indicated by the first PDCCH are the same and a beamforming direction of a second PDCCH and a beamforming direction of a second PDSCH indicated by the second PDCCH are the same.

Furthermore, for example, when tci-PresentinDCI is not configured as "enabled" by a base station, a terminal may identify that PDSCH transmission based on NC-JT transmission is not supported.

In FIG. 13A, 13-00 illustrates a case where one of values of t_so1 and t_so2 calculated by a terminal is less than 14. According to the present embodiment, when a value of t_so2 among the plurality of values of t_so is less than 14, a base station and a terminal perform identification and an operation by using methods proposed below.

Embodiment 9-1

As in Embodiment 7-1, when tci-PresentinDCI is not configured as "enabled" for a specific terminal, a base station may perform scheduling without taking into consideration the scheduling time offset (t_so) and timeDurationForQCL reported through a UE capability report for transmission based on NC-JT.

Embodiment 9-2

For example, as in Embodiment 7-2, when tci-PresentinDCI is configured as "enabled" for a specific terminal, a base station may perform scheduling without taking into consideration the scheduling time offset (t_so) and timeDurationForQCL reported through a UE capability report for transmission based on NC-JT.

Furthermore, for example, when tci-PresentinDCI is configured as "enabled" for a specific terminal, a base station may perform scheduling by taking into consideration the scheduling time offset (t_so) and timeDurationForQCL reported through a UE capability report for transmission based on NC-JT. The base station may determine beam directions of a first PDSCH and a second PDSCH based on whether transmission beams of the PDSCHs based on NC-JT have been changed.

For example, as in FIG. 13, a case where a base station configures, as CORESETs of a terminal, a CORESET #0 included in a CORESET group #0 and a CORESET #1 included in a CORESET group #1 for an NC-JT purpose among the CORESET group #0 and the CORESET group #1 (e.g., the CORESET group #0 includes CORESETs #0 and #2, and the CORESET group #1 includes CORESETs #1, #3, and #5) and switching in the beams of a first PDSCH and a second PDSCH among PDSCHs to be transmitted in association with a PDCCH within the CORESETs occurs is described. In this case, the base station may perform at least one of operations of comparing a first scheduling time offset (t_so1), that is, duration between a first PDCCH and the first PDSCH, and timeDurationForQCL or comparing a second scheduling time offset (t_so2), that is, duration between a second PDCCH and the second PDSCH, and timeDurationForQCL. When one of the first scheduling time offset or the second scheduling time offset is smaller than timeDuration- ForQCL, the base station may operate as follows. In the present embodiment, a case where t_so2 is smaller than timeDurationForQCL is assumed.

As an embodiment, a base station may apply, to the transmission of a second PDSCH, a QCL parameter used to transmit an (N+1)-th PDCCH within a CORESET associated with a monitored search space having the lowest CORESET ID (e.g., a CORESET #1) in the most recent slot, based on a CORESET group (e.g., a CORESET group #1) in which the offset value within each CORESET group (e.g., a CORESET group #0 or a CORESET group #1) is smaller than timeDurationForQCL and a CORESET ID within the group.

Specifically, in FIG. 13, when a PDSCH #2 is scheduled from the CORESET group #1, a QCL parameter used in a PDCCH #N+1 corresponding to a monitored search space for the lowest CORESET ID in the most recent slot within the corresponding CORESET group may be used for the transmission of the PDSCH #2.

As another embodiment, a base station may apply, to the transmission of a second PDSCH, a QCL parameter used to transmit an N-th PDCCH within a CORESET associated with a monitored search space having the lowest CORESET ID (e.g., a CORESET #0) in the most recent slot within the lowest CORESET group (CORESET group #0) among CORESET groups (e.g., a CORESET group #0 and a CORESET group #1).

As another embodiment, a base station may apply a QCL parameter based on a beamforming direction indicated in a CORESET (e.g., a CORESET #0) within a CORESET group (e.g., a CORESET group #0) in which the offset value is greater than or equal to timeDurationForQCL, that is, information of a TCI field indicated in a second PDCCH with respect to a beam direction of a PDSCH (second PDSCH) scheduled in a CORESET (e.g., a CORESET #1) within a CORESET group (e.g., a CORESET group #1) in which the offset value is smaller than timeDurationForQCL, In this case, if the direction of a beam is not changed in a first PDCCH, the base station may apply a QCL parameter of the first PDCCH (or a first PDSCH) to the second PDSCH.

As another embodiment, a base station may compare t_so1 and timeDurationForQCL or t_so2 and timeDurationForQCL regardless of each CORESET group. When one of t_so1 or t_so2 is smaller than timeDurationForQCL, the base station may not transmit (may stop or skip), to a specific terminal, a PDSCH (second PDSCH) scheduled in a CORESET (e.g., a CORESET #1) in which the offset value is smaller than timeDurationForQCL.

Furthermore, for example, a case where a base station configures, for a specific terminal, CORESETs (CORESET #0 and the CORESET #1) for an NC-JT purpose within one CORESET group #0 (e.g., the CORESET group #0 includes a CORESET #0 and a CORESET #1) and switching in the beam of at least one PDSCH among PDSCHs to be transmitted in association with a PDCCH within the CORESETs occurs is described. In this case, the base station may perform at least one of operations of comparing a first scheduling time offset, that is, duration between a first PDCCH and a first PDSCH during, which switching in the beam of the PDSCH occurs, and timeDurationForQCL or comparing a second scheduling time offset, that is, duration between a second. PDCCH and a second PDSCH, and timeDurationForQCL. When the first scheduling time offset or the second scheduling time offset during which switching in the beam of the PDSCH occurs is smaller than timeDurationForQCL, the base station may operate as follows according to various embodiments.

As an embodiment, a base station may apply, to the transmission of a second PDSCH, a QCL, parameter used to transmit an Nth PDCCH within a CORESET associated with a monitored search space having the lowest CORESET (e.g., a CORESET #0) in the most recent slot, based on a CORESET ID in which the offset value within a CORESET group (e.g., a CORESET group #0) is smaller than timeDurationForQCL.

As another embodiment, a base station may apply, to the transmission of a second PDSCH, QCL parameter used to transmit an N-th PDCCH within a CORESET associated with a monitored search space having the lowest CORESET ID (e.g., a CORESET #0) in the most recent slot within the lowest CORESET group (CORESET group #0) among CORESET groups (e.g., a CORESET group #0). As another embodiment, a base station may apply a QCL parameter to a direction of a beam of a PDSCH (second PDSCH) scheduled in a CORESET a CORESET #1) in which the offset value is smaller than timeDurationForQCL for NC-JT transmission, based on a beamforming direction indicated in a CORESET (e.g., a CORESET #0) in which the offset value is greater than or equal to timeDurationForQCL, that is, information of a TCI field indicated in a second PDCCH. In this case, if the base station does not change the direction of a beam is not changed in a first PDCCH, a QCL parameter of the first PDCCH (or a first PDSCH) may be applied to the second PDSCH.

As another embodiment, a base station may compare t_so1 and timeDurationForQCL, or t_so2 and timeDurationForQCL regardless of each CORESET group for NC-JT transmission. When one of t_so1 or t_so2 is smaller than timeDurationForQCL, the base station may not transmit, to a specific terminal, a PDSCH (second PDSCH) scheduled in a CORESET (e.g., a CORESET #1) in which the offset value is smaller than timeDurationForQCL.

Furthermore, in the embodiment, a CORESET group (e.g., a CORESET group #0 includes a CORESET #0 and a CORESET #2) has been described as being present, but only a CORESET may be present without the concept or configuration of a CORESET group according to circumstances. In this case, it may be evident that only a CORESET group is excluded from the above description and corresponding solutions are interpreted as methods using a CORESET ID.

In the plurality of aforementioned embodiments, the cases including the lowest CORESET/CORSET group ID have been described, but the extension of the embodiments to the case of the highest COREST/CORSET group ID may also be taken into consideration.

Embodiment 10-1

If tci-PresentinDCI is configured as "enabled" by a base station and a terminal receives DCI format 1_1 of a first PDCCH or a second PDCCH from the base station, when a value of the scheduling time offset (t_so) calculated in one CORESET is smaller than the UE capability parameter timeDurationForQCL (e.g., S14) reported to the base station, the terminal may not expect the transmission of the base station based on NC-JT. For example, when a value of t_so1 is 14 or more and a value of t_so2 is less than 14, a terminal may identify that a base station does not perform transmission based on NC-JT. That is, when timeDurationForQCL necessary to apply a TCI state-related QCL parameter indicative of a beamforming direction for a second PDSCH is not satisfied, the terminal may skip a second PDSCH reception operation indicated in a second PDCCH.

Embodiment 10-2

If tci-PresentinDCI is configured as "enabled" by a base station and a terminal receives DCI format 1_1 of a first PDCCH or a second PDCCH, when a value of the scheduling time offset (t_so) calculated in one CORESET is smaller than the UE capability parameter timeDurationForQCL (e.g., S14) reported to the base station, the terminal may take into consideration the transmission of the base station based on NC-JT as follows in accordance with Embodiment 9-2. The terminal may be configured with a plurality of CORESET groups. In the present embodiment, it is assumed that a first PDSCH has been allocated in association with a PDCCH within a CORESET within a CORESET group #0 and a second PDSCH has been allocated in association with a PDCCH within a CORESET within a CORESET group #1.

As an embodiment, when a value of t_so1 is 14 or more in a CORESET within a CORESET group #0 and a value of t_so2 is less than 14 in a CORESET within a CORESET group #1, a terminal may identify the transmission of a base station based on NC-JT. That is, when timeDurationForQCL necessary to apply a TCI state-related QCL parameter indicative of a beamforming direction for a second PDSCH is not satisfied, the terminal may apply (override), to the reception of the second PDSCH, a QCL parameter used to receive an (N+1)-th PDCCH within a CORESET associated with a monitored search space having the lowest CORESET ID (e.g., a CORESET #1) in the most recent slot, based on a CORESET group (e.g., a CORESET group #1) in which the value of t_so2 is smaller than timeDurationForQCL and a CORESET As another embodiment, when a value of t_so1 in a CORESET within a CORESET group #0 is 14 or more and a value of t_so2 in a CORESET within a CORESET group #1 is less than 14, a terminal may identify the transmission of a base station based on NC-JT That is, the terminal may apply, to the reception of a second PDSCH, a QCL parameter used to receive an N-th PDCCH within a CORESET associated with a monitored search space having the lowest CORESET ID (e.g., a CORESET #0) in the most recent slot within the lowest CORESET group (CORESET group #0) among CORESET groups (e.g., a CORESET group #0 and a CORESET group #1).

As another embodiment, when a value of t_so1 in a CORESET within a CORESET group #0 is 14 or more and a value of t_so2 in a CORESET within a CORESET group #1 is less than 14, a terminal may identify the transmission of a base station based on NC-JT. That is, the terminal may apply a QCL parameter to a direction of a beam of a PDSCH (second PDSCH) scheduled in a CORESET (e.g., a CORESET #1) within a CORESET group (e.g., a CORESET group #1) in which the offset value is smaller than timeDurationForQCL, based on a beamforming direction indicated in a CORESET (e.g., a CORESET #0), within a CORESET group (e.g., a CORESET group #0) in which the offset value is greater than or equal to timeDurationForQCL, that is, information of a TCI field indicated in the second PDCCH. In this case, if the base station does not change a direction of a beam in the first PDCCH, the terminal may apply a QCL parameter of the first PDCCH (or the first PDSCH) to the second PDSCH.

As another embodiment, a base station may compare t_so1 and timeDurationForQCL or t_so2 and timeDurationForQCL regardless of each CORESET group. When one of t_so1 or t_so2 is smaller than timeDurationForQCL, the base station may not transmit, to a specific terminal, a PDSCH (second PDSCH) scheduled in a CORESET (e.g., a CORESET #1) in which the offset value is smaller than timeDurationForQCL.

Furthermore, for example, if tci-PresentinDCI is configured as "enabled" by a base station and a terminal receives DCI format 1_1 of a first PDCCH or a second PDCCH from the base station, when a value of the scheduling time offset (t_so) calculated in one CORESET is smaller than the UE capability parameter timeDurationForQCL (e.g., S14) reported to the base station, the terminal may take into consideration the transmission of the base station based on NC-JT as follows in accordance with Embodiment 9-2. A case where the terminal may be configured with CORESETs (e.g., a CORESET #0 and a CORESET #1) for an NC-JT purpose within one CORESET group #0 (e.g., a CORESET group #0 includes a CORESET #0 to a CORESET #4) and switching in the beam of at least one PDSCH among PDSCHs to be transmitted in association with a PDCCH within the CORESETs occurs is described. However, the disclosure is not limited to the case, and the number of CORESETs configured in a terminal may be changed based on a configuration of a base station.

As an embodiment, a terminal may apply, to the reception of a second PDSCH, a QCL parameter used to receive an N-th PDCCH within a CORESET associated with a monitored search space having the lowest CORESET ID (e.g., a CORESET #0) in the most recent slot, based on a CORESET ID in which the offset value within a configured CORESET group (e.g., a CORESET group #0) is smaller than timeDurationForQCL.

As another embodiment, a terminal may apply, to the reception of a second PDSCH, a QCL parameter used to receive an N-th PDCCH within a CORESET associated with a monitored search space having the lowest CORESET ID (e.g., a CORESET #0) in the most recent slot within the lowest CORESET group (CORESET group #0) among CORESET groups (e.g., a CORESET group #0).

As another embodiment, a terminal may apply a QCL parameter to the direction of a beam of a PDSCH (second PDSCH) scheduled in a CORESET (e.g., a CORESET #1) in which the offset value is smaller than timeDurationForQCL for NC-JT transmission, based on a beamforming direction indicated in a CORESET (e.g., a CORESET #0) in which the offset value is greater than or equal to timeDurationForQCL, that is, information of a TCI field indicated in the second PDCCH. In this case, if a base station has not changed the direction of a beam in a first PDCCH, a QCL parameter of the first PDCCH (or a first PDSCH) may be applied to the second PDSCH.

As another embodiment, a base station may compare t_so1 and timeDurationForQCL or t_so2 and timeDurationForQCL regardless of each CORESET group for NC-JT transmission. When one of t_so1 or t_so2 is smaller than timeDurationForQCL, the base station may not transmit, to a specific terminal, a PDSCH (second PDSCH) scheduled in a CORESET (e.g., a CORESET #1) in which the offset value is smaller than timeDurationForQCL.

Furthermore, in the embodiment, a CORESET group (e.g., a CORESET group #0 includes a CORESET #0 and a CORESET #2) has been described as being present, but only a CORESET may be present without the concept or configuration of a CORESET group according to circumstances. In this case, it may be evident that only a CORESET group is excluded from the above description and corresponding solutions are interpreted as methods using a CORESET ID.

In the plurality of aforementioned embodiments, the methods using the lowest CORESET/CORSET group ID have been described, but the extension of the embodiments to a method using the highest COREST/CORSET group ID, etc. may also be taken into consideration.

Embodiment 10-3

For example, when tci-PresentinDCI is not configured as "enabled" by a base station or a terminal receives DCI format 1_0, the terminal may receive a plurality of PDSCHs based on NC-JT transmission without taking into consideration the scheduling time offset (t_so) and timeDurationForQCL reported through a UE capability report. That is, when receiving DCI format 1_0, the terminal may take into consideration that the base station transmits only one allocated PDSCH in one PDCCH. For example, a terminal may identify that a beamforming direction of a first PDCCH and a beamforming direction of a first PDSCH indicated by the first PDCCH are the same and a beamforming direction of a second PDCCH and a beamforming direction of a second PDSCH indicated by a second PDCCH are the same.

Furthermore, for example, when tci-PresentinDCI is not configured as "enabled" by a base station, a terminal may identify that PDSCH transmission based on NC-JT transmission is not supported.

In FIG. 13B, 13-50 illustrates a case where each of a value of duration (t_so1) between the last symbol of a first PDCCH and the start symbol of a first calculated by a terminal and a value of duration (t_so2) between the last symbol of the first PDCCH and the start symbol of the first PDSCH calculated by the terminal is 14 or more. A base station and a terminal may perform identification and an operation by using at least one of methods proposed below.

Embodiment 11-1

For example, when the condition is satisfied, a base station may always configure tci-PresentinDCI as "enabled" upon NC-JT transmission. Alternatively, when tci-PresentinDCI is configured as "enabled", the base station may configure scheduling timing so that the time condition is always satisfied upon NC-JT transmission.

If tci-PresentinDCI is configured as "enabled" by a base station and a terminal receives DCI format 1_1 of a first PDCCH or a second PDCCH, when a value of the scheduling time offset (t_so) calculated by the terminal is greater than or equal to the UE capability parameter timeDurationForQCL (e.g., S14) reported to the base station, the terminal applies, to a corresponding PDSCH DMRS port, a QCL assumption indicated by a TCI field within a corresponding PDCCH (DCI). For example, a terminal may apply TCI state-related QCL parameters for a first PDSCH and a second PDSCH based on TCI field information of pieces of DCI within a first PDCCH and a second PDCCH, respectively, in order to change a PDSCH beamforming direction. Although a CORESET group is configured, the operation may be easily inferred and applied as in Embodiment 10.

Embodiment 11-2

For example if a base station does not configure tci-PresentinDCI as "enabled" or indicates tci-PresentinDCI as DCI format 1_0 for a terminal, the terminal may not perform scheduling for NC-JT transmission. As a result, when tci-PresentinDCI is not configured as "enabled" by the base station or the terminal receives DCI format 1_0 from the base station, the terminal may take into consideration that the base station transmits only one PDSCH allocated in one PDCCH. For example, a terminal may identify that a beamforming direction of a first PDCCH and a beamforming direction of a first PDSCH indicated by the first PDCCH are the same and a beamforming direction of a second PDCCH and a beamforming direction of a second PDSCH indicated by the second PDCCH are the same.

In the above embodiments, the terminal may expect a configuration of one or two or more default QCLs in NC-JT transmission based on multiple PDCCHs within one CORESET.

Figure 14:
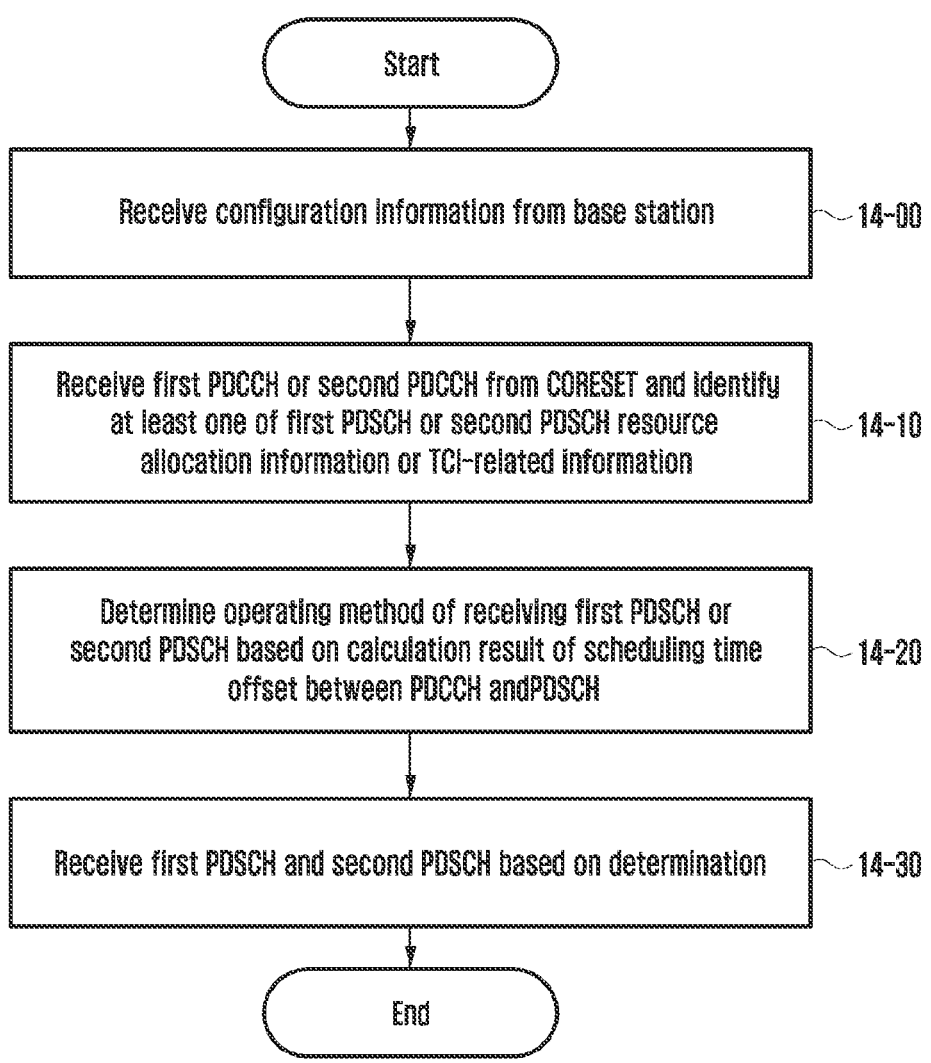
FIG. 14 is a diagram illustrating an example of single and multi-PDCCH-based cooperative communication according to another embodiment of the disclosure.

FIG. 14 describes a method of a terminal to receive a PDSCH based on NC-JT transmission and default QCL assumption according to an embodiment of the disclosure.

A terminal may receive at least one piece of configuration information including at least one of a parameter (tci-PresentinDCI) related to base station beamforming, a parameter for a control channel and a data channel, or configuration information (PDDCH-config, PDSCH-config) in an RRC configuration process with the base station (14-00).

Furthermore, the terminal may transmit UE capability information (timeDurationForQCL) to the base station (14-00). The terminal may transmit the UE capability information in response to a request from the base station or at predetermined timing (e.g., an RRC configuration process with the base station). Accordingly, when receiving the UE capability information, the base station may omit a capability reception process. Alternatively, a step of receiving the capability itself may be omitted based on the configuration information.

Thereafter, the terminal receives, from the base station, a first PDCCH or a second PDCCH in a specific CORESET based on the configuration information.

Furthermore, the terminal may identify at least one of resource allocation information for a first PDDCH or a second PDSCH, TCI-related information, antenna port information, etc. based on the first PDCCH or the second PDCCH (14-10).

Based on the identified information, the terminal may calculate a scheduling time offset between the PDCCH and the PDSCH (at least one of the scheduling time offsets between the first PDDCH and the first PDSCH or between the second PDCCH and the second PDSCH), and may determine at least one of a reception operation (or reception operation method) or reception beamforming direction of the first PDSCH or the second PDSCH based on the calculated results (14-20). In this case, determining, by the terminal, the reception operation method may include determining whether to receive data through at least one of the first PDSCH or the second PDSCH or determining at least one of methods for receiving the data if it is determined that the data is received.

The terminal may receive data through the first PDSCH and the first PDSCH corresponding to the first PDCCH or the second PDCCH based on at least one of the determined information (14-10) and the determined (14-20) results (14-30).

Furthermore, the terminal may perform decoding on the received data.

Table 16 illustrates a simply arranged abstract syntax notation (ASN. 1) structure of a serving cell. The following embodiments are described based on higher level information elements and field information described in Table 16 in order to distinguish between a constitution of a multi-TRP and a multi-TRP for transmission based on NC-JT.

In Table 16, ServingCell may be mapped to each cell index through ServingCellIndex. In this case, ServingCellIndex means the ID of a serving cell, and may mean a value of 0 when a corresponding serving cell is a PCell of a master cell group, a value configured as servCellIndex of a SpCellConfig information element (IE) when a corresponding serving cell is a PSCell of a master cell group, and sCellIndex of an SCellConfig IE if a corresponding serving cell is an SCell of a master cell group.

Furthermore, physCellId indicates a physical cell identity of the serving cell, and the corresponding ID may be a value set in a ServingCellConfigCommon IE. Transmission resource constitutions, such as a configuration and a BWP related to a downlink transmission channel of the corresponding serving cell may be defined by IEs, such as ARFCN, PDSCH-ServingCellConfig, a BWP, PDCCH-Config, and PDSCH-Config. Likewise, a constitution related to uplink transmission of the corresponding serving cell may be defined by IEs, such as ARFCN, PUSCR-ServingCeliConfig, a BWP, PUCCH-Config, and PUSCH-Config. For multi-TRP transmission based on NC-JT, a constitution of a pair or set of TRPs may be constituted based on parameters or IEs in Table 16.

For example, for multi-TRP transmission based on NC-JT, in the constitution of a pair or set of TRPs, the TRPs may be constituted or divided in a ServingCell IE, unit. In this case, if TRPs are divided based on each ServingCell, in transmission based on NC-JT, different ServingCells constitute a pair or a set. If a change is required, the pair or set may be additionally combined or changed. That is, a plurality of base stations may be operated by mapping TRPs to different ServingCell objects. Furthermore, ServingCells may constitute a pair or a set, and a separate higher layer parameter for the pair or set may be configured. In this case, multi-TRPs for NC-JT may have the same SSB carrier or SCS-SpecificCarrier. Furthermore, the multi-TRPs may include the same SCS, the same carrier BW, and the same point A (the lowest subcarrier of a common reference point for resource block grids or common RB 0).

Furthermore, for example, for multi-TRP transmission based on NC-JT, in the constitution of a pair or set of TRPs, the TRPs may be constituted or divided in a PDCCH-config unit. In this case, since the multi-TRPs are already constituted as the same ServingCell, a terminal may identify that the multi-TRPs are the same cell. If a base station constitutes a pair or set of TRPs for the NC-JT in the PDDCH-config unit, a terminal may identify a constitution and change of the TRPs based on a configuration and change of PDCCH-config through an RRC configuration or re-configuration process. That is, a plurality of at least two TRPs may configure a plurality of CORESETs and SearchSps through PDCCH-config, and may allocate the additionally different scrambling IDs or different time/frequency resources. In this case, for a URLLC purpose, a maximum of 5 CORESETs may be used for each PDCCH-config. Independent TCI states may be configured in the TRPs for a PDCCH diversity capability.

Furthermore, for example, for multi-TRP transmission based on NC-JT, in the constitution of a pair or set of TRPs, the TRPs may be constituted or divided in a CORESET or CORESET group unit of PDSCH-config or less. In this case, since the multi-TRPs are already constituted as the same ServingCell, a terminal may identify that the multi-TRPs are the same cell. If a base station constitutes a pair or set of TRPs for the NC-JT in a CORESET or CORESET group unit, the terminal may identify a constitution and change of the TRP based on a configuration and change of a CORESET (index) or a CORESET group (index) of PDCGH-config or less through an RRC configuration or re-configuration process. That is, for the transmission of a plurality of at least two TRPs, the CORESETs of the TRPs may be mapped by associating CORESET indices with one another or using CORESET group indices configured in the CORESETs so that the CORESETs are associated with one another and operated.

A maximum number of CORESETs which may be configured in the same TRP may be determined based on a UE capability. A base station may set a maximum number of candidate values of the CORESETs from a minimum of 3 to a maximum of 5 (e.g., a URLLC scenario) by taking into consideration a capability value of the UE. Furthermore, a maximum number of CORESET groups (indices) supported by a terminal may be configured as a maximum number of CORESETs or less, which are configured for the terminal. In rel-16, a terminal supporting NC-JT supports a maximum of two CORESET groups. The terminal may store the configured CORESET groups (indices) in a memory based on the capability value of the UE, and may perform management based on the configured CORESET groups (indices).

If a higher layer index is configured for each CORESET, in the case of a multi-DCI-based operation, when a plurality of parameters dataScramblingIdentityPDSCH is configured, each of the parameters dataScramblingIdentityPDSCH is associated with a higher layer index for each CORESET and applied to a PDSCH that has scheduled DCI identified in a CORESET having the same higher layer index.

```
1> ServingCell
  2> ServingCellIndex
  2> physCellId
  2> downlink
    3> ARFCN
    3> PDSCH-ServingCellConfig
      4> pucch-Cell
    3> BWP
      4> PDCCH-Config
        5> CORESET
          6> pdcch-DMRS-ScramblingID
        5> SearchSpace
      4> PDSCH-Config
        5> dataScramblingIdentityPDSCH
        5> DMRS
          6> scramblingID0
          6> scramblingID1
        5> TCI-States
  2> uplink
    3> ARFCN
    3> BWP
      4> PUCCH-Config
      4> PUSCH-Config
        5> dataScramblingIdentityPUSCH
        5> DMRS
          6> scramblingID0
          6> scramblingID1
      4> SRS-Config
      4> RACH-Config
```

Various embodiments of the disclosure describe an operation of a base station and a terminal to determine a default QCL. The various embodiments have been described by taking into consideration that a beam through which a PDCCH is transmitted and a beam through which a PDSCH is transmitted have the same condition. Meanwhile, a PDCCH beam (a beam through which a PDCCH is transmitted) and a PDSCH beam (a beam through which a PDSCH is transmitted) may be configured (decoupled) in a TRP in a way to be not identical with each other based on a configuration of a base station or the TRP. For example, the not-identically configured beams may include a case where beam widths are different from each other or a case where beams having the same beam width or being different from each other or adjacent to each other are configured, as in the case where the not-identically configured beam is configured as a beam having a wide PDCCH beam width and a narrow PDSCH beam width. At least two (e.g., level 1: a wide beam, level 2: a normal beam, level 3: a narrow beam, . . . , etc.) may be configured in the width of a beam operated by a base station. In this case, the base station may chiefly configure and use a wide beam like level 1 for a beam through which a PDCCH is transmitted, and may additionally configure and use a narrow beam, such as level 2 or 3, in addition to level 1 for a terminal(s) that requires increased throughput for a beam through which a PDSCH is transmitted.

As described above, although a beam through which a PDCCH is transmitted and a beam through which a PDSCH is transmitted are not identically configured in a TRP, a terminal may perform a PDSCH reception operation by using a method similar to rel-15. For example, when a value of the scheduling time offset (t_so) calculated from timing at which control information including information that allocates a PDSCH is received through a CORESET to timing at which the allocated. PDSCH is received is smaller than the UE capability parameter timeDurationForQCL (e.g., 14 symbols) reported to a base station, the terminal may apply, to the reception of the PDSCH, a QCL assumption (i.e., the same QCL parameter) applied to the lowest CORESEST ID at recent monitoring timing (slot or occasion).

However, the embodiment may be suitable for a condition in which a beam through which a different PDCCH is transmitted and a beam through which a different PDSCH is transmitted are the same. If a base station differently configures a beam through which a PDCCH is transmitted and a beam through which a PDSCH is transmitted for throughput improvements, when the value of t_so value is smaller than timeDurationForQCL, a terminal may use a default spatial QCL for the reception of the PDSCH. The disclosure proposes a method of determining the default spatial QCL.

Embodiment 12

A base station and a terminal may configure a beam applied to the default QCL through signaling based on a MAC CE. The terminal may identify default (spatial) QCL-related information of the MAC CE received from the base station, and may apply the identified information in an operation of receiving a PDSCH. That is, the terminal may receive the MAC CE from the base station, and may identify information related to a default QCL. When a value of t_so received between a PDCCH and the PDSCH is smaller than timeDurationForQCL, the terminal may receive the PDSCH by applying, to a beam through which the PDSCH is received, the information related to the default QCL configured in the MAC CE for the reception of the PDSCH. In this case, the information related to the default QCL may include at least one a QCL parameter, TCI states-related information, and pieces of information associated with a DL-RS or an UL-RS.

At least one of structures of the MAC CE discussed in the existing rel-15/16 may be (re)used and (re)interpreted as the structure of a MAC CE configured by a base station.

For example, when receiving a TCI states activation/deactivation MAC CE message for a PDSCH based on rel-15 as in FIG. 10-00 of FIG. 10A, a terminal may identify that a beam indicated as a default QCL of a PDSCH and a beam through which a PDCCH is transmitted are differently configured.

Specifically, when receiving the TCI states activation/deactivation message, the terminal may understand one of activated TCI states as a TCI state corresponding to a default QCL according to a determined rule. For example, the TCI state corresponding to the default QCL according to the determined rule may be defined as a TCI state indicated by the lowest or highest index value among the activated TCI states in a MAC CE message. When receiving a MAC CE message indicated as a state (1) in which all values of a serving cell ID #2, a BWP #4, T0 to T7 are activated, the terminal may identify a TCI state, corresponding to a default QCL in the serving cell #2 and the BWP #4, as being configured as the lowest TCI index T0 or the highest index T7 among activated TCI indices.

Furthermore, for example, as in FIG. 10-50 of FIG. 10A, a terminal may receive a ICI state indication MAC CE message for a PDCCH based on rel-15, and may understand a TCI state ID indicated along with a CORESET 0 within the message as TCI state corresponding to a default QCL for a beam through which a PDSCH is transmitted. In this case, the TCI state ID of the MAC CE message means the IDs of TCI states (e.g., the IDs of TCI states included in tci-States-ToAddModList) for a PDSCH configured in a higher layer. That is, the terminal may identify information related to the default QCL by receiving a TCI state indication MAC CE for the PDCCH from the base station. When a value of t_so for receiving the PDDCH and the PDSCH is smaller than timeDurationForQCL, the terminal may apply the ICI state indicated along with the CORESET 0 to a beam through which the PDSCH is received for the reception of the PDCCH. As a result, when the terminal receives the PDSCH scheduled through the PDCCH transmitted in the CORESET 0, a default QCL beam for the PDSCH may be the same as the beam configured for the CORESET 0. Meanwhile, if the beam for the CORESET 0 is not configured as a MAC-CE, the default beam for the reception of the PDSCH may be a preconfigured TCI state as in the various embodiments.

Furthermore, for example, if some of a beam list (e.g., a beam list configured and released through tci-StatesPDCCH-ToAddList and tci-StatesPDCCH-ToReleaseList) for the reception of a PDCCH configured in a terminal is redundantly configured as a beam list for the reception of a PDSCH (e.g., a beam list configured and released through tci-StatesToAddModList and tci-StatesToReleaseList), a base station and the terminal may exclude the redundantly configured beam upon default QCL configuration for the reception of the PDSCH. That is, the terminal may compare a reference RS and QCL type for each beam configured for the reception of the PDCCH and a reference RS and QCL type for each beam configured for the reception of the PDSCH, and may exclude the beam from a default QCL configuration for the reception of the PDSCH when the reference RS and the QCL type are redundantly present in the beam list for the reception of the PDCCH and the beam list for the reception of the PDSCH. Alternatively, the terminal may not expect that the base station configures a beam which may be redundantly used for the reception of the PDCCH and the reception of the PDSCH as a default QCL for the reception of the PDSCH.

The structure of a MAC CE configured by a base station may be constituted as a new control element message (signaling) structure.

In this case, the new message may be constituted in the form of a message that configures a default QCL for supporting a single TRP. For example, a MAC CE message that configures the default QCL may include information (e.g., a TCI index) indicative of at least one of TCI states for a default QCL assumption of a PDSCH. Furthermore, for example, the message may directly or indirectly indicate the direction of a beam transmitted by a base station by using information, such as a QCL type A/B/C/D or a DL-RS/UL-RS index. The information means a direction of a beam assumed by a base station and a terminal for the reception of a PDSCH, if the time taken for the terminal to decode DCI including beam information for the reception of the PDSCH transmitted by one TRP is not sufficient or if the time taken for the terminal to receive a PDSCH by switching a beam is not sufficient.

Furthermore, the message may be constituted in the form of a message that configures a default QCL for supporting a multi-TRP. For example, a MAC CE message that configures a default QCL, may include information (e.g., a TCI index #1 or a TCI index #2) indicative of at least one of TCI states for a default QCL assumption of a PDSCH(s). In this case, if one TCI state is included in the message, a terminal may identify that the same one default QCL is indicated in the multi-TRP or one default QCL is indicated in a single TRP. Two or more TCI states are included in the message. In this case, if the TCI states are different from each other, the terminal may identify that two or more different default QCLs are indicated in a multi-TRP. Specifically, if two or more TCI indices are indicated in the message, the terminal may identify that the order of TCI indices is mapped based on the order of TRPs or the order of a HigherLayerIndexPerCORESET index. Alternatively, a TRP index or the HigherLayerIndexPerCORESET index and a TCI index corresponding thereto may be independently indicated. Furthermore, if two or more TCI states are included in the message and in this case, indicated TCI states are the same, the terminal may identify that the same default QCL is indicated.

Furthermore, for example, the MAC CE message that configures a default QCL may include information (e.g., a TCI set index) indicative of at least one TCI set (e.g., one pair constituting two TCIs, one set constituting three TCIs) among TCI states for a default QCL assumption of a PDSCH(s) transmitted by a multi-TRP. In this case, when receiving the TCI set index, a terminal may identify that the TCI states pre-designated by the multi-TRP are indicated as the default QCL.

Furthermore, for example, the message may directly or indirectly indicate a direction of a beam transmitted by a base station by using information, such as a plurality of QCL type A/B/C/D or DL-RS/UL-RS indices. The information may mean a direction of a beam assumed by a base station and a terminal for the reception of a PDSCH if the time taken for the terminal to receive a PDSCH transmitted by one TRP by performing beam switching is not sufficient.

Additionally, the message may be configured as messages separately divided for a single TRP and a multi-TRP or may be configured as an integrated message constituted as one type.

Furthermore, for example, a MAC CE message for configuring a default beam based on a multi-TRP may be separately configured for a multi-TRP based on single-DCI. Furthermore, for example, a MAC CE message for configuring a default beam based on a multi-TRP may be separately configured for a multi-TRP based on multi-DCI.

In addition, the messages separately divided for a single TRP and a multi-TRP may be determined based on the capability of supported TRP transmission and reception of a terminal. Furthermore, the MAC CE may be used to configure an initial default QCL, and may also be taken into consideration for an additionally updated form.

Embodiment 13

In Embodiment 12, the constitution and configuration of a MAC CE message may be configured per component carrier (CC) or per BWP.

First, the constitution and configuration of a MAC message may be configured in one CC unit. For example, the MAC CE message may indicate default QCL-related information applied to one CC (e.g., a primary CC/PCell/PSCell, a secondary CC/SCell or an across CC) and an activated BWP. Furthermore, for example, the MAC CE message may indicate pieces of default QCL-related information applied to one CC and at least one configured BWP(s). Furthermore, for example, the MAC CE message may indicate pieces of default QCL-related information applied to one CC and all BWP(s) supported in a CC.

Second, the constitution and configuration of a MAC message may be configured at once with respect to a plurality of CCs. For example, the MAC CE message may indicate default QCL-related information applied to at least two CCs (e.g., include a primary CC/PCell/PSCell, a secondary CC/SCell or an across CC) and an activated BWP. Furthermore, for example, the MAC CE message may indicate pieces of default QCL-related information applied to at least two CCs and at least one configured BWP(s). Furthermore, for example, the MAC CE message may indicate pieces of default QCL-related information applied to at least two CCs and all BWP(s) supported in a CC.

Third, in the above embodiment, the constitution and configuration of a MAC CE message may be configured every combinations of CCs and/or combination of BWPs configured for a terminal. Specifically, a factor that indicates some of or all preconfigured CC(s)/activated CCs(s) by higher layer signaling in the MAC CE message may be configured. The CC indication factor may indicate one at least as in Table 17.

TABLE 17

•If a set of CCs for a beam configuration/switching is configured by higher layer signaling
- a factor indicative of the index of the CC set or a set for the index of the CC set → apply a MAC CE to the indicated CC set
- a factor indicative of a CC index included in the CC set → integratedly apply a MAC CE to some of or all CCs within the CC set including the CC index
•If a set of CCs for a beam configuration/switching is not configured by higher layer signaling
- apply a factor indicative of a set/list of CC indices in a MAC CE
- apply a factor indicative of a combination of CCs in a MAC CE The MAC CE message may include default QCL-related information applied to a CC indicated as described above. Furthermore, the MAC CE message may be applied to all BWPs/activated BWPs/BWP set within an indicated CC. In this case, the BWP set may be a BWP set that is explicitly indicated or implicitly agreed. If the BWP set is explicitly indicated, the BWP set may be indicated through a higher layer configuration or a MAC CE.

Fourth, in the above embodiment, the constitution and configuration of a MAC CE message may be configured or additionally updated when a terminal switches a CC or a BWP. Specifically, the MAC CE message may indicate default QCL-related information for each BWP when an additional CC is activated for a terminal or when the switching of a CC occurs as in the case where a connected CC is deactivated and a new CC is activated. For example, the MAC CE message may indicate default QCL-related information applied to a CC(s) and activated BWP switched or updated in addition to a CC through which a terminal and a base station are now communicating with each other. Furthermore, for example, the MAC CE message may indicate pieces of default QCL-related information applied to a CC(s) and at least one configured BWP(s) that is switched or updated. Furthermore, for example, the MAC CE message may indicate pieces of default QCL-related information applied to all BWP(s) supported in a switched or updated CC(s).

Embodiment 14

A method of designating and updating a beam for a default QCL based on the MAC CE message may be validly used from timing at which the MAC CE message is configured. For example, after an initial access process, duration for which a default QCL configuration-related MAC CE message is not activation by a base station may occur in a terminal. The duration may include duration for which a default QCL configuration-related MAC CE message is not received and predefined duration from timing at which a terminal receives a MAC CE message to timing at which the terminal activates a corresponding received MAC CE. Upon reception of a PDSCH before and after the aforementioned duration, a default QCL may be configured as follows.

First, a terminal may identify that a beam through which a PDCCH transmitted by a base station is transmitted and a beam through which a PDSCH is transmitted are the same until the base station activates a MAC CE message that configures transmitted default QCL-related information. When a value of the scheduling time offset (t_so) calculated from timing at which a COORESET including the PDCCH that allocates a PDSCH is received to timing at which the allocated PDSCH is received is smaller than the UE capability parameter timeDurationForQCL (e.g., 14 symbols) reported to the base station, the terminal may identically apply, to the reception of the PDSCH, a QCL assumption applied to the lowest CORESEST ID at recent monitoring timing (slot or occasion). Alternatively, if the condition is satisfied, the terminal may identically apply, to the reception of the PDSCH, a QCL assumption applied to the lowest CORESEST ID at the most recent monitoring timing (slot or occasion) within a CORESET group in which the PDCCH that allocates the PDSCH is transmitted. The operation may also be applied to a CC or BWP that is not activated, if a MAC CE message for a PDSCH default QCL, configuration has been activated in a specific CC or BWP, but the MAC CE message has not been activated in the remaining CCs or BWPs.

Second, a terminal may receive a PDSCH based on default QCL-related information configured in a MAC CE message as described with reference in Embodiments 12 and 13, from the activation of the MAC CE message that configures default QCL-related information transmitted by a base station. That is, when a value of the scheduling time offset (t_so) calculated from timing at which control information allocating a PDSCH is received through a CORESET to timing at which the allocated PDSCH is received is smaller than the UE capability parameter timeDurationforQCL (e.g., 14 symbols) reported to the base station, the terminal may apply a QCL parameter so that the PDSCH is received based on QCL-related information indicated in a MAC CE.

Third, after a terminal receives a MAC CE message that configures default QCL-related information transmitted by a base station, when a code point value of a transmission configuration indication (TCI) field is indicated in DCI format 1_1, the terminal may receive a PDSCH based on default (QCL-related information configured in the MAC CE message as described with reference in Embodiments 12 and 13. The TCI field may be applied when a higher layer parameter tci-PresentInDCI is in an enabled state.

Fourth, if a base station does not configure the higher layer parameter tci-PresentinDCI as "enabled" or changes the higher layer parameter into "disabled" and configures the higher layer parameter for a terminal, the terminal may not expect a default QCL configuration based on a MAC CE message. Alternatively, if a base station does not configure the higher layer parameter tci-PresentinDCI as "enabled" for a terminal, the terminal may not apply default QCL-related information indicated by a MAC CE in receiving a PDSCH, although the terminal receives a MAC CE message for a default QCL configuration transmitted by the base station. As a result, when a value of the scheduling time offset (t_so) calculated from timing at which control information allocating the PDSCH is received through a CORESET to timing at which the allocated PDSCH is received is smaller than the UE capability parameter timeDurationForQCL (e.g., 14 symbols) reported to the base station, the terminal may identically apply, to the reception of the PDSCH, a QCL assumption applied to the lowest CORESET ID at recent monitoring timing (slot or occasion). Alternatively, if the condition is satisfied, the terminal may identically apply, to the reception of the PDSCH, a QCL assumption applied to the lowest CORESEST ID at the most recent monitoring timing (slot or occasion) within a CORESET group in which the PDCCH allocating the PDSCH is transmitted.

Fifth, if a base station performs cross-carrier scheduling or cross-BWP scheduling on a PDSCH and a PDSCH default QCL through a MAC CE is not configured in a specific CC or BWP, a terminal may perform the same operation as an operation before the aforementioned activation of the MAC CE message in the specific CC or BWP.

For example, when a value of the scheduling time offset (t_so) calculated from timing at which control information that schedules an PDSCH allocated to a cross-carrier or cross-BWP is received through a CORESET to timing at which the PDSCH allocated to the cross-carrier or cross-BWP is received is smaller than the UE capability parameter timeDurationForQCL (e.g., 14 symbols) reported to the base station, the terminal may apply, to the reception of the PDSCH, a QCL assumption applied to the lowest CORESET ID at recent monitoring timing (slot or occasion) by using the same QCL parameter as that used to receive the PDSCH.

Alternatively, when a value of the scheduling time offset (t_so) calculated from timing at which a CORESET within a CORESET group including a PDCCH scheduling a PDSCH allocated to a cross-carrier or cross-BWP is received to timing at which the PDSCH allocated to the cross-carrier or cross-BWP is received is smaller than the UE capability parameter timeDurationForQCL (e.g., 14 symbols) reported to the base station, the terminal may apply, to the reception of the PDSCH, a QCL assumption applied to the lowest CORESEST ID at most recent monitoring timing (slot or occasion) by using the same QCL parameter as that used to receive the PDSCH, within a CORESET group in which the PDCCH allocating the PDSCH is transmitted.

Figure 15:
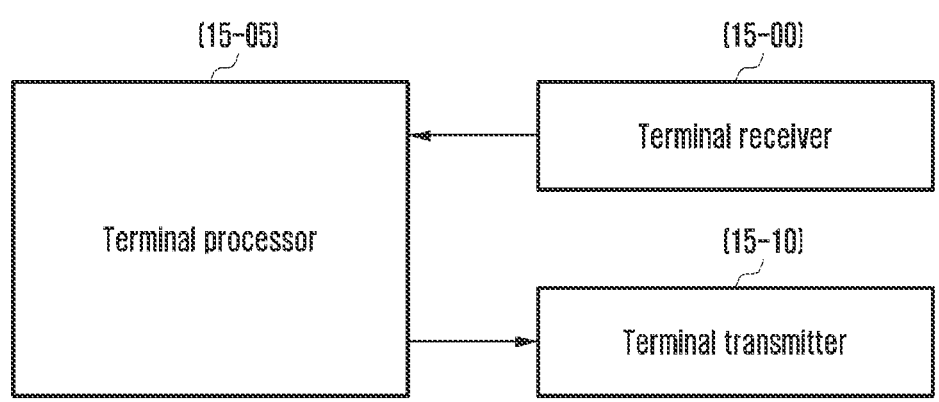
FIG. 15 illustrates a structure of a terminal in a wireless communication system according to an embodiment of the disclosure.

FIG. 15 illustrates a structure of a terminal in a wireless communication system according to an embodiment of the disclosure.

With reference to FIG. 15, the terminal may include a terminal receiver 15-00, a terminal transmitter 15-10, and a terminal processor (controller) 15-05.

The terminal receiver 15-00 and the terminal transmitter 15-10 may be together referred to as a transceiver. The terminal receiver 15-00, terminal transmitter 15-10 and terminal processor 15-05 of the terminal may operate according to the aforementioned communication method of the terminal. However, the elements of the terminal are not limited to the aforementioned example. For example, the terminal may include more elements (e.g., a memory) than the aforementioned elements or may include less elements than the aforementioned elements. Furthermore, the terminal receiver 15-00, the terminal transmitter 15-10, and the terminal processor 15-05 may be implemented in one chip form.

The terminal receiver 15-00 and the terminal transmitter 15-10 (or the transceiver) may transmit and receive signals to and from a base station. In this case, the signal may include control information and data. To this end, the transceiver may include an RF transmitter for up-converting and amplifying a frequency of a transmitted signal, an RF receiver for low-noise amplifying a received signal and down-converting a frequency of the signal, etc. However, this is merely an embodiment of the transceiver, and elements of the transceiver are not limited to the RF transmitter and the RF receiver.

Furthermore, the transceiver may receive a signal through a wireless channel, may output the signal to the terminal processor 15-05, and may transmit, through a wireless channel, a signal outputted by the terminal processor 15-05.

A memory (not illustrated) may store a program and data necessary for an operation of the terminal. Furthermore, the memory may store control information or data included in a signal obtained from the terminal. The memory may be composed of a storage medium, such as a ROM, a RAM, a hard disk, a CD-ROM, and a DVD, or a combination of the storage media.

The terminal processor 15-05 may control a series of processes so that the terminal operates according to the aforementioned embodiments of the disclosure. The terminal processor 15-05 may be implemented as a controller or one or more processors.

Figure 16:
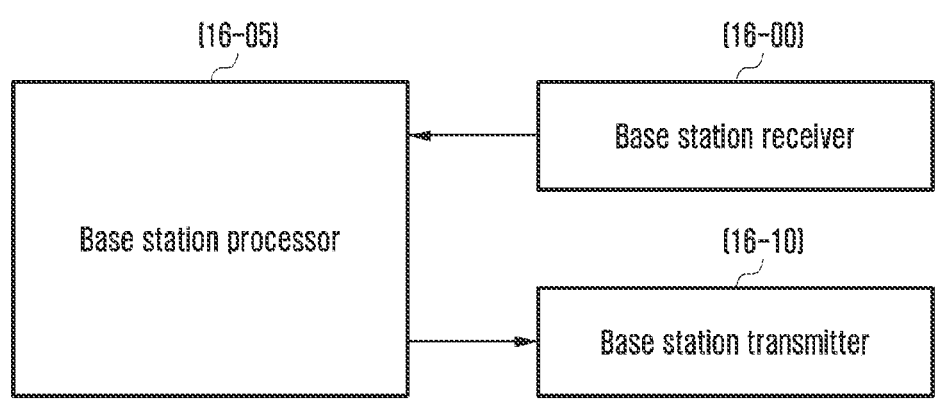
FIG. 16 illustrates a structure of a base station in a wireless communication system according to an embodiment of the disclosure.

FIG. 16 illustrates a structure of a base station in a wireless communication system according to an embodiment of the disclosure.

With reference to FIG. 16, the base station may include a base station receiver 16-00, a base station transmitter 16-10, and a base station processor (controller) 16-05.

The base station receiver 16-00 and the base station transmitter 16-10 may be together referred to as a transceiver. The base station receiver 16-00, base station transmitter 16-10 and base station processor 16-05 of the base station may operate according to the aforementioned communication method of the base station. However, the elements of the base station are not limited to the aforementioned example. For example, the base station may include more elements (e.g., a memory) than the aforementioned elements or may include less elements than the aforementioned elements. Furthermore, the base station receiver 16-00, the base station transmitter 16-10, and the base station processor 16-05 may be implemented in one chip form.

The base station receiver 16-00 and the base station transmitter 16-10 (or the transceiver) may transmit and receive signals to and from a terminal. In this case, the signal may include control information and data. To this end, the transceiver may include an RF transmitter for up-converting and amplifying a frequency of a transmitted signal, an RF receiver for low-noise amplifying a received signal and down-converting a frequency of the signal, etc. However, this is merely an embodiment of the transceiver, and elements of the transceiver are not limited to the RF transmitter and the RF receiver.

Furthermore, the transceiver may receive a signal through a wireless channel, may output the signal to the base station processor 16-05, and may transmit, through a wireless channel, a signal outputted by the base station processor 16-05.

A memory (not illustrated) may store a program and data necessary for an operation of the base station. Furthermore, the memory may store control information or data included in a signal obtained from the base station. The memory may be composed of a storage medium, such as a ROM, a RAM, a hard disk, a CD-ROM, and a DVD, or a combination of the storage media.

The base station processor 16-05 may control a series of processes so that the base station operates according to the aforementioned embodiments of the disclosure. The base station processor 16-05 may be implemented as a controller or one or more processors.

Meanwhile, in the drawings describing the method of the disclosure, the order of the description does not essentially correspond to the order of execution, and the order of the incident may be changed or executed in parallel.

Alternatively, in the drawings describing the method of the disclosure, some elements may be omitted and only some elements may be included within a range that does not damage the essence of the disclosure.

Furthermore, in the method of the disclosure, some of or all contents included in each embodiment may be combined and executed within a range that does not damage the essence of the disclosure.

Furthermore, although not disclosed in the disclosure, a method using a separate table or information including at least one element included in a table proposed in the disclosure is also possible.

The embodiments of the disclosure disclosed in the specification and drawings have suggested given examples in order to easily describe the technical contents of the disclosure and to help understanding of the disclosure, and are not intended to limit the scope of the disclosure. That is, it is evident to those skilled in the art to which the disclosure pertains that other modified examples based on the disclosure may be practiced. Furthermore, the embodiments may be combined and operated, if necessary. For example, some of Embodiment 1 to Embodiment 9 of the disclosure may be combined and operated by a base station and a terminal.

The invention claimed is:

1. A method performed by a user equipment (UE) in a communication system, the method comprising:
    transmitting, to a base station, UE capability information including beam switching-related information;
    receiving, from a first transmission reception point (TRP) associated with the base station, first configuration information including first information related to a first control channel;
    receiving, from a second TRP associated with the base station, second configuration information including second information related to a second control channel;
    receiving, from the first TRP, first control information based on the first information related to the first control channel;
    receiving, from the second TRP, second control information based on the second information related to the second control channel;
    identifying whether a first time offset between the first control channel and a first data channel corresponding to the first control information is smaller than the beam switching-related information;
    identifying whether a second time offset between the second control channel and a second data channel corresponding to the second control information is smaller than the beam switching-related information;
    identifying default quasi co-located (QCL) information configured by a medium access control (MAC) control element (CE);
    in case that the first time offset and the second time offset are smaller than the beam switching-related information, selecting a QCL parameter among a first QCL parameter used to receive the first control information and a second QCL parameter used to receive the second control information; and
    based on the identified default QCL information, receiving data on the first data channel and the second data channel by applying the selected QCL parameter to the identified default QCL information,
    wherein the default QCL information includes at least one of information associated with transmission configuration indication (TCI) states, downlink reference signals (DL-RS), or uplink reference signals (UL-RS).

2. The method of claim 1, wherein different default QCL information is used for a plurality of TRPs in case that two or more TCI states are included in the MAC CE.

3. The method of claim 2, wherein a TCI state is mapped based on a TRP index in case that the two or more TCI states are included in the MAC CE, and
    wherein the MAC CE is configured per component carrier (CC) or per bandwidth part (BWP).

4. A method performed by a base station in a communication system, the method comprising:
    receiving, from a user equipment (UE), UE capability information including beam switching-related information;
    transmitting, to the UE via a first transmission reception point (TRP) associated with the base station, first configuration information including first information related to a first control channel;
    transmitting, to the UE via a second TRP associated with the base station, second configuration information including second information related to a second control channel;
    transmitting, to the UE via the first TRP, first control information based on the first information related to the first control channel;
    transmitting, to the UE via the second TRP, second control information based on the second information related to the second control channel; and
    in case that a first time offset between the first control channel and a first data channel corresponding to the first control information is smaller than the beam switching-related information and a second time offset between the second control channel and a second data channel corresponding to the second control information is smaller than the beam switching-related information, based on default quasi co-located (QCL) information configured by a medium access control (MAC) control element (CE), transmitting, to the UE, data on the first data channel and the second data channel by applying a QCL parameter to the default QCL information,
    wherein the QCL parameter is selected among a first QCL parameter used to receive the first control information and a second QCL parameter used to receive the second control information, and
    wherein the default QCL information includes at least one of information associated with transmission configuration indication (TCI) states, downlink reference signals (DL-RS), or uplink reference signals (UL-RS).

5. The method of claim 4, wherein different default QCL information is used for a plurality of TRPs in case that two or more TCI states are included in the MAC CE.

6. The method of claim 5, wherein a TCI state is mapped based on a TRP index in case that the two or more TCI states are included in the MAC CE, and
    wherein the MAC CE is configured per component carrier (CC) or per bandwidth part (BWP).

7. A user equipment (UE) in a communication system, the UE comprising:
    a transceiver; and
    a controller coupled with the transceiver and configured to:
        transmit, to a base station, UE capability information including beam switching-related information,
        receive, from a first transmission reception point (TRP) associated with the base station, first configuration information including first information related to a first control channel,
        receive, from a second TRP associated with the base station, second configuration information including second information related to a second control channel,
        receive, from the first TRP, first control information based on the first information related to the first control channel,
        receive, from the second TRP, second control information based on the second information related to the second control channel,
        identify whether a first time offset between the first control channel and a first data channel corresponding to the first control information is smaller than the beam switching-related information,
        identify whether a second time offset between the second control channel and a second data channel corresponding to the second control information is smaller than the beam switching-related information,
        identify default quasi co-located (QCL) information configured by a medium access control (MAC) control element (CE), in case that the first time offset and the second time offset are smaller than the beam switching-related information, select a QCL parameter among a first QCL parameter used to receive the first control information and a second QCL parameter used to receive the second control information, and based on the identified default QCL information, receive data on the first data channel and the second data channel by applying the selected QCL parameter to the identified default QCL information, wherein the default QCL information includes at least one of information associated with transmission configuration indication (TCI) states, downlink reference signals (DL-RS), or uplink reference signals (UL-RS).

8. The UE of claim 7, wherein different default QCL information is used for a plurality of TRPs in case that two or more TCI states are included in the MAC CE.

9. The UE of claim 8, wherein a TCI state is mapped based on a TRP index in case that the two or more TCI states are included in the MAC CE, and wherein the MAC CE is configured per component carrier (CC) or per bandwidth part (BWP).

10. A base station in a communication system, the base station comprising:

a transceiver; and a controller coupled with the transceiver and configured to:

receive, from a user equipment (UE), UE capability information including beam switching-related information, transmit, to the UE via a first transmission reception point (TRP), first configuration information including first information related to a first control channel, transmit, to the UE via a second TRP, second configuration information including second information related to a second control channel;

transmit, to the UE via the first TRP, first control information based on the first information related to the first control channel, transmit, to the UE via the second TRP, second control information based on the second information related to the second control channel, and in case that a first time offset between the first control channel and a first data channel corresponding to the first control information is smaller than the beam switching-related information and a second time offset between the second control channel and a second data channel corresponding to the second control information is smaller than the beam switching-related information, based on default quasi co-located (QCL) information configured by a medium access control (MAC) control element (CE), transmit, to the UE, data on the first data channel and the second data channel by applying a QCL parameter to the default QCL information, wherein the QCL parameter is selected among a first QCL parameter used to receive the first control information and a second QCL parameter used to receive the second control information, and wherein the default QCL information includes at least one of information associated with transmission configuration indication (TCI) states, downlink reference signals (DL-RS), or uplink reference signals (UL-RS).

11. The base station of claim 10, wherein different default QCL information is used for a plurality of TRPs in case that two or more TCI states are included in the MAC CE, wherein a TCI state is mapped based on a TRP index in case that the two or more TCI states are included in the MAC CE, and wherein the MAC CE is configured per component carrier (CC) or per bandwidth part (BWP).

* * * * *